United States Patent [19]
Flank et al.
[11] Patent Number: 4,861,743
[45] Date of Patent: Aug. 29, 1989

[54] PROCESS FOR THE PRODUCTION OF MOLECULAR SIEVES

[75] Inventors: William H. Flank, Chappaqua; Stephen T. Wilson, Shrub Oak; Julio C. Marte, Peekskill; Edith M. Flanigen, White Plains, all of N.Y.

[73] Assignee: UOP, Des Plaines, Ill.

[21] Appl. No.: 126,192

[22] Filed: Nov. 25, 1987

[51] Int. Cl.$^4$ .......... B01J 27/14
[52] U.S. Cl. .......... 502/214; 423/305
[58] Field of Search .......... 502/214; 423/306, 305

[56] References Cited

U.S. PATENT DOCUMENTS

| | | | |
|---|---|---|---|
| 2,992,068 | 7/1961 | Haden et al. | 23/112 |
| 3,065,054 | 11/1962 | Haden et al. | 23/112 |
| 3,094,383 | 6/1963 | Dziezanowski et al. | 23/112 |
| 3,119,659 | 1/1964 | Taggart et al. | 23/112 |
| 3,119,660 | 1/1964 | Howell et al. | 23/112 |
| 3,367,862 | 2/1968 | Haden et al. | 252/455 |
| 3,367,887 | 2/1968 | Haden et al. | 252/455 |
| 3,370,917 | 2/1968 | Eichhorn et al. | 23/112 |
| 3,450,645 | 6/1969 | McEvoy | 252/455 |
| 3,777,006 | 12/1973 | Rundell et al. | 423/118 |
| 3,909,076 | 9/1975 | Kato | 305/11 |
| 4,058,856 | 11/1977 | Doerre et al. | 3/1.91 |
| 4,235,753 | 11/1980 | Brown et al. | 252/455 |
| 4,310,440 | 1/1982 | Wilson et al. | 252/435 |
| 4,424,144 | 1/1984 | Pryor et al. | 502/68 |
| 4,440,871 | 4/1984 | Lok et al. | 502/214 |
| 4,500,651 | 2/1985 | Lok et al. | 502/208 |
| 4,554,143 | 11/1985 | Messina et al. | 423/306 |
| 4,567,029 | 1/1986 | Wilson et al. | 423/306 |

FOREIGN PATENT DOCUMENTS 1165562 12/1915 Fed. Rep. of Germany .

*Primary Examiner*—Carl F. Dees
*Attorney, Agent, or Firm*—Vincent J. Vasta, Jr.

[57] ABSTRACT

Non-zeolitic molecular sieves are prepared by contacting a body of alumina or silica-alumina (optionally containing reactive sources of phosphorus pentoxide and/or other elements desired in the non-zeolitic molecular sieve) with a liquid reaction mixture containing a reactive source of phosphorus pentoxide (and optionally reactive sources of silica and/or other elements desired in the non-zeolitic molecular sieve), and an organic templating agent, thereby causing the body to react with the liquid reaction mixture and to form crystals of the non-zeolitic molecular sieve within the body.

61 Claims, No Drawings

PROCESS FOR THE PRODUCTION OF MOLECULAR SIEVES

FIELD OF THE INVENTION

This invention relates to a process for the production of molecular sieves. More specifically, this invention relates to a process for the production of non-zeolitic molecular sieves from alumina or silica-alumina bodies.

BACKGROUND OF THE INVENTION

Molecular sieves of the crystalline aluminosilicate zeolite type are well known in the art and now comprise over 150 species of both naturally occurring and synthetic compositions. In general the crystalline zeolites are formed from corner-sharing $AlO_2$ and $SiO_2$ tetrahedra and are characterized by having pore openings of uniform dimensions, having a significant ion-exchange capacity and being capable of reversibly desorbing an adsorbed phase which is dispersed throughout the internal voids of the crystal without displacing any atoms which make up the framework crystal structure.

The early procedures for synthesizing zeolites produced materials that were very fine, often less than a few microns in size. Such small particle size powders are difficult to use in many industrial processes. Furthermore the small sizes can also create dust hazards for people who handle the materials. Larger zeolite particles, having average particle sizes of the order of 10 microns upwards, are preferred for many applications. However, for such large particle zeolites to be useful in all processes in which zeolites are used industrially, the large particle zeolites must retain the ion-exchange properties, adsorption capacity and selectivity, thermal stability and catalytic activity of finely divided crystalline zeolites. In addition, the large zeolite particles should exhibit high attrition resistance and crush strength.

Although larger zeolite bodies having sizes in excess of approximately five microns can be prepared by agglomerating small crystals, a typical agglomeration process requires a suitable binder, such as a clay, silica or alumina gel, or inorganic or organic adhesive, and processing conditions that assure reproducibility of the properties of the agglomerates. Because such processing conditions are often complex and difficult to control and because the binder material, which is a relatively inert material relatively incapable of adsorption, tends to reduce and/or modify the adsorptive and catalytic properties of the zeolite by dilution and in other ways, this approach is not optimal.

Accordingly, processes have been developed for producing zeolites having relatively large particle sizes ranging from tens of microns up to several millimeters or more. Many such processes begin with the preparation of a precursor, or preformed body, which contains certain reactive or unreactive kaolin-type clays and which can be converted by chemical means to a zeolite body that retains the shape of the preformed body.

Earlier preform-type products required expensive multiple synthesis steps, such as (1) admixing synthesized zeolite with kaolin clay and firing the composite to make it reactive, then further synthesizing additional zeolite from the reactive clay component by caustic treatment, or (2) bonding synthesized zeolite with silica sol, gelling, and further treating the composite with sodium aluminate at elevated pH to form additional zeolite (see German Patent No. 1,165,562 to Bayer). Cumbersome processes using sodium aluminate gel and water-immiscible hydrocarbon liquids have also been employed (see U.S. Pat. No. 3,094,383 assigned to Engelhard Corporation).

U.S. Pat. No. 2,992,068 describes a method of preparing zeolite A bodies from preformed bodies containing calcined kaolin clay, caustic and optionally added silica or alumina.

U.S. Pat. No. 3,065,054 describes a preparation of zeolite bodies from pre-formed bodies containing uncalcined kaolin clay, caustic and a porosity inducing agent.

U.S. Pat. No. 3,119,659 describes a method of preparing zeolite bodies from preformed bodies containing either calcined or uncalcined kaolin clay, or both, caustic and optionally added silica or alumina. The preformed bodies may also contain added zeolite powder.

U.S. Pat. No. 3,119,660 describes a method of preparing zeolite bodies from preformed bodies containing either calcined or uncalcined kaolin clay, or both, and optionally added silica or alumina. The preformed bodies may also contain included zeolite powder and diluents.

U.S. Pat. Nos. 3,367,886 and 3,367,887 describe methods of preparing zeolite bodies from preformed bodies containing zeolite powder, calcined and uncalcined kaolin clay and sodium hydroxide.

U.S. Pat. No. 3,370,917 describes a method of preparing Zeolite Z-12 bodies from preformed bodies containing calcined kaolin-type clay and sodium hydroxide in an $Na_2O:SiO_2$ molar ratio of about 0.13.

U.S. Pat. No. 3,450,645 describes the preparation of zeolite bodies by extruding into pellets a mixture containing calcined and uncalcined kaolin-type clay, water and sodium hydroxide, aging and then ammonium-exchanging the pellets and finally digesting them in oil at 200° F. (approximately 93° C.).

U.S. Pat. Nos. 3,777,006 and 4,235,753 describe methods of preparing zeolite bodies from preformed bodies containing meta-kaolin and optionally caustic by treating those bodies with silicate solutions containing nucleation centers.

U.S. Pat. No. 3,909,076 describes the preparation of Zeolite X bodies from preformed bodies containing particles of both Zeolite X and meta-kaolin clay. The particles are stated to have an average size of from about 0.1 to about 50 microns, preferably from 0.5 to 10 microns.

U.S. Pat. Nos. 4,424,144 and 4,058,856 generally describe preparations of zeolite bodies from preformed bodies containing zeolite powder, meta-kaolin and sodium hydroxide.

However, the zeolite bodies prepared by these and similar methods frequently, and often unpredictably, exhibit poor crush strength and/or adsorption properties. In addition, the wet strength of the preformed bodies made by prior art methods is generally quite low; the preformed bodies that are converted to zeolite often disintegrate during aging and digestion, especially if any agitation is used. In addition, the rates of zeolite formation are generally slow; many of the examples in the prior art require three days or more reaction time.

There have recently been reported several classes of microporous compositions which are not zeolitic, and which will collectively be referred to hereinafter as "non-zeolitic molecular sieves", which term will be more precisely defined hereinafter. These non-zeolitic molecular sieves include the crystalline aluminophosphate compositions disclosed in U.S..Pat. No. 4,310,440 issued Jan. 12, 1982 to Wilson et al. These materials are formed from $AlO_2$ and $PO_2$ tetrahedra and have electrovalently neutral frameworks as in the case of silica polymorphs. Unlike the silica molecular sieve, silicalite, which is hydrophobic due to the absence of extra-structural cations, the aluminophosphate molecular sieves are moderately hydrophilic, apparently due to the difference in electronegativity between aluminum and phosphorus. Their intracrystalline pore volumes and pore diameters are comparable to those known for zeolites and silica molecular sieves.

In U.S. Pat. No. 4,440,871, there is described a novel class of silicon-substituted aluminophosphate non-zeolitic molecular sieves which are both microporous and crystalline. These materials have a three-dimensional crystal framework of $PO_2^+$, $AlO_2^-$ and $SiO_2$ tetrahedral units and, exclusive of any alkali metal or calcium which may optionally be present, an as-synthesized empirical chemical composition on an anhydrous basis of:

$$mR:(Si_xAl_yP_z)O_2$$

wherein "R" represents at least one organic templating agent present in the intracrystalline pore system; "m" represents the moles of "R" present per mole of $(Si_xAl_yP_z)O_2$ and has a value of from zero to 0.3, the maximum value in each case depending upon the molecular dimensions of the templating agent and the available void volume of the pore system of the particular silicoaluminophosphate species involved; and "x", "y", and "z" represent the mole fractions of silicon, aluminum and phosphorus, respectively, present as tetrahedral oxides. The minimum value for each of "x", "y", and "z" is 0.01 and preferably 0.02. The maximum value for "x" is 0.98; for "y" is 0.60; and for "z" is 0.52. These silicoaluminophosphates exhibit several physical and chemical properties which are characteristic of both aluminosilicate zeolites and aluminophosphates.

In U.S. Pat. No. 4,500,651, there is described a novel class of titanium-containing non-zeolitic molecular sieves whose chemical composition in the as-synthesized and anhydrous form is represented by the unit empirical formula:

$$mR:(Ti_xAl_yP_z)O_2$$

wherein "R" represents at least one organic templating agent present in the intracrystalline pore system; "m" represents the moles of "R" present per mole of $(Ti_xAl_yP_z)O_2$ and has a value of between zero and about 5.0; and "x", "y" and "z" represent the mole fractions of titanium, aluminum and phosphorus, respectively, present as tetrahedral oxides.

In U.S. Pat. No. 4,567,029, there is described a novel class of crystalline metal aluminophosphate non-zeolitic molecular sieves having three-dimensional microporous framework structures of $MO_2$, $AlO_2$ and $PO_2$ tetrahedral units and having an empirical chemical composition on an anhydrous basis expressed by the formula:

$$mR:(M_xAl_yP_z)O_2$$

wherein "R" represents at least one organic templating agent present in the intracrystalline pore system; "m" represents the moles of "R" present per mole of $(M_xAl_yP_z)O_2$ and has a value of from zero to 0.3; "M" represents at least one metal of the group magnesium, manganese, zinc and cobalt; and "x", "y", and "z" represent the mole fractions of the metal "M", aluminum and phosphorus, respectively, present as tetrahedral oxides.

In U.S. Pat. No. 4,544,143, there is described a novel class of crystalline ferroaluminophosphate non-zeolitic molecular sieves having a three-dimensional microporous framework structure of $FeO_2$, $AlO_2$ and $PO_2$ tetrahedral units and having an empirical chemical composition on an anhydrous basis expressed by the formula:

$$mR:(Fe_xAl_yP_z)O_2$$

wherein "R" represents at least one organic templating agent present in the intracrystalline pore system; "m" represents the moles of "R" present per mole of $(Fe_xAl_yP_z)O_2$ and has a value of from zero to 0.3; and "x", "y" and "z" represent the mole fractions of the iron, aluminum and phosphorus, respectively, present as tetrahedral oxides.

Other aluminophosphate and silicoaluminophosphate non-zeolitic molecular sieves are described in a number of pending patent applications, as described in more detail below.

The aforementioned patents and paten applications describe methods for the preparation of the non-zeolitic molecular sieves by hydrothermal crystallization thereof from a substantially homogeneous liquid reaction mixture containing reactive sources of aluminum, phosphorus, silicon (in the case of the silicoaluminophosphates) and the other element(s), if any, required in the non-zeolitic molecular sieve. The reaction mixture also preferably contains an organic templating, i.e., structure-directing, agent, preferably a compound of an element of Group VA of the Periodic Table, and/or optionally an alkali or other metal. The reaction mixture is generally placed in a sealed pressure vessel, preferably lined with an inert plastic material such as polytetrafluoroethylene and heated, preferably under autogenous pressure, at a temperature between 50° C. and 250° C., and preferably between 100° C. and 200° C., until crystals of the non-zeolitic molecular sieve product are obtained, usually for a period of from several hours to several weeks. Effective crystallization times of from about 2 hours to about 30 days are generally employed. The non-zeolitic molecular sieve is recovered by any convenient method such as centrifugation or filtration.

Although these hydrothermal crystallization methods are effective in producing the non-zeolitic molecular sieves in high yields, they have the disadvantage that, presumably because the crystallization of the non-zeolitic molecular sieve takes place from a substantially homogeneous and relatively high viscosity liquid or semi-gel, the average particle size of the non-zeolitic molecular sieve produced is often very small, typically in the sub-micron range. This problem of small particle size of the product is especially difficult in the SAPO molecular sieves of U.S. Pat. No. 4,440,871, and especially SAPO-34. Such small average particle sizes render the non-zeolitic molecular sieves difficult to filter or centrifuge, and hence difficult to separate cleanly from the reaction mixture in which they are formed. Moreover, the small average particle size of the non-zeolitic molecular sieve tends to cause the same problems (i.e., difficulty of use in some industrial applications, dust hazards, difficulty in binding without reduction and/or modification of adsorptive and catalytic properties, and lack of reproducibility in properties after binding) as with the small average particle size zeolites discussed above.

There is thus a need for a process for the production of non-zeolitic molecular sieves which will allow the non-zeolitic molecular sieves to be produced in a form having an average particle size substantially greater than that of the non-zeolitic molecular sieves produced by the hydrothermal crystallization processes described above, and this invention provides such a process.

SUMMARY OF THE INVENTION

Accordingly, this invention provides a process for the production of a crystalline non-zeolitic molecular sieve in a preformed body of alumina or silica-alumina, which process comprises contacting this body with a liquid reaction mixture containing a reactive source of phosphorus pentoxide, and an organic templating agent, the contacting being effected at a time and temperature so as to cause the body to react with the liquid reaction mixture and to form crystals of the non-zeolitic molecular sieve within the body. In this process, if the non-zeolitic molecular sieve is to contain silica, a reactive source of silica (which can b silica itself) may be included in the body and/or in the liquid reaction mixture. Similarly, if the non-zeolitic molecular sieve is to contain one or more elements other than aluminum, silicon and phosphorus, reactive sources of these elements may be included in the silica or silica-alumina body and/or in the liquid reaction mixture.

DETAILED DESCRIPTION OF THE INVENTION

The term "non-zeolitic molecular sieves" or "NZMS" as used herein is hereby defined to mean the molecular sieves claimed in the aforementioned U.S. Pat. Nos. 4,310,440; 4,440,871 (and in the related U.S. Ser. No. 575,745, filed Jan. 31, 1984); 4,500,651; 4,554,143; and 4,567,029; the $AlPO_4$-41 molecular sieves described in U.S. Ser. No. 880,559, filed June 30, 1986, the "ELAPSO" molecular sieves as disclosed in U.S. Ser. No. 600,312, filed Apr. 13, 1984, and the "ELAPO" molecular sieves, as described later in this paragraph. Certain non-zeolitic molecular sieves ("ELAPO") are disclosed in EPC Patent Application Nos. 85104386.9 (Publication No. 0158976, published Oct. 13, 1985) and 85104388.5 (Publication No. 0158349, published Oct. 16, 1985); and ELAPSO molecular sieves are disclosed in copending U.S. Ser. No. 600,312, filed Apr. 13, 1984 (EPC Publication. No 0159624, published Oct. 30, 1985). More specifically, the term "non-zeolitic molecular sieves" includes all the molecular sieves claimed in the following patent applications (in the following Table, (A) following a serial number indicates that the application is abandoned, while (CIP) following a serial number indicates that the application is a continuation-in-part of the immediately preceding application and (C) following a serial number indicates that the application is a continuation of the immediately preceding application):

| U.S. Serial No. | Filed | NZMS |
|---|---|---|
| 600,166 (A) | April 13, 1984 | AsAPO |
| 830,889 (CIP) | Feb. 19, 1986 | AsAPO |
| 599,812 (A) | April 13, 1984 | BAPO |
| 804,248 (C)(A) | Dec. 4, 1985 | BAPO |
| 29,540 (CIP) | March 24, 1987 | BAPO |
| 599,776 (A) | April 13, 1984 | BeAPO |

-continued

| U.S. Serial No. | Filed | NZMS |
|---|---|---|
| 835,293 (CIP) | March 3, 1986 | BeAPO |
| 599,813 (A) | April 13, 1984 | CAPO |
| 830,756 (CIP) | Feb. 19, 1986 | CAPO |
| 599,771 (A) | April 13, 1984 | GaAPO |
| 830,890 (CIP) | Feb. 19, 1986 | GaAPO |
| 599,807 (A) | April 13, 1984 | GeAPO |
| 841,753 (CIP) | March 20, 1986 | GeAPO |
| 599,811 (A) | April 13, 1984 | LiAPO |
| 834,921 (CIP) | Feb. 28, 1986 | LiAPO |
| 600,171 | April 13, 1984 | FCAPO |
| (now U.S. Pat. No. 4,686,093 issued August 11, 1987) | | |
| 600,172 (A) | April 13, 1984 | ElAPO (M comprises two different |
| 846.088 (CIP) | March 31, 1986 | elements) |
| 599,824 (A) | April 13, 1984 | FeTiAPO |
| 902,129 (C) | September 2, 1986 | FeTiAPO |
| 599,810 (A) | April 13, 1984 | XAPO |
| 902,020 (C) | September 2, 1986 | XAPO |
| 599,808 (A) | ApAiPSD 1984 | (182)1986 |
| 845,484 (CIP) | March 31, 1986 AsAPSO | |
| 600,177 (A) | April 13, 1984 | BAPSO |
| 845,255 (CIP) | March 28, 1986 | BAPSO |
| 600,176 (A) | April 13, 1984 | BeAPSO |
| 841,752 (CIP) | March 20, 1986 | BeAPSO |
| 599,830 (A) | April 13, 1984 | CAPSO |
| 852,174 (CIP) | April 15, 1986 | CAPSO |
| 599,925 (A) | April 13, 1984 | GaAPSO |
| 845,985 (CIP) | March 31, 1986 | GaAPSO |
| 599,971 (A) | April 13, 1984 | GeAPSO |
| 852,175 (CIP) | April 15, 1986 | GeAPSO |
| 599,952 (A) | April 13, 1984 | LiAPSO |
| 847,227 (CIP) | April 2, 1986 | LiAPSO |
| 600,179 | April 13, 1984 | TiAPSO |
| (now U.S. Pat. No. 4,684,617 issued August 4, 1987) | | |
| 49,274 (C) | May 13, 1987 | TiAPSO |
| 600,180 | April 13, 1984 | MgAPSO |
| 600,175 | April 13, 1984 | MnAPSO |
| (now U.S. Pat. No. 4,686,092 issued August 11, 1987) | | |
| 600,174 | April 13, 1984 | CoAPSO |
| 600,170 | April 13, 1984 | ZnAPSO |
| 600,173 | April 13, 1984 | FeAPSO |
| (now U.S. Pat. No. 4,683,217 issued July 28, 1987) | | |
| 600,168 (A) | April 13, 1984 | QuinAPSO |
| 63,791 (C) | June 23, 1987 | QuinAPSO |
| 600,181 | April 13, 1984 | QuinAPSO |
| 600,182 | April 13, 1984 | CoMnMgAPSO |
| 57,648 (C) | June 9, 1987 | CoMnMgAPSO |
| 600,183 | April 13, 1984 | SenAPSO |

1984 1986

The aforementioned applications and patents are incorporated herein by reference thereto. The nomenclature employed herein to refer to the members of the aforementioned NZMS's is consistent with that employed in the aforementioned applications or patents. A particular member of a class is generally referred to as a "-n" species wherein "n" is an integer, e.g., SAPO-11, MeAPO-11 and ELAPSO-31.

Because the non-zeolitic molecular sieves which can be produced by the process of the present invention comprise such a large number of aluminophosphates and silicoaluminophosphates having a variety of crystal structures, which may include one or ore other elements in addition to aluminum, phosphorus and (in the case of the silicoaluminophosphates) silicon, the manner in which these non-zeolitic molecular sieves are produced by the process of the present invention will first be described, and thereafter the chemical nature of the non-zeolitic molecular sieves will be described.

PROCESS OF THE INVENTION

As already mentioned, in the process of the present invention a body of alumina or silica-alumina (which may optionally contain reactive sources of one or more other elements desired in the non-zeolitic molecular sieve) is contacted with a liquid reaction mixture containing a reactive source of phosphorus pentoxide and an organic templating agent (and optionally reactive sources of one or more other elements desired in the non-zeolitic molecular sieve), thereby causing the body to react with the liquid reaction mixture and to form crystals of the non-zeolitic molecular sieve within the body of alumina or silica-alumina. In this process, the alumina or silica-alumina in the body reacts with the phosphorus in the liquid reaction mixture to produce the aluminophosphate or silicoaluminophosphate framework structure of the non-zeolitic molecular sieve within the preformed body of alumina or silica-alumina.

If one or more elements (other than aluminum, phosphorus, silicon and oxygen) capable of being incorporated into this framework are present in the body or in the liquid reaction mixture, these elements will normally enter into the aluminophosphate or silicoaluminophosphate framework, although the amount of such elements entering the framework will of course vary with the amounts of such elements present, the reactivity of the form of the element employed, and the ease of incorporation of such elements into the framework. If such elements are desired in the non-zeolitic molecular sieve product, they are desirably included in the liquid reaction mixture.

In the process of the present invention, the solid body contains alumina (and optionally silica), while the liquid reaction mixture contains a source of phosphorus pentoxide. However, silica may be included in the liquid reaction mixture, either in addition to or in place of silica in the solid body, while the solid body may contain a source of phosphorus pentoxide in addition to that present in the liquid reaction mixture. Although the optimum distribution of silica between the solid body and the solution may vary with a number of factors, including the exact silica source employed, the other components of the reaction mixture, etc., in general incorporation of the silica into the solid body is favored.

The alumina or silica-alumina in the body use in the process of the present invention is desirably in an amorphous or poorly crystalline form, since the presence of strongly crystalline alumina or silica-alumina may tend to hinder the formation of the desired crystal form of the non-zeolitic molecular sieve, or even to prevent the formation of this desired form. In order to ensure that the alumina or silica-alumina is in an amorphous or poorly crystalline form, it is desirable that the alumina or silica-alumina be calcined prior to its use in the process of the present invention. Not only does such calcination ensure that the alumina or silica-alumina is in an amorphous or poorly crystalline form, but it also changes the reactivity and accessability of the alumina or silica-alumina, and hence accelerates the reaction of the alumina or silica-alumina with the liquid reaction mixture, and also helps to improve the integrity of the solid body. The optimum calcination temperatures for the alumina or silica-alumina used in the process of the present invention are somewhat lower than those typically used when preparing zeolites from preformed bodies of clay by the prior art processes described above; in general, the preferred calcination temperatures for the alumina or silica-alumina are in the range of from about 250° to about 750° C., although the optimum calcination temperature will vary with the specific alumina or silica-alumina employed.

The body of alumina or silica-alumina used in the process of the present invention may have a variety of physical forms. The body may be in the form of small particles. However, in order to facilitate the separation of the non-zeolitic molecular sieve from the liquid reaction mixture after completion of the reaction, and to prepare the non-zeolitic molecular sieve in the form of large particles, it is very much preferred that the alumina or silica-alumina body be a relatively massive body, typically one having a minimum dimension of at least about 0.5 mm. (Effective filtration and washing of the solid product can of course be effected on much smaller particles, such as particles having a diameter of about 60 micrometers, which can be achieved by using spray-dried alumina or silica-alumina bodies in the process of the present invention, as discussed in more detail below.) The body may be shaped into many forms, for example, spheres, microspheres, pellets, beads, tablets, cylinders, disks, granules, cubes or blocks. Suitable shaping techniques for forming such bodies are conventional and include extruding, spray drying, prilling, molding, casting, slip-casting, tableting, briquetting and bead forming processes such as tumbling, drum rolling, Nauta mixing and disk forming. The preferred methods are extrusion, spray drying, prilling and bead forming processes, with extrusion being a particularly preferred technique.

When the body is to be formed by extrusion or similar techniques, the first step in its formation is normally the formation of a suspension or paste of alumina (and optionally other ingredients) in a liquid dispersion medium. A variety of techniques may be used to form such a suspension or paste; for example, the suspension or paste may be formed by hydrolyzing an aluminum alkoxide or by peptizing alumina in acid, followed by substantial neutralization of the remaining acid. Alternatively, it may suffice to simply mix the alumina and any other ingredients with water under appropriate agitation, preferably after first grinding or mulling the ingredients to produce them in a finely divided form. The amount of water added should be sufficient to permit formation of shaped bodies from the resultant paste. For most shaping methods the solids content will range from about fifty percent (50%) to about sixty-five percent (65%) by weight of the mixture. The water content will generally range from about 35% to about 45% by weight of the mixture, and preferably about 38% to about 42% by weight.

The size of the body may be varied not only by the size of die or other shaping instrument used but also by controlling the composition of the mixture to be shaped and the method of shaping. Typical body sizes range from about 0.4 to about 7 mm. in diameter if the particle is approximately spherical or cylindrical in form. Smaller bodies, often as small as about fifty (50) to about ninety (90) microns in average diameter, result if they are shaped by some spray drying and prilling techniques.

Once shaped, the bodies are ready for calcination. Prior to this step, however, they may optionally be dried at a temperature of about 50° to about 150° C. for about 0.5 to 36 hours. In the interest of time and expense, however, calcination is generally done immediately after shaping. The drying and/or calcination serves to remove at least part of the liquid dispersion medium added to the alumina or silica-alumina prior to the extrusion or other shaping of the body.

The alumina in the alumina or silica-alumina body may be in any form which is sufficiently reactive to react with the liquid reaction mixture; thus, for example, most of the forms of alumina used in the zeolite synthesis processes described above may also be used in the process of the present invention. The preferred forms of alumina include boehmite and pseudoboehmite.

When the body is to contain silica, almost any reactive silicon source may be employed such that $SiO_2$ tetrahedral units are formed in situ. The silicon source may be silica in the form of a silica sol, may be a fumed silica or may be other conventional sources of silica used in zeolite synthesis such as reactive solid amorphous precipitated silicas, silica gel, alkoxides of silicon, tetraalkyl orthosilicates (for example, tetraethyl orthosilicate), silicic acid, alkali metal silicates and the like. Preferred silica sources are colloidal silica and silica sols. Also, when the body is to contain silica, an aluminosilicate clay, such as a kaolin, may be used as a source of both silica and alumina, although it should be noted that in some cases the use of an aluminosilicate clay may be disadvantageous because silica from such clays may not be readily available for incorporation into the non-zeolitic molecular sieve, if the calcination temperature employed is inappropriate.

When the alumina or silica-alumina body is to contain one or more elements other than aluminum, silicon and oxygen for incorporation into the non-zeolitic molecular sieve, the other element(s) may be in the form of the compounds of such elements discussed below, subject to the proviso that the other elements should not be present in a form which significantly interferes with the formation of the alumina or silica-alumina body.

The liquid reaction mixture used in the process of the present invention comprises a reactive source of phosphorus. The reactive phosphorus source is preferably orthophosphoric acid or a salt thereof, and desirably the liquid reaction mixture comprises an aqueous solution of orthophosphoric acid or a salt thereof. Organic phosphates such as triethyl phosphate may also be employed. Organophosphorus compounds, such as tetrabutylphosphonium bromide, do not, apparently, serve as reactive sources of phosphorus, but these compounds do function as templating agents. Conventional phosphorus salts, such as sodium metaphosphate, may be used, at least in part, as the phosphorus source, but are not preferred.

The liquid reaction mixture used in the process of the present invention also contains an organic templating agent. This organic templating agent can be any of those heretofore proposed for use in the synthesis of conventional zeolite aluminosilicates or NZMS's. In general these compounds contain elements of Group VA of the Periodic Table of Elements, particularly nitrogen, phosphorus, arsenic and antimony, preferably nitrogen or phosphorus and most preferably nitrogen, which compounds also contain at least one alkyl or aryl group having from 1 to 8 carbon atoms. Particularly preferred compounds for use as templating agents are the amines, quaternary phosphonium and quaternary ammonium compounds, the latter two being represented generally by the formula $R_4X^+$ wherein "X" is phosphorus or nitrogen and each R is an alkyl or aryl group containing from 1 to 8 carbon atoms. Polymeric quaternary ammonium salts such as $[(C_{14}H_{32}N_2)(OH)_2]_x$ wherein x has a value of at least 2 are also suitably employed. The mono-, di- and triamines are advantageously utilized, either alone or in combination with a quaternary ammonium compound or other templating compound. Mixtures of two or more templating agents can either produce mixtures of the desired non-zeolitic molecular sieves or the more strongly directing templating species may control the course of the reaction with the other templating species serving primarily to establish the pH conditions of the reaction gel. Representative templating agents include tetramethylammonium, tetraethylammonium, tetrapropylammonium and tetrabutylammonium ions; tetrapentylammmonium ion; di-n-propylamine; tripropylamine; triethylamine; triethanolamine; piperidine; cyclohexylamine; 2-methylpyridine; N,N-dimethylbenzylamine; N,N-diethylethanolamine; dicyclohexylamine; N,N-dimethylethanolamine; choline; N,N-dimethylpiperazine; 1,4-diazabicyclo-(2,2,2)-octane; N-methyldiethanolamine; N-methylethanolamine; N-methylpiperiine; 3-methylpiperidine; N-methylcyclohexylamine; 3-methylpyridine; 4-methylpyridine; quinuclidine; N,N'-dimethyl-1,4-diazabicyclo-(2,2,2)-octane ion; di-n-butylamine; neopentylamine; di-n-pentylamine; isopropylamine; t-butylamine; ethylenediamine; pyrrolidine; and 2-imidazolidone. Not every templating agent will direct the formation of every species of non-zeolitic molecular sieve but a single templating agent can, with proper manipulation of the reaction conditions, direct the formation of several non-zeolitic molecular sieve compositions, and a given non-zeolitic molecular sieve composition can be produced using several different templating agents.

When the liquid reaction mixture is to contain a source of silica, this source of silica may be any of those silica sources already mentioned for use in the silica-alumina body provided that the silica source is capable of being dissolved and/or dispersed in the liquid reaction mixture. Preferred silica sources for use in the liquid reaction mixture are silica sols.

When the liquid reaction mixture is to contain a source of one or more elements other than phosphorus, silicon and oxygen for incorporation into the non-zeolitic molecular sieve, the other element(s) may be introduced into the liquid reaction mixture in any form which permits the formation in situ of a reactive form of the desired elements, i.e., a form reactive to form the framework tetrahedral oxide unit of the elements present in the non-zeolitic molecular sieve. Compounds of the elements which may be employed include oxides, alkoxides, hydroxides, chlorides, bromides, iodides, sulfates, nitrates, carboxylates (e.g., acetates) and the like. Especially preferred sources of various elements are discussed in the description of the various groups of non-zeolitic molecular sieves given below.

Similarly, when the solid body is to contain a source of phosphorus, this source of phosphorus may be any of those phosphorus sources already mentioned for use in the liquid reaction mixture provided that the phosphorus source is capable of being incorporated into the solid body without interfering with the process of the present invention. Those skilled in the art will also be aware of other, sparingly-soluble phosphorus sources which may be usable in the solid body.

The proportions of the various components in the liquid reaction mixture, and the ratios of these components to the alumina (and optionally silica an other elements) present in the solid body, affect, inter alia, the rate at which the process of the present invention progresses and the yield and composition of the non-zeolitic molecular sieve produced. In general, the proportions of the various components of the reaction mixture (including the body) used in the process of the present invention are similar to those used in the hydrothermal crystallization processes described in the aforementioned patents and pending patent applications describing non-zeolitic molecular sieves, although in the case of components present in the solid body allowance may have to be made for the possibility of incomplete reaction or conversion of such components, especially if the solid body is formed from clay. Thus, in synthesizing non-zeolitic molecular sieves by the process of the present invention, it is preferred to employ a liquid reaction mixture comprising not more than about 6, and desirably not more than about 2, moles of the organic templating agent per mole of phosphorus. Preferably, the liquid reaction mixture contains not more than 500, desirably not more than about 100, and most desirably not more than about 50, moles of water per mole of phosphorus. When the liquid reaction mixture contains silica, the liquid reaction mixture desirably contains from about 0.1 to about 0.5 moles of silicon per mole of phosphorus.

The proportions of elements other than phosphorus, silicon and oxygen, intended for incorporation into the non-zeolitic molecular sieve, to be included in the liquid reaction mixture will vary both with the proportion of such elements desired in the non-zeolitic molecular sieve to be produced and the ease with which such elements enter the crystal framework of the non-zeolitic molecular sieve. General guidance concerning th appropriate proportions of individual elements to be included in the liquid reaction mixture is given in the description of the various groups of non-zeolitic molecular sieves below.

The weight ratio of the body to the liquid reaction mixture is desirably adjusted so that the body comprises from about 0.75 to about 1.25 moles of aluminum per mole of phosphorus in the liquid reaction mixture.

In those cases in which an alkoxide is employed as the source of aluminum, phosphorus, silicon, or other elements desired in the non-zeolitic molecular sieve, the corresponding alcohol is necessarily present in the reaction mixture since it is a hydrolysis product of the alkoxide. It has not been determined whether this alcohol participates in the synthesis process as a templating agent. For the purposes of this application, however, this alcohol is arbitrarily omitted from the class of templating agents, even if it is present in the as-synthesized non-zeolitic molecular sieve.

In general, the liquid reaction mixture used in the process of the present invention is prepared by forming mixtures of less than all of the reagents and thereafter incorporating into these mixtures additional reagents either singly or in the form of other intermediate mixtures of two or more reagents. In some instances the reagents admixed retain their identity in the intermediate mixture and in other cases some or all of the reagents are involved in chemical reactions to produce new reagents. The term "mixture" is applied in both cases. Furthermore, it is preferred that the intermediate mixtures as well as the final reaction mixtures be stirred until substantially homogeneous.

In the process of the present invention, the reaction mixture is generally placed in a sealed pressure vessel, preferably lined with an inert plastic material such as polytetrafluoroethylene (to avoid contamination of the reaction mixture) and heated, preferably under autogenous pressure, at a temperature between 100° C. and 300° C., and preferably between 150° C. and 250° C., until crystals of the non-zeolitic molecular sieve product are obtained, usually for a period of from several hours to several weeks. Effective crystallization times of from about 2 hours to about 30 days are generally employed with from about 24 to about 240 hours, and preferably about 48 hours to about 144 hours, being typically employed.

While not essential to the synthesis of the non-zeolitic molecular sieve compositions, stirring or other moderate agitation of the reaction mixture and/or seeding the reaction mixture with seed crystals of either the non-zeolitic molecular sieve species to be produced or a topologically similar aluminophosphate, aluminosilicate or molecular sieve composition, facilitates the crystallization procedure. The product is recovered by any convenient method such as centrifugation or filtration.

It is one significant advantage of the process of the present invention that this process is capable of producing the non-zeolitic molecular sieve product in a form having a considerably larger average particle size than that of the non-zeolitic molecular sieve produced by the hydrothermal crystallization processes for the synthesis of non-zeolitic molecular sieves described in the relevant patents and copending applications mentioned above. Optimally, the non-zeolitic molecular sieve is produced as a single solid body having substantially the same size and shape as the alumina or silica-alumina body used in the synthesis. Even though this optimum result is not usually obtained, and some fragmentation of the alumina or silica-alumina body may occur, the non-zeolitic molecular sieve is still produced in a form having a considerably larger average particle size than that of the non-zeolitic molecular sieves produced by the aforementioned hydrothermal crystallization processes. Whereas these hydrothermal crystallization processes typically produce particles of non-zeolitic molecular sieves having average particle sizes in the submicron range, the process of the present invention usually produces a product having an average particle size of at least about 10 microns, and preferably from about 20 to about 40 microns or more.

After crystallization the non-zeolitic molecular sieve product may be isolated and advantageously washed with water and dried in air. The as-synthesized non-zeolitic molecular sieve generally contains within its internal pore system at least one form of the templating agent employed in its formation. Most commonly the organic moiety derived from an organic template is present, at least in part, as a charge-balancing cation as is generally the case with as-synthesized aluminosilicate zeolites prepared from organic-containing reaction systems. It is possible, however, that some or all of the organic moiety is an occluded molecular species in a particular non-zeolitic molecular sieve species. As a general rule the templating agent, and hence the occluded organic species, is too large to move freely through the pore system of the non-zeolitic molecular sieve product and must be removed by calcining the non-zeolitic molecular sieve at temperatures of 200° C. to 700° C., and preferably 350° C. to 600° C., to thermally degrade the organic species. In a few instances the pores of the non-zeolitic molecular sieve product are sufficiently large to permit transport of the templating agent, particularly if the latter is a small molecule, and accordingly complete or partial removal thereof can be accomplished by conventional desorption procedures such as are carried out in the case of zeolites. It will be understood that the term "as-synthesized" as used herein does not include the condition of the non-zeolitic molecular sieve phase wherein the organic moiety occupying the intracrystalline pore system as a result of the synthesis process has been reduced by post-synthesis treatment such that less than 0.02 moles of templating agent are present in the intracrystalline pore system per two gram atoms of oxygen present therein.

The non-zeolitic molecular sieve compositions produced by the process of the present invention may exhibit cation-exchange capacity when analyzed using ion-exchange techniques heretofore employed with zeolitic aluminosilicates and have pore diameters which are inherent in the lattice structure of each species and which are at least about 3 Å in diameter. Ion exchange of non-zeolitic molecular sieve compositions is ordinarily possible only after the organic moiety present as a result of synthesis has been removed from the pore system. Dehydration to remove water present in the as-synthesized non-zeolitic molecular sieve compositions can usually be accomplished, to some degree at least, in the usual manner without removal of the organic moiety, but the absence of the organic species greatly facilitates adsorption and desorption procedures. The non-zeolitic molecular sieve materials have various degrees of hydrothermal and thermal stability, some being quite remarkable in this regard, and will function as molecular sieve adsorbents and hydrocarbon conversion catalysts or catalyst bases.

As is well known to those familiar with the use of molecular sieves as catalysts, the reaction rate of a molecular sieve-catalyzed reaction is often strongly influenced by the pore size of the molecular sieve, since the catalytic activity of molecular sieves appears to depend upon the ability of the reactants and products to diffuse through the pores of the molecular sieve. The pore sizes of the non-zeolitic molecular sieves produced by the process of the present invention vary over a wide range, and on the basis of pore size, the non-zeolitic molecular sieves may be divided into small, medium and large pore materials. The small pore materials are those having, in their calcined form, an adsorption of isobutane of less than about 2 percent by weight of the non-zeolitic molecular sieve at a partial pressure of 500 torr and a temperature of 20° C. The medium pore materials are those having, in their calcined form, an adsorption of isobutane of at least about 2 percent, and preferably at least about 4 percent, by weight of the non-zeolitic molecular sieve at a partial pressure of 500 torr and a temperature of 20° C., and an adsorption of triethylamine of less than 5 percent by weight of the non-zeolitic molecular sieve at a partial pressure of 2.6 torr and a temperature of 22° C. The large pore materials are those having, in their calcined form, an adsorption of isobutane of at least about 2 percent, and an adsorption of triethylamine of at least 5 percent, by weight of the non-zeolitic molecular sieve at a partial pressure of 2.6 torr and a temperature of 22° C. An adsorption of isobutane of at least about 2 percent by weight of the non-zeolitic molecular sieve at a partial pressure of 500 torr and a temperature of 20° C. corresponds to a minimum pore size of approximately 5 Å, while an adsorption of triethylamine of less than 5 percent by weight of the non-zeolitic molecular sieve at a partial pressure of 2.6 torr and a temperature of 22° C. corresponds to a maximum pore size of approximately 7 Å.

In most of the catalytic processes in which the NZMS's produced by the process of the present invention are employed, medium and large pore materials are preferred since such medium and large pore non-zeolitic molecular sieves have pores sufficiently large to permit proper diffusion of all molecular species involved in the reaction. Accordingly, in a preferred form of the process of the present invention, the NZMS produced is a medium or large pore material. Medium and large pore NZMS's include, but are not limited to, ELAPSO-5, ELAPSO-11, ELAPSO-31, ELAPSO-36, ELAPSO-37, ELAPSO-40, ELAPSO-41, SAPO-5, SAPO-11, SAPO-31, SAPO-36, SAPO-37, SAPO-40, SAPO-41, CoAPSO-5, CoAPSO-11, CoAPSO-31, CoAPSO-36, CoAPSO-37, CoAPSO-40, CoAPSO-41, FeAPSO-5, FeAPSO-11, FeAPSO-31, FeAPSO-36, FeAPSO-37, FeAPSO-40, FeAPSO-41, MgAPSO-5, MgAPSO-11, MgAPSO-31, MgAPSO-36, MgAPSO-37, MgAPSO-40, MgAPSO-41, MnAPSO-5, MnAPSO-11, MnAPSO-31, MnAPSO-36, MnAPSO-37, MnAPSO-40, MnAPSO-41, TiAPSO-5, TiAPSO-11, TiAPSO-31, TiAPSO-36, TiAPSO-37, TiAPSO-40, TiAPSO-41, ZnAPSO-5, ZnAPSO-11, ZnAPSO-31, ZnAPSO-36, ZnAPSO-37, ZnAPSO-40, ZnAPSO-41, CoMnAPSO-5, CoMnAPSO-1, CoMnAPSO-36, CoMnAPSO-37, CoMnAPSO-40, CoMnAPSO-41, CoMnMgAPSO-5, CoMnMgAPSO-11, CoMnMgAPSO-31, CoMnMgAPSO-36, CoMnMgAPSO-37, CoMnMgAPSO-40, CoMnMgAPSO-41, AsAPSO-5, AsAPSO-11, AsAPSO-31, AsAPSO-36, AsAPSO-37, AsAPSO-40, AsAPSO-41, BAPSO-5, BAPSO-11, BAPSO-31, BAPSO-36, BAPSO-37, BAPSO-40, BAPSO-41, BeAPSO-5, BeAPSO-11, BeAPSO-31, BeAPSO-36, BeAPSO-37, BeAPSO-40, BeAPSO-4, CAPSO-5, CAPSO-11, CAPSO-31, CAPSO-36, CAPSO-37, CAPSO-40, CAPSO-41, GaAPSO-5, GaAPSO-11, GaAPSO-31, GaAPSO-36, GaAPSO-37, GaAPSO-40, GaAPSO-41, GeAPSO-5, GeAPSO-11, GeAPSO-31, GeAPSO-36, GeAPSO-37, GeAPSO-40, GeAPSO-41, LiAPSO-5, LiAPSO-11, LiAPSO-31, LiAPSO-36, LiAPSO-37, LiAPSO-40, LiAPSO-41, MeAPO-5, MeAPO-11, MeAPO-31, MeAPO-36, MeAPO-37, MeAPO-40, MeAPO-41, TiAPO-5, TiAPO-11, TiAPO-31, TiAPO-36, TiAPO-37, TiAPO-40, TiAPO-41, FCAPO-5, FCAPO-11, FCAPO-31, FCAPO-36, FCAPO-37, FCAPO-40, FCAPO-41, AsAPO-5, AsAPO-11, AsAPO-31, AsAPO-36, AsAPO-37, AsAPO-40, AsAPO-41, BAPO-5, BAPO-11, BAPO-31, BAPO-36, BAPO-37, BAPO-40, BAPO-41, BeAPO-5, BeAPO-II, BeAPO-31, BeAPO-36, BeAPO-37, BeAPO-40, BeAPO-41, CAPO-5, CAPO-11, CAPO-31, CAPO-36, CAPO-37, CAPO-40, CAPO-41, GaAPO-5, GaAPO-11, GaAPO-31, GaAPO-36, GaAPO-37, GaAPO-40, GaAPO-41, GeAPO-5, GeAPO-11, GeAPO-31, GeAPO-36, GeAPO-37, GeAPO-40, GeAPO-41, LiAPO-5, LiAPO-11, LiAPO-31, LiAPO-36, LiAPO-37, LiAPO-40, LiAPO-41, and the mixed-element APOs which may be designated MAPO-5, MAPO-11, MAPO-31, MAPO-36, MAPO-37, MAPO-40 and MAPO-41, and mixtures thereof.

The above characterization of the NZMS's employed in the instant invention relates to an adsorption characterization that is carried out on a NZMS which has been subjected to a post synthesis treatment, e.g., calcination or chemical treatment, to remove a substantial portion of the template, "R", which is present as a result of synthesis. Although a particular NZMS may be characterized herein by reference to its adsorption of isobutane in its calcined form, the instant invention necessarily synthesizes a non-calcined or modified NZMS which may be characterized by such adsorption in its calcined form, since upon use of such a non-calcined NZMS in various catalytic processes under effective process conditions the NZMS may be calcined or hydrothermally treated in situ so as to have the characteristic adsorption of isobutane. Thus, the NZMS may be converted in situ to a form characterized by the aforementioned adsorption characteristics. For example, an as-synthesized MgAPO-11 or MgAPSO-11 may not be characterized by the aforementioned adsorption of isobutane due to the presence of template "R" which is present as a result of synthesis, although the calcined form of MgAPO-11 and MgAPSO-11 will be characterized by the aforementioned adsorption of isobutane. Thus, in this application, reference to a NZMS having a particular adsorption characteristic in its calcined or anhydrous form is not intended to exclude the use of this NZMS in its as-synthesized form which upon in-situ calcination, hydrothermal treatment and/or other treatment, e.g., ion exchange with suitable ions, would have such adsorption characteristics.

As explained in the aforementioned patents and applications describing non-zeolitic molecular sieves, the non-zeolitic molecular sieves may be characterized by their X-ray powder diffraction patterns, i.e., the various crystal forms of each non-zeolitic molecular sieve, for example SAPO-11, SAPO-34, SAPO-41, etc., may be identified and distinguished from one another by their X-ray powder diffraction patterns. Since some of the non-zeolitic molecular sieves produced in the Examples below are thus characterized, the following explanation is given of the manner in which these X-ray powder diffraction patterns are obtained.

X-Ray patterns of reaction products are obtained by X-ray analysis, using standard X-ray powder diffraction techniques. The radiation source is a high-intensity X-ray tube with a copper target operated at 50 Kv and 40 ma. The diffraction pattern from the copper K-alpha radiation and graphite monochromator is suitably recorded by an X-ray spectrometer scintillation counter, pulse height analyzer and strip chart recorder. Flat compressed powder samples are scanned at 2° (2 theta) per minute, using a two second time constant. Interplanar spacings (d) in Angstrom units are obtained from the position of the diffraction peaks expressed as $2\theta$, where $\theta$ is the Bragg angle, as observed on the strip chart. Intensities were determined from the heights or areas of diffraction peaks after subtracting background, "$I_o$" being the intensity of the strongest line or peak, and "I" being the intensity of each of the other peaks. Alternatively, the X-ray patterns may be obtained by use of computer-based techniques using copper K-alpha radiation, Siemens type K-805 X-ray sources and Siemens D-500 X-ray powder diffractometers available from Siemens Corporation, Cherry Hill, N.J.

A will be understood by those skilled in the art, the determination of the parameter 2 theta is subject to both human and mechanical error, which in combination can impose an uncertainty of about $\pm 0.4°$ on each reported value of 2 theta. This uncertainty is, of course, also manifested in the reported values of the d-spacings, which are calculated from the 2 theta values. This imprecision is general throughout the art and is not sufficient to preclude the differentiation of the non-zeolitic molecular sieves from each other and from the compositions of the prior art.

In certain instances hereinafter in the illustrative examples, the purity of a synthesized non-zeolitic molecular sieve product may be assessed with reference to its X-ray powder diffraction pattern. Thus, for example, if a sample is stated to be pure, it is intended only to mean that the X-ray pattern of the sample is free of lines attributable to crystalline impurities, not that there are no amorphous materials present.

In the illustrative examples below, when the non-zeolitic molecular sieves produced by the process of the present invention are characterized by their X-ray powder diffraction patterns, these X-ray patterns are for the as-synthesized form unless otherwise noted. In most cases, the pattern of the corresponding calcined form will also fall within the relevant table. However, in some cases the removal of the occluded templating agent which occurs during calcination will be accompanied by sufficient relaxation of the lattice to shift some of the lines slightly outside the ranges specified in the relevant table. In a small number of cases, calcination appears to cause more substantial distortion in the crystal lattice, and hence, more significant changes in the X-ray powder diffraction pattern.

After synthesis and (optionally) calcination, a non-zeolitic molecular sieve produced by the process of the present invention may be modified by depositing or impregnating the non-zeolitic molecular sieve with cations, anions or salts so as to improve its efficacy as a catalyst in the various processes in which nonzeolitic molecular sieves are useful, as described in the aforementioned patents and applications describing non-zeolitic molecular sieves. Techniques which may be employed to effect the deposition or impregnation of a non-zeolitic molecular sieve are generally known in the art. Such procedures may involve (1) impregnating the non-zeolitic molecular sieve with a solution comprising a solvent or solubilizing agent of one or more such modifying materials in an amount sufficient to deposit the desired weight of such materials in the non-zeolitic molecular sieve and/or (2) exchanging the non-zeolitic molecular sieve with a solution containing the modifying material. The impregnation or deposition of the modifying materials may generally be accomplished by heating the non-zeolitic molecular sieve at an elevated temperature to evaporate any liquid present to effect deposition or impregnation of the modifying material on to the interior and/or exterior surface of the nonzeolitic molecular sieve, or by the exchange of cations present in the non-zeolitic molecular sieve with cations that provide for the desired properties. Alternatively, the modifying material may be formed on the non-zeolitic molecular sieve from an emulsion or slurry containing the modifying material by heating the non-zeolitic molecular sieve. Impregnation or exchange procedures are generally the preferred techniques because they utilize and introduce the modifying material more efficiently than other procedures such as coating procedures, since a coating procedure is generally not able to effect substantial introduction of the modifying material on to the interior surfaces of the nonzeolitic molecular sieve. In addition, coated materials are more generally susceptible to the loss of the modifying materials by abrasion.

Suitable modifying materials include alkali metals, alkaline earth metals, transition metals and the salts thereof, including inorganic and organic salts such as nitrates, halides, hydroxides, sulfates and carboxylates. Other modifying materials generally employed in the art are also believed to be employable in th non-zeolitic molecular sieves.

The non-zeolitic molecular sieves may be admixed (blended) or provided sequentially to other materials which may provide some property which is beneficial under certain process conditions, such as improved temperature resistance or improved catalyst life by minimization of coking, or which are simply inert under the process conditions used. Such materials may include synthetic or naturally-occurring substances as well as inorganic materials such as clays, silicas, aluminas, crystalline aluminosilicate zeolites, metal oxides and mixtures thereof. In addition, the non-zeolitic molecular sieves may be formed with materials such as silica, alumina, silica-alumina, silica-magnesia, silica-zirconia, silica-thoria, silica-berylia, and silica-titania, as well as ternary compositions, such as silica-alumina-thoria, silica-alumina-zirconia and clays present as binders. The relative proportions of the above materials and the non-zeolitic molecular sieves may vary widely with the non-zeolitic molecular sieve content ranging between about 1 and about 99 percent by weight of the composite.

The foregoing general description of the process of the present invention is applicable to its use in synthesizing all the non-zeolitic molecular sieves described in the aforementioned patents and applications describing such materials. The following more specific description details preferred variants of the process of the present invention for the synthesis of certain preferred groups of non-zeolitic molecular sieves.

One preferred group of non-zeolitic molecular sieves to be produced by the process of the present invention is the aluminophosphates ($AlPO_4$'s) claimed in U.S. Pat. No. 4,310,440, especially $AlPO_4$-5. The preferred organic templating agents for the synthesis of the $AlPO_4$'s are tetraethylammonium hydroxide, tetrapropylammonium hydroxide, diethylethanolamine and tripropylamine. The particularly preferred organic templating agent for this synthesis is a mixture of tetraethylammonium hydroxide and tripropylamine, with the liquid reaction mixture containing from about 0.1 to about 0.4 moles of tetraethylammonium hydroxide and from about 0.5 to about 2 moles of tripropylamine per mole of phosphorus. In this synthesis, the body of alumina is preferably contacted with the liquid reaction mixture at a temperature in the range of from about 100° to about 200° C. for a period of from about 12 to about 72 hours.

A second preferred group of non-zeolitic molecular sieves to be produced by the process of the present invention is the silicoaluminophosphates (SAPO's) claimed in U.S. Pat. No. 4,440,871, desirably SAPO-5, SAPO-11, SAPO-34 and SAPO-41, and most desirably SAPO-34. The preferred organic templating agents for the synthesis of SAPO's are tetraethylammonium hydroxide, diethanolamine and di-n-propylamine. The particularly preferred organic templating agent for this synthesis is a mixture of diethanolamine and di-npropylamine, with the liquid reaction mixture containing from about 0.5 to about 2 moles of diethanolamine and from about 0 1 to about 0.5 moles of di-n-propylamine per mole of phosphorus. In this synthesis the body of alumina or silica-alumina is desirably calcined at a temperature of from about 250° to about 450° C. prior to being contacted with the liquid reaction mixture. Also in this synthesis, the body of alumina or silica-alumina is desirably contacted with the liquid reaction mixture at a temperature in the range of from about 150° to about 250° C. for a period of from about 48 to about 144 hours.

Certain of the Examples below also illustrate the synthesis, by the process of the present invention of certain GeAPO and GeAPSO non-zeolitic molecular sieves claimed in the aforementioned copending applications Ser. Nos. 841,758 and 852,175 respectively.

The following Examples are provided to further illustrate the process of the present invention, but are not limitative thereof.

EXAMPLES

The following Examples illustrate the synthesis of $AlPO_4$-5, SAPO-5, SAPO-11, SAPO-34, SAPO-41, CoAPSO-34, GeAPO-5, GeAPO-17 and GeAPSO-34 by the process of the present invention. The characteristic X-ray table for $AlPO_4$-5 is given in U.S. Pat. No. 4,310,440 at Table 2 in column 8. The characteristic X-ray tables for SAPO-5, SAPO-11, SAPO-34 and SAPO-41 are given in U.S. Pat. No. 4,440,871 at Tables I, III, XI and XXV in columns 20, 27, 44 and 69 respectively. The characteristic X-ray tables for the remaining species prepared in these Examples are as follows:

| 2θ | d (Å) | Relative Intensity |
|---|---|---|
| | CoAPSO-34 | |
| 9.4–9.8 | 9.41–9.03 | s–vs |
| 12.86–13.06 | 6.86–6.76 | w |
| 14.08–14.30 | 6.28–6.19 | w–m |
| 15.90–16.20 | 5.57–5.47 | vw–m |
| 20.60–20.83 | 4.31–4.26 | w–vs |
| 30.50–30.80 | 2.931–2.903 | w–m |
| | GeAPO-5 | |
| 7.3–7.65 | 12.1–11.56 | m–vs |
| 19.5–19.95 | 4.55–4.46 | m–s |
| 20.9–21.3 | 4.25–4.17 | m–vs |
| 22.2–22.6 | 4.00–3.93 | w–vs |
| 25.7–26.15 | 3.47–3.40 | w–m |
| | GeAPO-17 | |
| 7.7–7.75 | 11.5–11.4 | vs |
| 13.4 | 6.61 | s–vs |
| 15.5–15.55 | 5.75–5.70 | s |
| 20.5–20.6 | 4.33–4.31 | vs |
| 31.8–32.00 | 2.812–2.797 | w–s |
| | GeAPSO-34 | |
| 9.3–9.8 | 9.51–9.03 | m–vs |
| 12.6–13.2 | 7.03–6.71 | w–m |
| 15.8–16.3 | 5.61–5.44 | vw–m |
| 20.25–21.2 | 4.39–4.19 | w–vs |
| 24.8–25.4 | 3.59–3.507 | vw–m |
| 30.0–30.9 | 2.979–2.894 | vw–m |

EXAMPLES 1–12

These Examples illustrate the formation of alumina and silica-alumina bodies useful in the process of the present invention.

EXAMPLE 1

395.4 Grams of aluminum isopropoxide (containing 25.8 percent by wt. of $Al_2O_3$) were placed in the mixing bowl of a Hobart mixer, sufficient water was added to make an extrudable paste, and the mixture was mixed until a substantially homogeneous paste was formed. This paste was extruded using a domestic kitchen meat grinder attachment fitted with a ⅛ inch (approximately 3 mm.) die, thereby forming extruded alumina precursor cylinders ⅛ inch in diameter. These extruded cylinders were air-dried for several days and were then heated in air to 350° C. for 2.5 hours. The moisture content of the resultant alumina bodies was less than 1 wt. percent.

EXAMPLE 2

400 Grams of hydrated aluminum oxide in the form of a boehmite phase containing 75.1 wt. percent of $Al_2O_3$ and 24.9 wt. percent of $H_2O$ were peptized with 287.0 grams of a 2.1 wt. percent nitric acid solution in the mixing bowl of a Hobart mixer. The peptized alumina thus prepared was mixed for 20 minutes and 120 grams of a 2.0 wt. percent ammonium hydroxide solution were added. The resultant paste was extruded in the same way as in Example 1 above, and the extruded cylinders were oven-dried at 100° C. for 5 hours and were then heated in air at 350° C. for 2.5 hours. The moisture content of the resultant alumina bodies was less than 1 wt. percent.

EXAMPLE 3

Approximately 2 pounds (about 900 grams) of hydrated aluminum oxide in the form of a pseudoboehmite phase containing 69.0 wt. percent of $Al_2O_3$ and 31.0 wt. percent of $H_2O$ were placed in the mixing bowl of a Hobart mixer, sufficient water was added to make an extrudable paste, and the mixture was mixed until a substantially homogeneous paste was formed. The resultant paste was extruded in the same way as in Example 1 above, and the extruded cylinders were oven-dried at 100° C. for 16 hours. The oven-dried cylinders were divided into three portions, which were then heated in air for 2.5 hours at the following temperatures:

A—350° C.
B—400° C.
C—500° C.

EXAMPLE 4

240 Grams of hydrated aluminum oxide in the form of a pseudoboehmite phase containing 69.0 wt. percent of $Al_2O_3$ and 31.0 wt. percent of $H_2O$ were mixed with 76.2 grams of a colloidal silica containing 94.5 wt percent of $SiO_2$ to yield an alumina/silica mixture having a molar oxide ratio of 0.74 $SiO_2$:1.0 $Al_2O_3$. This alumina/silica mixture was blended dry in the mixing bowl of a Hobart mixer for approximately 10 minutes. To the blended mixture was added sufficient water to make an extrudable paste, and the mixture was mixed for a further 20 minutes until a substantially homogeneous paste was formed. The resultant paste was extruded in the same way as in Example 1 above, and the extruded cylinders were oven-dried at 100° C. for 16 hours. The oven-dried cylinders were divided into three portions, which were then heated in air for 2.5 hours at the following temperatures:

A—350° C.
B—400° C.
C—500° C.

EXAMPLE 5

240 Grams of hydrated aluminum oxide in the form of a pseudoboehmite phase containing 69.0 wt. percent of $Al_2O_3$ and 31.0 wt. percent of $H_2O$ were placed in the mixing bowl of a Hobart mixer together with 240 grams of a silica sol containing 30 wt. percent of $SiO_2$ and 70 wt. percent of $H_2O$ to yield an alumina/silica mixture having a molar oxide ratio of 0.74 $SiO_2$:1.0 $Al_2O_3$. This alumina/silica mixture was blended for approximately 10 minutes. To the blended mixture was added sufficient additional water to make an extrudable paste and the mixture was mixed for a further 20 minutes until a substantially homogeneous paste was formed. The resultant paste was extruded in the same way as in Example 1 above, and the extruded cylinders were oven-dried at 100° C. for 16 hours. The oven-dried cylinders were divided into three portions, which were then heated in air for 2.5 hours at the following temperatures:

A—350° C.
B—400° C.
C—500° C.

EXAMPLE 6

240 Grams of hydrated aluminum oxide in the form of a pseudoboehmite phase containing 69.0 wt. percent of $Al_2O_3$ and 31.0 wt. percent of $H_2O$ were blended dye in the mixing bowl of a Hobart mixer for approximately 10 minutes with 81.36 grams of a colloidal silica containing 88.5 wt. percent of $SiO_2$ to yield an alumina/silica mixture having a molar oxide ratio of 0.74$SiO_2$:1.0$Al_2O_3$. To the blended mixture sufficient water to make an extrudable paste, and the mixture was mixed for a further 20 minutes until a substantially homogeneous paste was formed. The resultant paste was extruded in the same way as in Example 1 above, and the extruded cylinders were oven-dried at 100° C. for 16 hours. The oven-dried cylinders were divided into three portions, which were then heated in air for 2.5 hours at the following temperatures:

A—350° C.
B—400° C.
C—500° C.

EXAMPLE 7

11 Pounds (approximately 4.9 kilograms) of hydrated aluminum oxide in the form of a pseudoboehmite phase containing 69.0 wt. percent of $Al_2O_3$ and 31.0 wt. percent of $H_2O$ were blended in a muller with approximately 5 liters of water for 30 minutes until a substantially homogeneous paste was formed. The resultant paste was extruded using a 5 inch (127 mm.) barrel extruder with a ⅛ inch (approximately 3 mm.) die and the extruded cylinders were oven-dried at 100° C. for 16 hours and were then heated in air at 350° C. for 2.5 hours. The moisture content of the resultant alumina bodies was less than 1 wt. percent.

EXAMPLE 8

1693 Grams of hydrated aluminum oxide in the form of a pseudoboehmite phase containing 69.0 wt. percent of $Al_2O_3$ and 31.0 wt. percent of $H_2O$ were blended dry in a muller for approximately 45 minutes with 577 grams of a colloidal silica containing 88.5 wt. percent of $SiO_2$ to yield an alumina/silica mixture having a molar oxide ratio of 0.74 $SiO_2$:1.0 $Al_2O_3$. To the blended mixture was added sufficient water to make an extrudable paste, and the mixture was mulled for a further 45 minutes until a substantially homogeneous paste was formed. The resultant paste was extruded in the same way as in Example 7 above, and the extruded cylinders were oven-dried at 100° C. for 16 hours and then heated in air at 350° C. for 2.5 hours. The moisture content of the resultant alumina/silica bodies was less than 1 wt. percent.

EXAMPLE 9

2196 Grams of hydrated aluminum oxide in the form of a pseudoboehmite phase containing 69.0 wt. percent of $Al_2O_3$ and 31.0 wt. percent of $H_2O$ were blended dry in a muller for approximately 45 minutes with 74.45 grams of a meta-kaolin clay containing 45.95 wt percent of $Al_2O_3$ and 54.05 wt. percent of $SiO_2$, and thus having a molar oxide ratio of $2SiO_2:Al_2O_3$. To the blended mixture was added sufficient water to make an extrudable paste, and the mixture was mulled for a further 45 minutes until a substantially homogeneous paste was formed. The resultant paste was extruded in the same way as in Example 7 above, and the extruded cylinders were oven-dried at 100° C. for 16 hours and then heated in air at 350° C. for 2.5 hours. The moisture content of the resultant alumina/silica bodies was less than 1 wt. percent.

EXAMPLE 10

551.68 Grams of kaolin clay having a molar oxide ratio of $2SiO_2:Al_2O_3:2H_2O$ were blended dry in a Hobart mixer for approximately 30 minutes with 29.94 grams of an attapulgite clay and 50.0 grams of a burnout mixture. To the blended mixture was added sufficient water to make an extrudable paste, and the mixture was mixed for a further 30 minutes until a substantially homogeneous paste was formed. The resultant paste was extruded in the same way as in Example 1 above, and the extruded cylinders were oven-dried at 100° C. for 24 hours and then heated with an air purge at 650° C. for 1.5 hours.

EXAMPLE 11

15 4585 Grams of hydrated aluminum oxide in the form of a pseudoboehmite phase containing 69.0 wt. percent of $Al_2O_3$ and 31.0 wt. percent of $H_2O$, 1207 grams of a colloidal silica containing 88.5 wt. percent of $SiO_2$, and 7.5 liters of distilled water were milled in a vibrating media mill for 15 minutes to produce a slurry. Separately, 9.00 kilograms of a sodium silicate solution containing 8.9 wt. percent of $Na_2O$ and 28.7 wt. percent of $SiO_2$ were mixed with 10.5 kilograms of a 10 wt. percent sulfuric acid solution and 1 2.5 liters of water to yield a silica sol containing approximately 8.0 wt. percent of $SiO_2$. 11.43 Kilograms of this silica sol was mixed with the slurry formed above until a substantially homogeneous mixture wa produced. The resultant mixture was spray dried in a Bowen spray dryer using a inlet temperature of approximately 1200° F. (approximately 649° C.) and an outlet temperature of approximately 300° F. (approximately 149° C.) to produce a spray-dried material having an average particle size of 60–70 microns. This spray-dried material was washed thoroughly with distilled water and then treated with 20 wt. percent ammonium hydroxide solution to effect ammonium ion exchange.

A sample of the ion-exchanged material was analyzed and the following chemical analysis obtained:

| Component | Weight percent |
|---|---|
| $Al_2O_3$ | 44.1 |
| $SiO_2$ | 31.2 |
| LOI* | 24.7 |

*LOI indicates loss on ignition.

The above chemical analysis corresponds to a product composition, in molar oxide ratios, of:

$$1.00Al_2O_3:1.21SiO_2:3.2H_2O.$$

EXAMPLE 12

3250 Grams of hydrated aluminum oxide in the form of a pseudoboehmite phase containing 69.0 wt. percent of $Al_2O_3$ and 31.0 wt. percent of $H_2O$ and 8 liters of distilled water were stirred together, then milled in a vibrating media mill for 15 minutes to produce a slurry. Following this milling, 1880 grams of an aqueous solution of aluminum hydroxychloride containing 23.4 wt. percent of $Al_2O_3$ were added and the resultant mixture mixed until a substantially homogeneous mixture was produced. The resultant mixture was spray dried in the same way as in Example 11 above. A sample of the resultant spray-dried material was analyzed and the following chemical analysis obtained:

| Component | Weight percent |
|---|---|
| $Al_2O_3$ | 80.8 |
| Cl | 2.9 |
| Moisture | 18.3. |

EXAMPLES 13–22

These Examples illustrate the synthesis of $AlPO_4$-5 by the process of the present invention.

EXAMPLE 13

A solution was formed by combining 23.1 grams of 85 wt. percent orthophosphoric acid ($H_3PO_4$) with 19.2 grams of water. To this solution were added 10.2 grams of the alumina extrudate prepared in Example 1 above, and the mixture was stirred. To the resultant mixture was added a solution of 36.8 grams of 40 wt. percent aqueous tetraethylammonium hydroxide (TEAOH) in 30.5 grams of water, and the resultant mixture was stirred briefly. The composition of the final reaction mixture thus produced, expressed in terms of the molar oxide ratios of the components of the reaction mixture, was:

$$1.0TEAOH:1.0\ Al_2O_3:1.0\ P_2O_5:40H_2O.$$

This final reaction mixture was digested by sealing it in a stainless steel pressure vessel lined with polytetrafluoroethylene and heating it in an oven at 150° C. under autogenous pressure for 16 hours. the solid bodies in the reaction mixture were recovered by filtration, washed thoroughly with water and dried in air at 100° C.

A sample of the dried solid reaction product was crushed, equilibrated at 50 percent relative humidity and subjected to X-ray powder diffraction analysis. This analysis showed that the major crystalline phase of the product (which contained only a minor amount of crystalline impurity) was $AlPO_4$-5 having an X-ray powder diffraction pattern, as synthesized, characterized by the data in the following Table I:

TABLE I

| $2\theta$ | d (Å) | Relative Intensity $100 \times I/I_o$ |
|---|---|---|
| 7.5 | 11.8 | 100 |
| 13.0 | 6.83 | 10 |
| 15.0 | 5.90 | 20 |
| 19.9 | 4.46 | 44 |
| 21.1 | 4.216 | 42 |
| 22.5 | 3.945 | 55 |
| 26.1 | 3.409 | 20 |
| 29.2 | 3.061 | 14 |
| 30.3 | 2.954 | 12 |

TABLE I-continued

| 2θ | d (Å) | Relative Intensity 100 × $I/I_o$ |
|---|---|---|
| 34.8 | 2.577 | 9 |
| 37.9 | 2.377 | 8 |

EXAMPLE 14

Example 13 was repeated except that the alumina extrudate employed was that prepared in Example 2 above. A crystalline product was prepared, and the major phase of this product was $AlPO_4$-5 having an X-ray powder diffraction pattern essentially identical to that set forth in Table I above.

EXAMPLE 15

Example 13 was repeated except that the alumina extrudate employed was from portion A prepared in Example 3 above. A crystalline product was prepared, and the major phase of this product was $AlPO_4$-5 having an X-ray powder diffraction pattern essentially identical to that set forth in Table I above.

EXAMPLE 16

A solution was formed by combining 11.55 grams of 85 wt. percent orthophosphoric acid ($H_3PO_4$) with 9.59 grams of water. To this solution were added 10.2 grams of the alumina extrudate prepared in Example 1 above, and the extrudate was soaked in the orthophosphoric acid solution for 24 hours at room temperature and under ambient conditions. To the resultant mixture was added a second solution formed by combining 11.6 grams of 85 wt. percent orthophosphoric acid ($H_3PO_4$) with 19.2 grams of water, and the mixture was stirred briefly. To the resultant mixture was added a third solution formed by combining 36.8 grams of 40 wt. percent aqueous tetraethylammonium hydroxide (TEAOH) with 27.3 grams of water, and the resultant mixture was stirred briefly. The composition of the final reaction mixture thus produced, expressed in terms of the molar oxide ratios of the components of the reaction mixture, was:

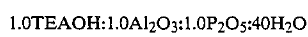

$$1.0TEAOH:1.0Al_2O_3:1.0P_2O_5:40H_2O$$

This final reaction mixture was digested by sealing it in a stainless steel pressure vessel lined with polytetrafluoroethylene and heating it in an oven at 150° C. under autogenous pressure for 16 hours. The solid bodies in the reaction mixture were recovered by filtration, washed thoroughly with water and dried in air at 100° C.

A sample of the dried solid reaction product was crushed, equilibrated at 50 percent relative humidity and subjected to X-ray powder diffraction analysis. This analysis showed that the major crystalline phase of the product (which was impure) was $AlPO_4$-5 having an X-ray powder diffraction pattern essentially identical to that set forth in Table I above.

EXAMPLE 17

A solution was formed by combining 23.1 grams of 85 wt. percent orthophosphoric acid ($H_3PO_4$) with 19.2 grams of water. To this solution were added 10.2 grams of the alumina extrudate from portion A prepared in Example 3 above, and the mixture was stirred. To the resultant mixture was added a solution of 51.0 grams of 40 wt. percent aqueous tetrapropylammonium hydroxide (TPAOH) in 27.3 grams of water, and the resultant mixture was stirred briefly. The composition of the final reaction mixture thus produced, expressed in terms of the molar oxide ratios of the components of the reaction mixture, was:

$$1.0TPAOH:1.0\ Al_2O_3:1.0P_2O_5:40H_2O.$$

This final reaction mixture was digested by sealing it in a stainless steel pressure vessel lined with polytetrafluoroethylene and heating it in an oven at 150° C. under autogenous pressure for 16 hours. The solid bodies in the reaction mixture were recovered by filtration, washed thoroughly with water and dried in air at 100° C.

A sample of the dried solid reaction product was crushed, equilibrated at 50 percent relative humidity and subjected to X-ray powder diffraction analysis. This analysis showed that the major crystalline phase of the product (which was impure) was $AlPO_4$-5 having an X-ray powder diffraction pattern, as synthesized, essentially identical to that set forth in Table I above.

EXAMPLE 18

Example 17 was repeated except that the solution of tetrapropylammonium hydroxide was replaced with a solution of 11.7 grams of diethylethanolamine in 49.3 grams of water. The molar ratio of templating agent to the other components of the reaction mixture was unchanged. A crystalline product was prepared, and the major phase of this product (which was impure) was $AlPO_4$-5 having an X-ray powder diffraction pattern essentially identical to that set forth in Table I above.

EXAMPLE 19

A solution was formed by combining 23.1 grams of 85 wt. percent orthophosphoric acid ($H_3PO_4$) with 19.2 grams of water. To this solution were added 12.0 grams of the alumina extrudate from portion prepared in Example 3 above, and the mixture was stirred. To the resultant mixture was added a solution of 14.3 grams of tripropylamine ($Pr_3N$) in 47.5 grams of water, and the resultant mixture was stirred briefly. The composition of the final reaction mixture thus produced, expressed in terms of the molar oxide ratios of the components of the reaction mixture, was:

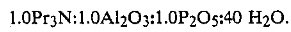

$$1.0Pr_3N:1.0Al_2O_3:1.0P_2O_5:40\ H_2O.$$

This final reaction mixture was digested by sealing it in a stainless steel pressure vessel lined with polytetrafluoroethylene and heating it in an oven at 150° C. under autogenous pressure for 24 hours. The solid bodies in the reaction mixture were recovered by filtration, washed thoroughly with water and dried in air at 100° C.

A sample of the dried solid reaction product was screened to produce a −200 U.S. mesh (less than or equal to 74 micron) fraction and a +200 U.S. mesh (greater than 74 micron) fraction. The −200 mesh fraction was subjected to X-ray powder diffraction analysis. This analysis showed that the major crystalline phase of the −200 mesh fraction (which was impure) was $AlPO_4$-5 having an X-ray powder diffraction pattern essentially identical to that set forth in Table I above.

EXAMPLE 20

A solution was formed by combining 23.1 grams of 85 wt. percent orthophosphoric acid ($H_3PO_4$) with 63.0 grams of water. To this solution were added 10.2 grams of the alumina extrudate from portion A prepared in Example 3 above, and the mixture was stirred. To the resultant mixture was added 9.2 grams of 40 wt. percent aqueous tetraethylammonium hydroxide (TEAOH), and the resultant mixture was stirred. To the resultant mixture was added 14.3 grams of tripropylamine ($Pr_3N$), and the resultant mixture was stirred until homogeneous. The composition of the final reaction mixture thus produced, expressed in terms of the molar oxide ratios of the components of the reaction mixture, was:

0.25 TEAOH:1.0 $Pr_3N$:1.0 $Al_2O_3$:1.0 $P_2O_5$:40 $H_2O$.

This final reaction mixture was digested, washed, dried and fractionated in the same way as in Example 19 above. The product was subjected to X-ray powder diffraction analysis. This analysis showed that the major crystalline phase of the product was $AlPO_4$-5 having an X-ray powder diffraction pattern, as synthesized, essentially identical to that set forth in Table I above.

A sample of the product was calcined in air at 600° C. for three hours. The X-ray powder diffraction pattern of the calcined sample was essentially identical to that of an as-synthesized sample, as given in Table I above.

The calcined-sample was utilized in adsorption studies using a standard McBain-Bakr gravimetric adsorption apparatus. Before being used in the adsorption tests, the sample was activated by heating at 350° C. in vacuum for 16 hours. The following data were generated in the adsorption studies:

| Adsorbate | Kinetic Diameter (Å) | Pressure (Torr) | Temp. °C. | Wt. % Adsorbed |
|---|---|---|---|---|
| $O_2$ | 3.46 | 100 | −183 | 12.80 |
| Neopentane | 6.2 | 700 | 24 | 6.10 |

From the above data, the pore size of the calcined product was determined to be greater than about 6.2 Å, as shown by the adsorption of neopentane (kinetic diameter of 6.2 Å).

EXAMPLE 21

Example 20 was repeated except that the alumina extrudate employed was a 40–60 U.S. mesh fraction from portion A prepared in Example 3 above. A crystalline product was prepared, and the major phase of this product was $AlPO_4$-5 having an X-ray powder diffraction pattern essentially identical to that set forth in Table I above.

EXAMPLE 22

A solution was formed by combining 82.0 grams of 85 wt. percent orthophosphoric acid ($H_3PO_4$) with 32.4 grams of 40 wt. percent aqueous tetraethylammonium hydroxide (TEAOH), 89.1 grams of tripropylamine ($Pr_3N$) and 198.2 grams of water. To this solution were added 43.7 grams of the spray-dried alumina prepared in Example 12 above, and the resultant mixture was stirred until homogeneous. The composition of the final reaction mixture thus produced expressed in terms of the molar oxide ratios of the components of the reaction mixture, was:

0.25TEAOH:1.75 $Pr_3N$:1.0 $Al_2O_3$:1.0$P_2O_5$:50 $H_2O$.

This final reaction mixture was digested, washed and dried in the same way as in Example 19 above, except that the digestion was conducted for 4 hours with continuous stirring. The product was subjected to X-ray powder diffraction analysis. This analysis showed that the major crystalline phase of the product was $AlPO_4$-5 having an X-ray powder diffraction pattern essentially identical to that set forth in Table I above.

EXAMPLES 23–25

These Examples illustrate the synthesis of SAPO-5 by the process of the present invention.

EXAMPLE 23

A solution was formed by combining 23.1 grams of 85 Wt. percent orthophosphoric acid ($H_3PO_4$) with 72.0 grams of water. To the resultant mixture was added 12.0 grams of a silica sol containing 30 wt. percent of $SiO_2$ and 70 wt. percent of H20 and the resultant mixture was stirred until homogeneous. To the resultant mixture was added 9.2 grams of 40 wt. percent aqueous tetraethylammonium hydroxide (TEAOH), and the resultant mixture was stirred until homogeneous. Next, to the resultant mixture was added 28.6 grams of tripropylamine ($Pr_3N$), and the resultant mixture was stirred until homogeneous. Finally, there was added to the resultant mixture 10.2 grams of the alumina extrudate from portion A prepared in Example 3 above, and the mixture was stirred. The composition of the final reaction mixture thus produced, expressed in terms of the molar oxide ratios of the components of the reaction mixture, was:

0.25TEAOH:2.0 $Pr_3N$:1.0 $Al_2O_3$:0.6 $SiO_2$:1.0 $P_2O_5$:50$H_2O$.

This final reaction mixture was digested by sealing it in a stainless steel pressure vessel lined with polytetrafluoroethylene and heating it in an oven at 200° C. under autogenous pressure for 48 hours. The solid bodies in the reaction mixture were recovered by filtration, washed thoroughly with water and dried in air at 100° C.

A sample of the dried solid reaction product was subjected to X-ray powder diffraction analysis. This analysis showed that the crystalline product was SAPO-5 having an X-ray powder diffraction pattern, as synthesized, characterized by the data in the following Table II:

TABLE II

| 2θ | d (Å) | Relative Intensity 100 × $I/I_o$ |
|---|---|---|
| 7.4 | 11.9 | 100 |
| 12.9 | 6.9 | 10 |
| 14.9 | 5.95 | 20 |
| 19.8 | 4.49 | 46 |
| 22.1 | 4.22 | 46 |
| 22.4 | 3.966 | 76 |
| 26.0 | 3.430 | 24 |
| 29.1 | 3.073 | 14 |
| 30.1 | 2.971 | 13 |
| 33.7 | 2.660 | 5 |
| 34.6 | 2.592 | 11 |
| 37.8 | 2.383 | 10 |

TABLE II-continued

| 2θ | d (Å) | Relative Intensity 100 × $I/I_o$ |
|---|---|---|
| 47.8 | 1.904 | 4 |

A sample of the product was calcined in air at 600° C. for three hours. The X-ray powder diffraction pattern of the calcined sample was essentially identical to that of an as-synthesized sample, as given in Table II above.

A sample of the product was analyzed and the following chemical analysis obtained:

| Component | Weight percent |
|---|---|
| Carbon | 5.3 |
| Nitrogen | 0.66 |
| $Al_2O_3$ | 40.9 |
| $SiO_2$ | 2.5 |
| $P_2O_5$ | 43.2 |

The above chemical analysis corresponds to a product composition, on a calcined basis (i.e., on a basis free from water and templating agent), in molar oxide ratios, of:

$$1.0Al_2O_3{:}0.10SiO_2{:}0.76P_2O_5.$$

The calcined sample was utilized in adsorption studies using a standard McBain-Bakr gravimetric adsorption apparatus. Before being used in the adsorption tests, the sample was activated by heating at 400° C. in vacuum for 16 hours. The following data were generated in the adsorption studies:

| Adsorbate | Kinetic Diameter (Å) | Pressure (Torr) | Temp. °C. | Wt. % Adsorbed |
|---|---|---|---|---|
| $O_2$ | 3.46 | 100 | −183 | 10.8 |
| Neopentane | 6.2 | 700 | 25 | 4.4 |
| n-Hexane | 4.3 | 45 | 25 | 5.4 |

From the above data, the pore size of the calcined product wa determined to be greater than about 6.2 Å, as shown by the adsorption of neopentane (kinetic diameter of 6.2 Å).

The n-butane cracking activity of a 20–40 U.S. mesh fraction of the activated, calcined product used in the adsorption tests was tested in a bench-scale apparatus, in which the reactor was a cylindrical quartz tube 254 mm. in length and 10.3 mm. in internal diameter. This reactor was loaded with 1.65 gram of the calcined fraction. A feedstock comprising a helium/n-butane mixture containing 2 mole percent of n-butane was passed through the reactor at a rate of 50 mL/min. at a temperature of 500° C. The reactor effluent was analyzed after 10 minutes of on-stream operation using conventional gas chromatography techniques. The resultant data showed a pseudo-first-order rate constant ($k_A$) of 0.83.

EXAMPLE 24

A solution was formed by combining 23.1 grams of 85 wt. percent orthophosphoric acid ($H_3PO_4$) with 79.2 grams of water. To the resultant solution was added 9.2 grams of 40 wt. percent aqueous tetraethylammonium hydroxide (TEAOH), and the resultant mixture was stirred until homogeneous. To the resultant mixture was added 28.6 grams of tripropylamine ($Pr_3N$), and the resultant mixture was stirred until homogeneous. Finally, there was added to the resultant mixture 13.8 grams of the alumina/silica extrudate from portion A prepared in Example 5 above, and the mixture was stirred. The composition of the final reaction mixture thus produced, expressed in terms of the molar oxide ratios of the components of the reaction mixture, was:

$$0.25TEAOH{:}2.0\ Pr_3N{:}0.94\ Al_2O_3{:}0.70SiO_2{:}1.0P_2O_5{:}50H_2O.$$

This final reaction mixture was digested, crystallized, washed, dried and fractionated in the same way as in Example 23 above. A sample of the product was subjected to X-ray powder diffraction analysis. This analysis showed that the major crystalline phase of the product was SAPO-5 having an X-ray powder diffraction pattern essentially identical to that set forth in Table II above.

A sample of the as-synthesized product was analyzed and the following chemical analysis obtained:

| Component | Weight percent |
|---|---|
| Carbon | 5.7 |
| Nitrogen | 0.72 |
| $Al_2O_3$ | 31.7 |
| $SiO_2$ | 15.5 |
| $P_2O_5$ | 40.4 |

The above chemical analysis corresponds to a product composition, on a calcined basis (i.e., on a basis free from water and templating agent), in molar oxide ratios, of:

$$1.0Al_2O_3{:}0.83SiO_2{:}0.92P_2O_5.$$

EXAMPLE 25

Example 24 was repeated except that the alumina/-silica extrudate employed was from portion A prepared in Example 6 above. A crystalline product was prepared, and the major phase of this product was SAPO-5 having an X-ray powder diffraction pattern essentially identical to that set forth in Table II above.

A sample of the product was analyzed and the following chemical analysis obtained:

| Component | Weight percent |
|---|---|
| Carbon | 5.6 |
| Nitrogen | 0.89 |
| $Al_2O_3$ | 31.9 |
| $SiO_2$ | 13.6 |
| $P_2O_5$ | 41.4 |

The above chemical analysis corresponds to a product composition, on a calcined basis (i.e., on a basis free from water and templating agent), in molar oxide ratios, of:

$$1.0Al_2O_3{:}0.72\ SiO_2{:}0.93P_2O_5.$$

EXAMPLES 26–41

These Examples illustrate the synthesis of SAPO-34 by the process of the present invention.

EXAMPLE 26

A solution was formed by combining 23.1 grams of 85 wt. percent orthophosphoric acid ($H_3PO_4$) with 19.2 grams of water. To the resultant solution was added 10.2 grams of the alumina extrudate from portion A prepared in Example 3 above and the mixture was stirred. To the resultant mixture was added 12.0 grams of a silica sol containing 30 wt. percent of $SiO_2$ and 70 wt. percent of $H_2O$ and the resultant mixture was stirred briefly. Finally, there was added to the resultant mixture a solution of 73.5 grams of 40 wt. percent aqueous tetraethylammonium hydroxide (TEAOH) in 14.84 grams of water, and the resultant mixture was stirred briefly. The composition of the final reaction mixture thus produced, expressed in terms of the molar oxide ratios of the components of the reaction mixture, was:

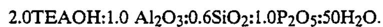

$$2.0TEAOH:1.0\ Al_2O_3:0.6SiO_2:1.0P_2O_5:50H_2O.$$

This final reaction mixture was digested by sealing it in a stainless steel pressure vessel lined with polytetrafluoroethylene and heating it in an oven at 200° C. under autogenous pressure for 120 hours. The granular powder present in the reaction mixture at the end of this digestion was recovered by filtration, washed thoroughly with water and dried in air at 100° C.

A sample of the dried solid reaction product was subjected to X-ray powder diffraction analysis. This analysis showed that the product was SAPO-34 having an X-ray powder diffraction pattern, as synthesized, characterized by the data in the following Table III:

TABLE III

| 2θ | d (Å) | Relative Intensity 100 × $I/I_o$ |
|---|---|---|
| 9.5 | 9.3 | 100 |
| 12.8 | 6.9 | 12 |
| 14.1 | 6.28 | 12 |
| 16.0 | 5.54 | 39 |
| 18.0 | 4.92 | 17 |
| 23.1 | 3.852 | 31 |
| 25.3 | 3.526 | 17 |
| 25.8 | 3.448 | 13 |
| 29.6 | 3.023 | 3 |
| 30.5 | 2.927 | 22 |
| 31.3 | 2.860 | 15 |
| 43.4 | 2.085 | 3 |
| 49.0 | 1.858 | 4 |

A sample of the solid product was calcined in air at 500° C. for two hours. The X-ray powder diffraction pattern of the calcined sample was essentially identical to that of an as-synthesized sample, as given in Table III above.

EXAMPLE 27

A solution was formed by combining 23.1 grams of 85 wt. percent orthophosphoric acid ($H_3PO_4$) with 19.2 grams of water. A second solution was formed by dissolving 73.5 grams of 40 wt. percent aqueous tetraethylammonium hydroxide (TEAOH) in 23.2 grams of water, and the two solutions were mixed until homogeneous. To the resultant mixed solution was added 13.8 grams of the alumina/silica extrudate from portion A prepared in Example 4 above and the mixture was stirred. The composition of the final reaction mixture thus produced, expressed in terms of the molar oxide ratios of the components of the reaction mixture, was:

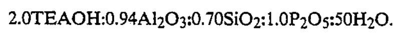

$$2.0TEAOH:0.94Al_2O_3:0.70SiO_2:1.0P_2O_5:50H_2O.$$

This final reaction mixture was digested by sealing it in a stainless steel pressure vessel lined with polytetrafluoroethylene and heating it in an oven at 200° C. under autogenous pressure for 96 hours. The granular powder present in the reaction mixture at the end of this digestion was recovered by filtration, washed thoroughly with water and dried in air at 100° C.

A sample of the dried solid reaction product was subjected to X-ray powder diffraction analysis. This analysis showed that the product was SAPO-34 having an X-ray powder diffraction pattern, as synthesized, essentially identical to that set forth in Table III above.

EXAMPLE 28

A solution was formed by combining 23.1 grams of 85 wt. percent orthophosphoric acid ($H_3PO_4$) with 42.4 grams of water. To the resultant solution was added 73.5 grams of 40 wt. percent aqueous tetraethylammonium hydroxide (TEAOH), and the resultant solution was stirred until homogeneous. to the resultant mixture was added 13.8 grams of the alumina/silica extrudate from portion B prepared in Example 4 above, and the mixture was stirred. The composition of the final reaction mixture thus produced, expressed in terms of the molar oxide ratios of the components of the reaction mixture, was:

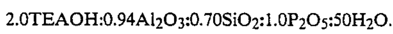

$$2.0TEAOH:0.94Al_2O_3:0.70SiO_2:1.0P_2O_5:50H_2O.$$

This final reaction mixture wa digested by sealing it in a stainless steel pressure vessel lined with polytetrafluoroethylene and heating it in an oven at 150° C. under autogenous pressure for 120 hours. The granular powder in the reaction mixture at the end of this digestion was recovered by filtration, washed thoroughly with water and dried in air at 100° C.

A sample of the dried solid reaction product was subjected to X-ray powder diffraction analysis. This analysis showed that the product was SAPO-34 having an X-ray powder diffraction pattern essentially identical to that set forth in Table III above.

EXAMPLE 29

Example 28 was repeated except that the alumina/-silica extrudate employed was from portion C prepared in Example 4 above. A solid product was prepared, which upon X-ray analysis proved to be SAPO-34 having an X-ray powder diffraction pattern essentially identical to that set forth in Table III above.

EXAMPLE 30

A solution was formed by combining 23.1 grams of 85 wt. percent orthophosphoric acid ($H_3PO_4$) with 42.4 grams of water. To the resultant solution was added 73.5 grams of 40 wt. percent aqueous tetraethylammonium hydroxide (TEAOH), and the resultant solution was stirred until homogeneous. To the resultant solution was added 13.8 grams of the alumina/silica extrudate from portion A prepared in Example 5 above, and the mixture was stirred. The composition of the final reaction mixture thus produced, expressed in terms of the molar oxide ratios of the components of the reaction mixture, was:

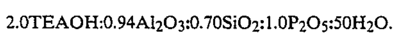

$$2.0TEAOH:0.94Al_2O_3:0.70SiO_2:1.0P_2O_5:50H_2O.$$

This final reaction mixture was digested by sealing it in a stainless steel pressure vessel lined with polytetrafluoroethylene and heating it in an oven at 200° C. under autogenous pressure for 120 hours. The granular powder in the reaction mixture at the end of this digestion was recovered by filtration, washed thoroughly with water and dried in air at 100° C.

A sample of the dried solid reaction product was subjected to X-ray powder diffraction analysis. This analysis showed that the product was SAPO-34 having an X-ray powder diffraction pattern essentially identical to that set forth in Table III above.

A sample of the product was calcined in air at 600° C. for three hours and utilized in adsorption studies using a standard McBain-Bakr gravimetric adsorption apparatus. Before being used in the adsorption tests, the sample was activated by heating at 420° C. in vacuum for 16 hours. The following data were generated in the adsorption studies:

| Adsorbate | Kinetic Diameter (Å) | Pressure (Torr) | Temp. °C. | Wt. % Adsorbed |
|---|---|---|---|---|
| $O_2$ | 3.46 | 100 | −183 | 25.8 |
| n-Hexane | 4.3 | 45 | 24 | 14.3 |

From the above data, the pore size of the calcined product was determined to be greater than about 4.3 Å, as shown by the adsorption of n-hexane (kinetic diameter of 4.3 Å).

The n-butane cracking activity of the activated, calcined product was tested in the same way as in Example 23 above, except that the weight of the sample loaded into-the reactor was 1.83 grams. The resultant data showed a pseudo-first-order rate constant ($k_A$) of 7.58.

EXAMPLE 31

Example 30 was repeated except that the alumina/-silica extrudate employed was from portion B prepared in Example 5 above. A solid product was prepared, which upon X-ray analysis proved to be SAPO-34 having an X-ray powder diffraction pattern essentially identical to that set forth in Table III above.

EXAMPLE 32

Example 30 was repeated except that the alumina/-silica extrudate employed was from portion C prepared in Example 5 above. A solid product was prepared, which upon X-ray analysis proved to be SAPO-34 having an X-ray powder diffraction pattern essentially identical to that set forth in Table III above.

EXAMPLE 33

Example 30 was repeated except that the alumina/-silica extrudate employed was from portion A prepared in Example 6 above. A solid product was prepared, which upon X-ray analysis proved to be SAPO-34 having a X-ray powder diffraction pattern essentially identical to that set forth in Table III above.

A sample of the product was calcined in air at 600° C. for three hours and utilized in adsorption studies using a standard McBain-Bakr gravimetric adsorption apparatus. Before being used in the adsorption tests, the sample was activated by heating at 425° C. in vacuum for 16 hours. The following data were generated in the adsorption studies:

| Adsorbate | Kinetic Diameter (Å) | Pressure (Torr) | Temp. °C. | Wt. % Adsorbed |
|---|---|---|---|---|
| $O_2$ | 3.46 | 100 | −183 | 27.0 |
| n-Hexane | 4.3 | 45 | 24 | 12.8 |

From the above data, the pore size of the calcined product was determined to be greater than about 4.3 Å, as shown by the adsorption of n-hexane (kinetic diameter of 4.3 Å).

The n-butane cracking activity of the activated, calcined product was tested in the same way as in Example 23 above, except that the weight of the sample loaded into the reactor was 1.41 grams. The resultant data showed a pseudo-first-order rate constant ($k_A$) of 4.62.

EXAMPLE 34

Example 30 was repeated except that the alumina/-silica extrudate employed was from portion B prepared in Example 6 above. A solid product was prepared, which upon X-ray analysis proved to be SAPO-34 having an X-ray powder diffraction pattern essentially identical to that set forth in Table III above.

A sample of the product was analyzed and the following chemical analysis obtained:

| Component | Weight percent |
|---|---|
| Carbon | 10.7 |
| Nitrogen | 1.5 |
| $Al_2O_3$ | 30.1 |
| $SiO_2$ | 12.8 |
| $P_2O_5$ | 36.0 |

The above chemical analysis corresponds to a product composition, on a calcined basis (i.e., on a basis free from water and templating agent), in molar oxide ratios, of:

$$1.0Al_2O_3:0.72SiO_2:0.86P_2O_5.$$

EXAMPLE 35

Example 30 was repeated except alumina/silica extrudate employed was from portion C prepared in Example 6 above. A solid product was prepared, which upon X-ray analysis proved to be SAPO-34 having an X-ray powder diffraction pattern essentially identical to that set forth in Table III above.

EXAMPLE 36

A solution was formed by combining 23.1 grams of 85 wt. percent orthophosphoric acid ($H_3PO_4$) with 45.0 grams of water and stirred. To the resultant solution was added 12.0 grams of a silica sol containing 30 wt. percent of $SiO_2$ and 70 wt. percent of $H_2O$ and the resultant mixture was stirred briefly. To the resultant mixture was added 55.1 grams of 40 wt. percent aqueous tetraethylammonium hydroxide (TEAOH), and the resultant mixture was stirred briefly. Next, to the resultant mixture was added 7.2 grams of tripropylamine ($Pr_3N$), and the resultant mixture was stirred until homogeneous. Finally, there was added to the resultant mixture 10.1 grams of the alumina extrudate prepared in Example 7 above, and the mixture was stirred. The composition of the final reaction mixture thus produced, expressed in terms of the molar oxide ratios of the components of the reaction mixture, was:

$$1.5TEAOH:0.5Pr_3N:1.0Al_2O_3:0.6SiO_2:1.0P_2O_5:50H_2O.$$

This final reaction mixture was digested, washed and dried in the same way as in Example 28 above. A solid product was prepared, which upon X-ray analysis proved to be SAPO-34 having an X-ray powder diffraction pattern essentially identical to that set forth in Table III above.

A sample of the product was analyzed and the following chemical analysis obtained:

| Component | Weight percent |
|---|---|
| Carbon | 9.3 |
| Nitrogen | 1.3 |
| $Al_2O_3$ | 31.4 |
| $SiO_2$ | 16.6 |
| $P_2O_5$ | 32.7 |

The above chemical analysis corresponds to a product composition, on a calcined basis (i.e., on a basis free from water and templating agent), in molar oxide ratios, of:

$$1.00Al_2O_3:0.90SiO_2:0.75P_2O_5.$$

EXAMPLE 37

A solution was formed by combining 23.1 grams of 85 wt. percent orhophosphoric acid ($H_3PO_4$) with 56.0 grams of water and stirred. To the resultant solution was added 12.0 grams of a silica sol containing 30 wt. percent of $SiO_2$ and 70 wt. percent of $H_2O$ and the resultant mixture was stirred briefly. To the resultant mixture was added 21.02 grams of diethanolamine (DEA), and the resultant mixture was stirred briefly. Next, to the resultant mixture was added 10.2 grams of dipropylamine ($Pr_2NH$), and the resultant mixture was stirred until homogeneous. Finally, there was added to the resultant mixture 10.2 grams of the alumina extrudate from portion A prepared in Example 3 above, and the mixture, was stirred. The composition of the final reaction mixture thus produced, expressed in terms of the molar oxide ratios of the components of the reaction mixture, was:

$$2.0\ DEA:1.0Pr_2NH:1.0Al_2O_3:0.6SiO_2:1.0P_2O_5:50H_2O.$$

This final reaction mixture was digested, washed and dried in the same way as in Example 28 above. A solid product was prepared, which upon X-ray analysis proved to be SAPO-34 having an X-ray powder diffraction pattern essentially identical to that set forth in Table III above. The X-ray analysis indicated a SAPO-34 content in excess of 91 percent, with unreacted alumina as the major impurity.

The crystallinity of the sample was tested by comparing both the oxygen adsorption and X-ray diffraction of a sample with that of a highly crystalline sample of SAPO-34 prepared by the hydrothermal crystallization process described in the aforementioned U.S. Pat. No. 4,440,871, the crystallinity of the sample prepared by the hydrothermal crystallization process being taken as 100 percent. The oxygen adsorption tests were conducted using a standard McBain-Bakr gravimetric adsorption apparatus on a sample which had been calcined and activated in the same way as in Example 23 above. The X-ray diffraction comparison was conducted using a humidity-equilibrated, as-synthesized sample and comparing the sum of the areas under the five most intense peaks in the X-ray powder diffraction pattern.

The oxygen adsorption data indicated a crystallinity of 102 percent of the reference material, while the X-ray diffraction data indicated a crystallinity of 91 percent of the reference material.

The n-butane cracking activity of the activated, calcined product was tested in the same way as in Example 23 above. The resultant data showed a pseudo-first-order rate constant ($k_A$) of 3.92.

EXAMPLE 38

A solution was formed by combining 23.1 grams grams of water and stirred. To the resultant solution was added 12.0 grams of a silica sol containing 30 wt. percent of $SiO_2$ and 70 wt. percent of $H_2O$ and the resultant mixture was stirred briefly. To the resultant mixture was added 10.5 grams of diethanolamine (DEA), and the resultant mixture was stirred briefly. Next, to the resultant mixture was added 20.4 grams of dipropylamine ($Pr_2NH$), and the resultant mixture was stirred until homogeneous. Finally, there was added to the resultant mixture 10.2 grams of the alumina extrudate from portion A prepared in Example 3 above, and the mixture was stirred. The composition of the final reaction mixture thus produced, expressed in terms of the molar oxide ratios of the components of the reaction mixture, was:

$$1.0DEA:2.0Pr_2NH:1.0Al_2O_3:0.6SiO_2:50H_2O.$$

This final reaction mixture was digested, washed and dried in the same way as in Example 28 above. A solid product was prepared, which upon X-ray analysis proved to be SAPO-34 having an X-ray powder diffraction pattern essentially identical to that set forth in Table III above. The X-ray analysis indicated a SAPO-34 content in excess of 97 percent, with unreacted alumina as the major impurity.

The crystallinity of the sample was tested by comparing both the oxygen adsorption and X-ray diffraction of a sample with that of a highly crystalline sample of SAPO-34 prepared by the hydrothermal crystallization process described in the aforementioned U.S. Pat. No. 4,440,871, the comparisons being made in the same manner as described in Example 37 above. The oxygen adsorption data indicated a crystallinity of 106 percent of the reference material, while the X-ray diffraction data indicated a crystallinity of 98 percent of the reference material.

The n-butane cracking activity of the activated, calcined product was tested in the same way as in Example 23 above. The resultant data showed a pseudo-first-order rate constant ($k_A$) of 1.71.

A sample of the product was analyzed and the following chemical analysis obtained:

| Component | Weight percent |
|---|---|
| Carbon | 9.6 |
| Nitrogen | 2.3 |
| $Al_2O_3$ | 31.1 |
| $SiO_2$ | 10.6 |
| $P_2O_5$ | 37.7 |

The above chemical analysis corresponds to a product composition, on a calcined basis (i.e., on a basis free from water and templating agent), in molar oxide ratios, of:

$$1.00Al_2O_3:0.58SiO_2:0.87P_2O_5.$$

EXAMPLE 39

A solution was formed by combining 23.1 grams of 85 wt. percent orthophosphoric acid ($H_3PO_4$) with 64.4 grams of water and stirred briefly. To the resultant solution was added 20.4 grams of dipropylamine ($Pr_2NH$), and the resultant mixture was stirred vigorously until the dipropylamine had dissolved. Finally, there was added to the resultant solution 13.8 grams of the alumina/silica extrudate prepared in Example 8 above, and the mixture was stirred. The composition of the final reaction mixture thus produced, expressed in terms of the molar oxide ratios of the components of the reaction mixture, was:

$$2.0Pr_2NH:0.94Al_2O_3:0.70SiO_2:1.0P_2O_5:50H_2O.$$

This final reaction mixture was digested, washed and dried in the same way as in Example 28 above. A sample of the dried crystalline reaction product was subjected to X-ray powder diffraction analysis. This analysis showed that the product was SAPO-34 having an X-ray powder diffraction pattern, as synthesized, characterized by the data in the following Table IV:

TABLE IV

| 2θ | d(Å) | Relative Intensity 100 × I/I$_o$ |
|---|---|---|
| 9.4 | 9.40 | 100 |
| 12.8 | 6.93 | 18 |
| 13.9 | 6.37 | 9 |
| 15.9 | 5.57 | 35 |
| 17.7 | 5.01 | 23 |
| 20.5 | 4.33 | 88 |
| 21.0 | 4.23 | 4 |
| 22.0 | 4.05 | 7 |
| 22.3 | 3.99 | 5 |
| 23.0 | 3.87 | 9 |
| 24.9 | 3.58 | 33 |
| 25.8 | 3.45 | 19 |
| 27.6 | 3.23 | 5 |
| 28.1 | 3.17 | 5 |
| 29.5 | 3.03 | 4 |
| 30.5 | 2.93 | 37 |
| 30.8 | 2.91 | 13 |
| 31.0 | 2.88 | 20 |
| 34.4 | 2.606 | 8 |
| 36.0 | 2.495 | 5 |
| 39.6 | 2.274 | 3 |
| 42.8 | 2.113 | 4 |
| 43.4 | 2.086 | 3 |
| 47.6 | 1.910 | 4 |
| 48.8 | 1.866 | 6 |
| 50.7 | 1.801 | 6 |
| 53.2 | 1.723 | 5 |

EXAMPLE 40

A solution was formed by coming 23.1 grams of 85 wt. percent orthrophosphoric acid ($H_3PO_4$) with 42.4 grams of water and stirred. To the resultant solution was added 73.5 grams of 40 wt. percent aqueous tetraethylammonium hydroxide (TEAOH), and the resultant mixture was stirred. Finally, there was added to the resultant solution 23.4 grams of the meta-kaolin extrudate from portion A prepared in Example 9 above, and the mixture was stirred. The composition of the final reaction mixture thus produced, expressed in terms of the molar oxide ratios of the components of the reaction mixture, was:

$$2.0TEAOH:1.0Al_2O_3:0.6SiO_2:1.0P_2O_5:50H_2O.$$

This final reaction mixture was digested, crystallized, washed and dried in the same way as in Example 28 above, except that the digestion was performed at 200° C. for 96 hours. A sample of the dried crystalline reaction product was subjected to X-ray powder diffraction analysis. This analysis showed that the product was SAPO-34.

EXAMPLE 41

A solution was formed by combining 32.8 grams of 85 wt. percent orthophosphoric acid ($H_3PO_4$) with 92.0 grams of water. To the resultant solution was added 26.2 grams of 40 wt. percent aqueous tetraethylammonium hydroxide (TEAOH), and the resultant mixture was stirred until homogeneous. To the resultant mixture was added 28.8 grams of di-n-propylamine ($Pr_2NH$), and the resultant mixture was stirred until homogeneous. Finally, there was added to the resultant mixture 20.3 grams of the spray-dried alumina/silica prepared in Example 11 above, and the mixture was stirred. The composition of the final reaction mixture thus produced, expressed in terms of the molar oxide ratios of the components of the reaction mixture, was:

$$0.5TEAOH:2.0Pr_2NH:1.0Al_2O_3:1.2SiO_2:1.0P_2O_5:50H_2O.$$

This final reaction mixture was digested in a sealed stainless steel pressure vessel heated at 175° C. under autogenous pressure with continuous stirring for 72 hours. The solid bodies in the reaction mixture were recovered by filtration, washed thoroughly with water and dried in air at 100° C.

The product was subjected to X-ray powder diffraction analysis. This analysis showed that the major crystalline phase of the product was SAPO-34 having an X-ray powder diffraction pattern essentially identical to that set forth in Table III above.

A sample of the product was analyzed and the following chemical analysis obtained:

| Component | Weight percent |
|---|---|
| Carbon | 10.2 |
| Nitrogen | 1.7 |
| $Al_2O_3$ | 26.6 |
| $SiO_2$ | 21.5 |
| $P_2O_5$ | 34.5 |

The above chemical analysis corresponds to a product composition, on a calcined basis (i.e., on a basis free from water and templating agent), in molar oxide ratios, of:

$$1.0Al_2O_3:0.69SiO_2:0.91P_2O_5.$$

A sample of the product was calcined in air at 600° C. for three hours. The n-butane cracking activity of the calcined product was tested in the same way as in Example 23 above, except that the weight of the sample loaded into the reactor was 1.51 grams. The resultant data showed a pseudo-first-order rate constant ($k_A$) of 4.88.

EXAMPLES 42-43

These Examples illustrate the synthesis of SAPO-41 by the process of the present invention.

EXAMPLE 42

A solution was formed by combining 23.1 grams of 85 wt. percent orthophosphoric acid ($H_3PO_4$) with 56.0 grams of water and stirred. To the resultant solution was added 12.0 grams of a silica sol containing 30 wt. percent of $SiO_2$ and 70 wt. percent of $H_2O$ and the resultant mixture was stirred briefly. To the resultant mixture was added 20.4 grams of dipropylamine ($Pr_2NH$), and the resultant mixture was stirred until homogeneous. Finally, there was added to the resultant mixture 10.2 grams of the alumina extrudate prepared in Example 7 above, and the mixture was stirred. The composition of the final reaction mixture thus produced, expressed in terms of the molar oxide ratios of the components of the reaction mixture, was:

$$2.0Pr_2NH:1.0Al_2O_3:0.6SiO_2:1.0P_2O_5:50H_2O.$$

This final reaction mixture was digested, crystallized, washed and dried in the same way as in Example 28 above. A sample of the dried crystalline reaction product was subjected to X-ray powder diffraction analysis. This analysis showed that the major crystalline phase of the product (which was impure) was SAPO-41 having an X-ray powder diffraction pattern, as synthesized, characterized by the data in the following Table V;

TABLE V

| 2θ | d(Å) | Relative Intensity 100 × $I/I_o$ |
|---|---|---|
| 6.9 | 12.80 | 51 |
| 9.8 | 9.05 | 30 |
| 13.9 | 6.39 | 42 |
| 18.3 | 4.84 | 19 |
| 20.6 | 4.32 | 4 |
| 20.9 | 4.26 | 14 |
| 21.2 | 4.19 | 70 |
| 22.3 | 3.98 | 100 |
| 23.1 | 3.86 | 51 |
| 23.4 | 3.80 | 30 |
| 25.4 | 3.51 | 18 |
| 26.1 | 3.42 | 46 |
| 27.9 | 3.20 | 9 |
| 28.4 | 3.15 | 5 |
| 29.6 | 3.02 | 26 |
| 29.9 | 2.99 | 8 |
| 31.5 | 2.84 | 8 |
| 33.6 | 2.666 | 4 |
| 33.8 | 2.652 | 5 |
| 35.1 | 2.559 | 6 |
| 36.7 | 2.449 | 5 |
| 37.2 | 2.420 | 6 |
| 37.8 | 2.378 | 12 |
| 39.8 | 2.263 | 4 |
| 43.1 | 2.097 | 5 |
| 47.9 | 1.901 | 5 |
| 49.9 | 1.828 | 4 |
| 51.6 | 1.770 | 4 |
| 52.0 | 1.759 | 4 |

A sample of the as-synthesized product was analyzed and the following chemical analysis obtained:

| Component | Weight percent |
|---|---|
| Carbon | 5.0 |
| Nitrogen | 0.86 |
| $Al_2O_3$ | 38.8 |
| $SiO_2$ | 0.23 |
| $P_2O_5$ | 50.4 |

The above chemical analysis corresponds to a product composition, on a calcined basis (i.e., on a basis free from water and templating agent), in molar oxide ratios, of:

$$1.00Al_2O_3:0.01SiO_2:0.93P_2O_5.$$

A sample of the product was calcined in air at 600° C. for two hours. The X-ray powder diffraction pattern of the calcined sample was essentially identical to that of the as-synthesized sample, as set forth in Table V above.

The calcined sample was utilized in adsorption studies using a standard McBain-Bakr gravimetric adsorption apparatus. Before being used in the adsorption tests, the sample was activated by heating at 350° C. in vacuum for 16 hours. The following data were generated in the adsorption studies:

| Adsorbate | Kinetic Diameter (Å) | Pressure (Torr) | Temp. °C. | Wt. % Adsorbed |
|---|---|---|---|---|
| $O_2$ | 3.46 | 102 | −183 | 7.58 |
| $O_2$ | 3.46 | 750 | −183 | 9.43 |
| n-Hexane | 4.3 | 45 | 23 | 3.99 |
| Neopentane | 6.2 | 750 | 22 | 3.00 |
| Cyclohexane | 6.0 | 60 | 22 | 5.37 |
| $H_2O$ | 2.65 | 4.6 | 22 | 11.77 |
| $H_2O$ | 2.65 | 19.9 | 22 | 20.08 |

The n-butane cracking activity of the activated, calcined product was tested in the same way as in Example 23 above, except that the weight of the sample loaded into the reactor was 2.00 grams. The resultant data showed a pseudo-first-order rate constant ($k_A$) of 1.19.

EXAMPLE 43

A solution was formed by combining 23.1 grams of 85 wt. percent orthophosphoric acid ($H_3PO_4$) with 64.4 grams of water and stirred. To the resultant solution was added 2.6 grams of diethanolamine (DEA) and the resultant mixture was stirred briefly. To the resultant mixture was added 20.4 grams of dipropylamine ($Pr_2NH$), and the resultant mixture was stirred until homogeneous. Finally, there was added to the resultant mixture 13.8 grams of the meta-kaolin-containing alumina extrudate prepared in Example 9 above, and the mixture was stirred. The composition of the final reaction mixture thus produced, expressed in terms of the molar oxide ratios of the components of the reaction mixture, was:

$$0.25DEA:2.0Pr_2NH:1.32Al_2O_3:0.05SiO_2:1.0P_2O_5:50H_2O.$$

This final reaction mixture was digested, crystallized, washed and dried in the same way as in Example 28 above. A sample of the dried crystalline reaction product was subjected to X-ray powder diffraction analysis. This analysis showed that the major crystalline phase of the product (which was impure) was SAPO-41 having an X-ray powder diffraction pattern, as synthesized, essentially identical to that set forth in Table V above.

EXAMPLES 44–45

These Examples illustrate the synthesis of SAPO-11 by the process of the present invention.

EXAMPLE 44

A solution was formed by combining 23.1 grams of 85 wt. percent orthophosphoric acid ($H_3PO_4$) with 64.4 grams of water and stirred. To the resultant solution was added 21.0 grams of diethanolamine (DEA) and the resultant mixture was stirred briefly. To the resultant mixture was added 2.6 grams of dipropylamine ($Pr_2NH$), and the resultant mixture was stirred until homogeneous. Finally, there was added to the resultant mixture 13.8 gram of the meta-kaolin-containing alumina extrudate prepared in Example 9 above, and the mixture was stirred. The composition of the final reaction mixture thus produced, expressed in terms of the molar oxide ratios of the components of the reaction mixture, was:

$$2.0DEA:0.25Pr_2NH:1.32Al_2O_3:0.05SiO_2:1.0P_2O_5:50H_2O.$$

This final reaction mixture was digested, crystallized, washed and dried in the same way as in Example 28 above. A sample of the dried crystalline reaction product was subjected to X-ray powder diffraction analysis. This analysis showed that the major crystalline phase of the product (which was impure) was SAPO-11 having an X-ray powder diffraction pattern, as synthesized, characterized by the data in the following Table VI:

TABLE VI

| 2θ | d(Å) | Relative Intensity 100 × $I/I_o$ |
|---|---|---|
| 8.1 | 10.95 | 26 |
| 9.4 | 9.37 | 57 |
| 10.0 | 8.84 | 16 |
| 13.2 | 6.72 | 13 |
| 13.7 | 6.46 | 4 |
| 14.4 | 6.17 | 7 |
| 14.8 | 5.99 | 7 |
| 15.7 | 5.66 | 30 |
| 15.9 | 5.57 | 5 |
| 16.3 | 5.45 | 4 |
| 19.0 | 4.67 | 5 |
| 19.8 | 4.49 | 4 |
| 20.4 | 4.36 | 41 |
| 21.0 | 4.22 | 100 |
| 21.4 | 4.16 | 22 |
| 22.2 | 4.01 | 41 |
| 22.5 | 3.95 | 37 |
| 22.7 | 3.91 | 48 |
| 23.1 | 3.76 | 59 |
| 24.5 | 3.64 | 4 |
| 24.8 | 3.60 | 8 |
| 26.4 | 3.37 | 11 |
| 26.6 | 3.35 | 12 |
| 26.9 | 3.32 | 9 |
| 27.5 | 3.25 | 5 |
| 28.2 | 3.17 | 10 |
| 28.7 | 3.11 | 17 |
| 29.1 | 3.08 | 5 |
| 29.5 | 3.03 | 6 |
| 31.5 | 2.837 | 8 |
| 32.9 | 2.722 | 13 |
| 34.3 | 2.616 | 6 |
| 35.5 | 2.529 | 5 |
| 37.6 | 2.394 | 9 |
| 37.9 | 2.372 | 12 |

A sample of the product was calcined in air at 600° C. for three hours. The X-ray powder diffraction pattern of the calcined sample was essentially identical to that of the as-synthesized sample, as set forth in Table VI above.

The calcined sample was utilized in adsorption studies using a standard McBain-Bakr gravimetric adsorption apparatus. Before being used in the adsorption tests, the sample was activated by heating at 390° C. in vacuum for 16 hours. The following data were generated in the adsorption studies:

| Adsorbate | Kinetic Diameter (Å) | Pressure (Torr) | Temp. °C. | Wt. % Adsorbed |
|---|---|---|---|---|
| $O_2$ | 3.46 | 102 | −183 | 8.21 |
| $O_2$ | 3.46 | 700 | −183 | 13.3 |
| Cyclohexane | 6.0 | 50 | 23.5 | 7.51 |
| Cyclohexane | 6.0 | 77 | 23.5 | 16.0 |

From the above data, the pore size of the calcined product was determined to be greater than about 6.0 Å, as shown by the adsorption of cyclohexane (kinetic diameter of 6.0 Å).

EXAMPLE 45

Example 44 was repeated except that the amount of dipropylamine employed was increased to 5.2 grams. The composition of the final reaction mixture thus produced, expressed in terms of the molar oxide ratios of the components of the reaction mixture, was:

$$2.0DEA:0.5Pr_2NH:1.32Al_2O_3:0.05SiO_2:1.0P_2O_5:50H_2O.$$

This final reaction mixture was digested, washed and dried in the same way as in Example 28 above. A sample of the dried crystalline reaction product was subjected to X-ray powder diffraction analysis. This analysis showed that the major crystalline phase of the product (which was impure) was SAPO-11 having an X-ray powder diffraction pattern, as synthesized, essentially identical to that set forth in Table VI above.

A sample of the as-synthesized product was analyzed and the following chemical analysis obtained:

| Component | Weight percent |
|---|---|
| Carbon | 5.4 |
| Nitrogen | 1.55 |
| $Al_2O_3$ | 37.3 |
| $SiO_2$ | 0.9 |
| $P_2O_5$ | 50.0 |

The above chemical analysis corresponds to a product composition, on a calcined basis (i.e., on a basis free from water and templating agent), in molar oxide ratios, of:

$$1.00Al_2O_3:0.04SiO_2:0.96P_2O_5.$$

EXAMPLE 46

This Example illustrates the synthesis of CoAPSO-34 by the process of the present invention.

A solution was formed by combining 41.5 grams of 85 wt. percent orthophosphoric acid ($H_3PO_4$) with 49.14 grams of water. To the resultant solution was added 21.6 grams of the alumina extrudate from portion A prepared in Example 3 above and the mixture was stirred. To the resultant mixture was added 24.0 grams of a silica sol containing 30 wt. percent of $SiO_2$ and 70wt. percent of $H_2O$ and the resultant mixture was stirred briefly. Next, to the resultant mixture was added a solution of 9.96 grams of cobaltous acetate tetrahydrate [$Co(CH_3CO_2)_2 \cdot 4H_2O$] in 20.0 grams of water and the resultant mixture was stirred briefly. Finally, there was added to the resultant mixture a solution of 73.5 grams of 40 wt. percent aqueous tetraethylammonium hydroxide (TEAOH) in 27.4 grams of water, and the resultant mixture was stirred briefly. The composition of the final reaction mixture thus produced, expressed in terms of the molar oxide ratios of the components of the reaction mixture, was:

$$1.0TEAOH:0.9Al_2O_3:0.6SiO_2 0.2CoO:0.9P_2O_5:50H_2O.$$

This final reaction mixture was digested by sealing it in a polypropylene jar and heating it in an oven at 100° C. under autogenous pressure for 120 hours. The solid bodies present in the reaction mixture at the end of this digestion were recovered by filtration, washed thoroughly with water and dried in at 100° C.

A sample of the dried solid reaction product was subjected to X-ray powder diffraction analysis. This analysis showed that the product was CoAPSO-34 having an X-ray powder diffraction pattern, as synthesized, characterized by the data in the following Table VII:

TABLE VII

| 2θ | d(Å) | Relative Intensity 100 × $I/I_o$ |
|---|---|---|
| 9.5 | 9.28 | 100 |
| 12.9 | 6.89 | 16 |
| 14.1 | 6.28 | 13 |
| 16.0 | 5.53 | 43 |
| 18.0 | 4.93 | 15 |
| 20.6 | 4.31 | 71 |
| 25.2 | 3.53 | 20 |
| 25.4 | 3.51 | 8 |
| 25.9 | 3.44 | 13 |
| 30.6 | 2.93 | 26 |
| 31.2 | 2.86 | 19 |

Another sample of the as-synthesized product was analyzed and the following chemical analysis obtained:

| Component | Weight percent |
|---|---|
| Carbon | 5.0 |
| Nitrogen | 0.61 |
| CoO | 2.3 |
| $Al_2O_3$ | 45.1 |
| $SiO_2$ | 3.0 |
| $P_2O_5$ | 27.4 |

The above chemical analysis corresponds to a product composition, on a calcined basis (i.e., on a basis free from water and templating agent), in molar oxide ratios, of:

$$1.00Al_2O_3:0.07CoO:0.11SiO_2:0.44P_2O_5.$$

EXAMPLES 47-51

These Examples illustrate the synthesis of various GeAPO and GeAPSO molecular sieves described in the aforementioned applications Ser. Nos. 841,753 and 599,971 by the process of the present invention, together with the preparation of precursor materials useful in such synthesis of GeAPO and GeAPSO molecular sieves.

EXAMPLE 47

(Preparation of $Al_2O_3/GeO_2$ Precursor)

100 Grams of 99.9% pure germanium tetrachloride ($GeCl_4$) were mixed with 676 grams of aluminum chlorhydrol ($Al_2Cl(OH)_5 \cdot 2H_2O$). The composition of this mixture, expressed in terms of the molar ratios of its oxide components, was:

$$0.3GeO_2:1.0Al_2O_3.$$

The resultant mixture was reduced in volume using a rotary evaporator until a thick gel was obtained, this gel was diluted with water and a solid mixture of oxides precipitated by slow addition of concentrated ammonium hydroxide until the pH reached approximately 8.0.

In order to remove all traces of the liquid phase, the oxide mixture was washed twice by centrifugation, filtered and washed free of chloride ion with a dilute ammonium hydroxide solution having a pH of approximately 8. The solid oxide mixture thus produced was dried at room temperature for several hours and finally dried at 100° C.

A sample of this solid oxide mixture was analyzed and the following chemical analysis obtained:

| Component | Weight percent |
|---|---|
| $Al_2O_3$ | 51.3 |
| $GeO_2$ | 15.4 |
| Cl | 3.3 |
| LOI* | 32.0 |

*LOI indicates loss on ignition.

The above chemical analysis corresponds to a product composition, on a chloride-free basis, in molar oxide ratios, of:

$$0.29GeO_2:1.0Al_2O_3:3.5H_2O.$$

A portion of the solid oxide mixture thus produced was calcined at 350° C. for three hours. A sample of this calcined solid oxide mixture was analyzed and the following chemical analysis obtained:

| Component | Weight percent |
|---|---|
| $Al_2O_3$ | 60.0 |
| $GeO_2$ | 17.9 |
| Cl | 2.8 |
| LOI* | 20.5 |

*LOI indicates loss on ignition.

The above chemical analysis corresponds to a product composition, on a chloride-free basis, in molar oxide ratios, of:

$$0.29GeO_2:1.0Al_2O_3:1.9H_2O.$$

EXAMPLE 48

(Preparation of $Al_2O_3/SiO_2/GeO_2$ Precursor)

12.6 Grams of germanium ethoxide ($Ge(OC_2H_5)_4$) were mixed with 10.4 grams of tetraethylorthosilicate, and then mixed with 98.5 grams of aluminum tri-sec-butoxide ($Al(OC_4H_9)_3$). To the resultant mixture were added 14.4 grams of water, and the resultant mixture was blended using a mechanical mixer. To ensure complete hydrolysis of the alkoxides, an additional 40.0 grams of water were added and the resultant mixture was dried at 100° C. for several hours. To the dried solids were added 20.0 grams of water, and the resultant slurry was dried at 100° C. overnight.

A sample of the resultant solid oxide mixture was analyzed and the following chemical analysis obtained:

| Component | Weight percent |
|---|---|
| $Al_2O_3$ | 41.2 |
| $GeO_2$ | 10.2 |
| $SiO_2$ | 8.8 |
| LOI* | 38.2 |

*LOI indicates loss on ignition.

The above chemical analysis corresponds to a product composition, in molar oxide ratios, of:

$$0.24GeO_2:1.00Al_2O_3:0.36SiO_2:5.25H_2O$$

EXAMPLE 49

(Preparation of GeAPO-5)

A solution was formed by combining 23.1 grams of 85 wt. percent orthophosphoric acid ($H_3PO_4$) with 33.7 grams of water. To this solution were added 16.1 grams of the alumina extrudate prepared in Example 47 above, and the mixture was stirred. To the resultant mixture was added 36.8 grams of 40 wt. percent aqueous tetraethylammonium hydroxide (TEAOH), and the resultant mixture was stirred until homogeneous. The composition of the final reaction mixture thus produced, expressed in terms of the molar oxide ratios of the components of the reaction mixture, was:

$$1.0TEAOH:0.3GeO_2:1.0Al_2O_3:1.0P_2O_5:30.0H_2O.$$

This final reaction mixture was digested by sealing it in a stainless steel pressure vessel lined with polytetrafluoroethylene and heating it in an oven at 200° C. under autogenous pressure for 72 hours The solids in the reaction mixture were recovered by centrifugation, washed thoroughly with water and dried in air at room temperature and then at 100° C. overnight.

A sample of the dried solid reaction product was subjected to X-ray powder diffraction analysis. This analysis showed that the product was GeAPO-5 having an X-ray powder diffraction pattern, as synthesized, characterized by the data in the following Table VIII:

TABLE VIII

| 2θ | d(Å) | Relative Intensity 100 × $I/I_o$ |
|---|---|---|
| 7.5 | 11.81 | 100 |
| 13.0 | 6.82 | 8 |
| 15.0 | 5.91 | 19 |
| 19.9 | 4.47 | 38 |
| 21.1 | 4.21 | 30 |
| 22.5 | 3.95 | 50 |
| 26.1 | 3.50 | 15 |
| 29.2 | 3.06 | 8 |
| 30.2 | 2.96 | 10 |
| 34.8 | 2.58 | 8 |
| 37.9 | 2.38 | 6 |

Scanning electron microscopy of the solid product showed numerous crystals with a morphology corresponding to that expected for GeAPO-5. EDAX (electron dispersive analysis by X-ray) microprobe analysis of one of the clean crystals indicated the following approximate weight composition (normalized to $P_2O_5 + Al_2O_3 + GeO_2 = 100$):

| | |
|---|---|
| $P_2O_5$ | 49 |
| $Al_2O_3$ | 48 |
| $GeO_2$ | 3. |

A sample of the product was analyzed and the following chemical analysis obtained:

| Component | Weight percent |
|---|---|
| Carbon | 6.3 |
| Nitrogen | 0.92 |
| $GeO_2$ | 2.7 |
| $Al_2O_3$ | 35.9 |
| $P_2O_5$ | 50.3 |

The above chemical analysis corresponds to a product composition, in molar oxide ratios, of:

$$0.19TEAOH:1.0Al_2O_3:0.07GeO_2:1.01P_2O_5.$$

A sample of the product was calcined in air at 600° C. for three hours. The calcined sample was utilized in adsorption studies using a standard McBain-Bakr gravimetric adsorption apparatus. Before being used in the adsorption tests, the sample was activated by heating at 350° C. in vacuum for 16 hours. The following data were generated in the adsorption studies:

| Adsorbate | Kinetic Diameter (Å) | Pressure (Torr) | Temp. °C. | Wt. % Adsorbed |
|---|---|---|---|---|
| $O_2$ | 3.46 | 100 | −183 | 14.0 |
| Neopentane | 6.2 | 700 | 23 | 6.8 |
| n-Hexane | 4.3 | 45 | 22 | 6.9 |
| n-Butane | 4.3 | 700 | 22 | 6.7 |
| iso-Butane | 5.0 | 700 | 22 | 5.7 |
| $H_2O$ | 2.65 | 4.6 | 22 | 4.7 |

From the above data, the pore size of the calcined product was determined to be greater than about 6.2 Å, as shown by the adsorption of neopentane (kinetic diameter of 6.2 Å).

Example 50

(Preparation of GeAPO-17)

A solution was formed by combining 23.1 grams of 85 wt. percent orthophosphoric acid ($H_3PO_4$) with 42.5 grams of water. To this solution were added 16.1 grams of the alumina extrudate prepared in Example 47 above, and the mixture was stirred. To the resultant mixture were slowly added 9.9 grams of cyclohexylamine (CHA), and the resultant mixture was blended until homogeneous. The composition of the final reaction mixture thus produced, expressed in terms of the molar oxide ratios of the components of the reaction mixture, was:

$$1.23CHA:0.29GeO_2:1.00Al_2O_3:1.24P_2O_5:H_2O.$$

This final reaction mixture was digested by sealing it in a stainless steel pressure vessel lined with polytetrafluoroethylene and heating it in an oven at 200° C. under autogenous pressure for 72 hours. The solids in the reaction mixture were recovered by centrifugation and dried in air at room temperature and then at 100° C. overnight.

A sample of the dried solid reaction product wa subjected to X-ray powder diffraction analysis. This analysis showed that the major crystalline phase of the product was GeAPO-17 having a X-ray powder diffraction pattern, as synthesized, characterized by the data in the following Table IX:

TABLE IX

| 2θ | d(Å) | Relative Intensity 100 × $I/I_o$ |
|---|---|---|
| 7.7 | 11.42 | 100 |
| 9.8 | 9.10 | 40 |
| 13.4 | 6.608 | 55 |
| 14.6 | 6.050 | 15 |
| 15.5 | 5.727 | 30 |
| 20.5 | 4.332 | 65 |
| 23.3 | 3.822 | 15 |
| 23.8 | 3.733 | 15 |
| 26.9 | 3.312 | 20 |
| 31.2 | 2.866 | 20 |
| 31.8 | 2.814 | 20 |
| 49.7 | 1.835 | 15 |

Scanning electron microscopy of the solid product showed numerous crystals with a morphology corresponding to that expected for GeAPO-17. EDAX microprobe analysis of one of the clean crystals indicated the following approximate weight composition (normalized to $P_2O_5+Al_2O_3+GeO_2=100$):

| | |
|---|---|
| $P_2O_5$ | 48 |
| $Al_2O_3$ | 48 |
| $GeO_2$ | 4. |

A sample of the product was analyzed and the following chemical analysis obtained:

| Component | Weight percent |
|---|---|
| Carbon | 9.3 |
| Nitrogen | 1.7 |
| $GeO_2$ | 6.1 |
| $Al_2O_3$ | 31.9 |
| $P_2O_5$ | 43.7 |

The above chemical analysis corresponds to a product composition, on an anhydrous basis, in molar oxide ratios, of:

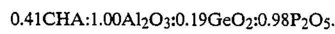
$0.41CHA:1.00Al_2O_3:0.19GeO_2:0.98P_2O_5$.

A sample of the product was calcined in air at 600° C. for three hours. The calcined sample was utilized in adsorption studies using a standard McBain-Baker gravimetric adsorption apparatus. Before used in the adsorption tests, the sample was activated by heating at 350° C. in vacuum for 16 hours. The following data were generated in the adsorption studies:

| Adsorbate | Kinetic Diameter (Å) | Pressure (Torr) | Temp. °C. | Wt. % Adsorbed |
|---|---|---|---|---|
| $O_2$ | 3.46 | 100 | −183 | 10.7 |
| Neopentane | 6.2 | 700 | 23 | 1.1 |
| n-Hexane | 4.3 | 45 | 22 | 3.7 |
| n-Butane | 4.3 | 700 | 22 | 3.8 |
| iso-Butane | 5.0 | 700 | 22 | 0.0 |
| $H_2O$ | 2.65 | 4.6 | 22 | 12.4 |

Example 51

(Preparation of GeAPSO-34)

A solution was formed by combining 9.3 grams of 85 wt. percent orthophosphoric acid ($H_3PO_4$) with 15.2 grams of water and 7.4 grams of 40 wt. percent aqueous tetraethylammonium hydroxide (TEAOH). To this solution were added 6.5 grams of the alumina extrudate prepared in Example 47 above, and the mixture was stirred. To the resultant mixture were added 8.2 grams of dipropylamine (DPA), and the resultant mixture was stirred until homogeneous. Finally, to the resultant mixture was added 2.5 grams of tetraethylorthosilicate ($Si(OC_2H_5)_4$) and the mixture was stirred. The composition of the final reaction mixture thus produced, expressed in terms of the molar oxide ratios of the components of the reaction mixture, was:

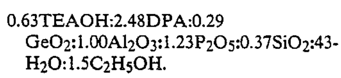
$0.63TEAOH:2.48DPA:0.29GeO_2:1.00Al_2O_3:1.23P_2O_5:0.37SiO_2:43H_2O:1.5C_2H_5OH$.

This final reaction mixture was digested by sealing it in a stainless steel pressure vessel lined with polytetrafluoroethylene and heating it in an oven at 200° C. under autogenous pressure for 72 hours. The solids in the reaction mixture were recovered by centrifugation, washed with water and dried in air at room temperature and then at 100° C. overnight. This analysis showed that the major crystalline phase of the product was GeAPSO-34 having an X-ray powder diffraction pattern, as synthesized, characterized by the data in the following Table X:

TABLE X

| 2θ | d(Å) | Relative Intensity 100 × $I/I_o$ |
|---|---|---|
| 9.5 | 9.28 | 100 |
| 12.9 | 6.89 | 15 |
| 14.1 | 6.28 | 15 |
| 16.0 | 5.53 | 46 |
| 18.0 | 4.92 | 26 |
| 20.6 | 4.31 | 83 |
| 25.3 | 3.58 | 28 |
| 25.9 | 3.45 | 16 |
| 30.6 | 2.93 | 30 |
| 31.3 | 2.86 | 21 |

NON-ZEOLITIC MOLECULAR SIEVES

As already mentioned, the term "non-zeolitic molecular sieves" or "NZMS" is used herein to mean the "SAPO", "ELAPSO", "$AlPO_4$", "MeAPO" (where "Me" is at least one of Mg, Mn, Co and Zn), "FeAPO", "TAPO" and "ELAPO" molecular sieves described in the aforementioned patents and applications relating to non-zeolitic molecular sieves.

In the following discussion on NZMSs, the mole fractions of the NZMSs are defined as compositional values which are plotted in phase diagrams in each of the identified patents, published applications or copending applications relating to non-zeolitic molecular sieves.

SILICOALUMINOPHOSPATE MOLECULAR SIEVES

The preferred NZMSs, to date, are the silicoaluminophosphate molecular sieves described in U.S. Pat. No. 4,440,871, and U.S. Ser. No. 575,745, filed Jan. 31, 1984. The use of such catalysts in reforming catalysts or as components in heretofore employed reforming/dehydrocyclization catalysts provides improved catalysts and provides products characterized by an improved selectivity to iso-products and provides improved activity in reforming/dehydrocyclization reactions.

The silicoaluminophosphate molecular sieves of U.S. Pat. No. 4,440,871 and the aforementioned application Ser. No. 575,745, are disclosed as microporous crystalline silicoaluminophosphates, the pores of which are uniform and have nominal diameters of greater than about 3 Angstroms and whose essential empirical chemical composition in the as-synthesized and anhydrous form is:

$$mR:(Si_xAl_yP_z)O_2$$

wherein "R" represents at least one organic templating agent present in the intracrystalline pore system; "m" represents the moles of "R" present per mole of $(Si_xAl_yP_z)O_2$ and has a value of from 0.02 to 0.3; "x", "y" and "z" represent the mole fractions of silicon, aluminum and phosphorus, respectively, present as tetrahedral oxides, said mole fractions being such that they are within the pentagonal compositional area defined by points A, B, C, D and E of the ternary diagram of FIG. 5 of the aforementioned U.S. Pat. No. 4,440,871, and are preferably within the pentagonal compositional area defined by points a, b, c, d and e of FIG. 6 of this patent. The SAPO molecular sieves of U.S. Pat. No. 4,440,871 and the aforementioned application Ser. No. 575,745 are also described as silicoaluminophosphates having a three-dimensional microporous framework structure of $PO_2^+$, $AlO_2^-$ and $SiO_2$ tetrahedral units, and whose essential empirical chemical composition on an anhydrous basis is:

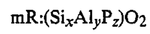

$$mR:(Si_xAl_yP_z)O_2$$

wherein "R" represents at least one organic templating agent present in the intracrystalline pore system; "m" represents the moles of "R" present per mole of $(Si_xAl_yP_z)O_2$ and has a value of from zero to 0.3; "x", "y" and "z" represent, respectively, the mole fractions of silicon, aluminum and phosphorus present in the oxide moiety, said mole fractions being within the compositional area bounded by points A, B, C, D and E on the ternary diagram which is FIG. 5 of the aforementioned patent, said silicoaluminophosphate having a characteristic X-ray powder diffraction pattern which contains at least the d-spacings set forth below in any one of Tables I, III, V, VII, IX, XIII, XVII, XXI, XXIII or XXV of U.S. Pat. No. 4,440,871. Further, the as-synthesized crystalline silicoaluminophosphates of U.S. Pat. No. 4,440,871 may be calcined at a temperature sufficiently high to remove at least some of any organic templating agent present in the intracrystalline pore system as a result of such synthesis. The silicoaluminophosphates of U.S. Pat. No. 4,440,871 are generally referred to therein as "SAPO", as a class, or as "SAPO-n" wherein "n" is an integer denoting a particular SAPO as its preparation is reported in U.S. Pat. No. 4,440,871. The preparation of the SAPOs is disclosed in U.S. Pat. No. 4,440,871, incorporated herein by reference.

Medium pore(MP)-SAPOs include SAPO-11, SAPO-31, SAPO-40 and SAPO-41.

ELAPSO MOLECULAR SIEVES

"ELAPSO" molecular sieves are described in copending U.S. Ser. No. 600,312, filed April 13, 1984, (EPC Publication No. 0159,624, published Oct. 30, 1985, incorporated herein by reference) as crystalline molecular sieves having three-dimensional microporous framework structures of $ELO_2$, $AlO_2$, $PO_2$, $SiO_2$ oxide units and having an empirical chemical composition on an anhydrous basis expressed by the formula:

$$mR:(EL_wAl_xP_ySi_z)O_2$$

wherein "R" represents at least one organic templating agent present in the intracrystalline pore system; "m" represents the molar amount of "R" present per mole of $(EL_wAl_xP_ySi_z)O_2$ and has a value of from zero to about 0.3; "EL" represents at least one element capable of forming a three dimensional oxide framework, "EL" being characterized as an element having a mean "T-O" distance in tetrahedral oxide structures between about 1.51 Angstroms and about 2.06 Angstroms, "EL" having a cation electronegativity between about 125 kcal/g-atom to about 10 kcal/gm-atom and "EL" being capable of forming stable M-O-P, M-O-Al or M-O-M bonds in crystalline three dimensional oxide structures having a "M-O" bond dissociation energy greater than about 59 kcal/g-atom at 298° K.; and "w", "x", "y" and "z" represent the mole fractions of "EL", aluminum, phosphorus and silicon, respectively, present as framework oxides, said mole fractions being within the limiting compositional values or points as follows:

| Point | Mole Fraction | | |
|---|---|---|---|
| | x | y | (z + w) |
| A | 0.60 | 0.3-(0.01)p | 0.01(p + 1) |
| B | 0.39-(0.01 p) | 0.60 | 0.01(p + 1) |
| C | 0.01 | 0.60 | 0.39 |
| D | 0.01 | 0.01 | 0.98 |
| E | 0.60 | 0.01 | 0.39 |

where "p" is an integer corresponding to the number of elements "El" in the $(El_wAl_xP_ySi_z)O_2$ constituent.

The "ELAPSO" molecular sieves are also described as crystalline molecular sieves having three-dimensional microporous framework structures of $ELO_2$, $AlO_2$, $SiO_2$ and $PO_2$ tetrahedral oxide units and having an empirical chemical composition on an anhydrous basis expressed by the formula:

$$mR:(EL_wAl_xP_ySi_z)O_2$$

wherein "R" represents at least one organic templating agent present in the intracrystalline pore system; "m" represents the molar amount of "R" present per mole of $(EL_wAl_xP_ySi_z)O_2$ and has a value of from zero to about 0.3; "EL" represents at least one element capable of forming a framework tetrahedral oxide and is selected from the group consisting of arsenic, beryllium, boron, chromium, cobalt, gallium, germanium, iron, lithium, magnesium, manganese, titanium and zinc; and "w", "x", "y" and "z" represent the mole fractions of "EL", aluminum, phosphorus and silicon, respectively, present as tetrahedral oxides, said mole fractions being within the limiting compositional values or points as follows:

| Point | Mole Fraction | | |
|---|---|---|---|
| | x | y | (z + w) |
| a | 0.60 | 0.39-(0.01)p | 0.01(p + 1) |
| b | 0.39-(0.01 p) | 0.60 | 0.01(p + 1) |

-continued

| Point | Mole Fraction | | |
|---|---|---|---|
| | x | y | (z + w) |
| c | 0.10 | 0.55 | 0.35 |
| d | 0.55 | 0.10 | 0.35 |

where "p" is as above defined.

A list of the numerous copending and commonly assigned applications, and certain issued patents, describing ELAPSO non-zeolitic molecular sieves has already been given above and will not be repeated here, but each individual group of ELAPSOs will no be described in more detail.

TiAPSO MOLECULAR SIEVES

The TiAPSO molecular sieves of U.S. Ser. Nos. 600,179, filed April 13, 1984 (now U.S. Pat. No. 4,684,617), and 49,274, filed May 13, 1987, have three-dimensional microporous framework structures of $TiO_2$, $AlO_2$, $PO_2$ and $SiO_2$ tetrahedral oxide units having an empirical chemical composition on an anhydrous basis expressed by the formula:

$$mR:(Ti_wAl_xP_ySi_z)O_2$$

wherein "R" represents at least one organic templating agent present in the intracrystalline pore system; "m" represents the molar amount of "R" present per mole of $(Ti_wAl_xP_ySi_z)O_2$ and has a value of from zero to about 0.3; and "w", "x", "y" and "z" represent the mole fractions of titanium, aluminum, phosphorus and silicon, respectively, present as tetrahedral oxides and each has a value of at least 0.01. The mole fractions "w", "x", "y" and "z" are generally defined as being within the limiting compositional values or points as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a subclass of TiAPSO molecular sieves the values "w", "x", "y" and "z" in the above formula are within the tetragonal compositional area defined by points a, b, c and d, said points a, b, c and d representing the following values for "w", "x", "y" and "z" :

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0 35 |
| d | 0.55 | 0.10 | 0.35 |

In synthesizing the TiAPSOs, it is preferred to employ a reaction mixture composition expressed in terms of the molar ratios as follows:

$$aR:(Ti_wAl_zP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and about 300; and "w", "x", "y" and "z" represent the mole fractions of titanium, aluminum, phosphorus and silicon, respectively, and each has a value of at least 0.01.

In one embodiment the reaction mixture is selected such that the mole fractions "w", "x", "y" and "z" are generally defined as being within the limiting compositional values or points as follows:

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ *mole.*

Preparative Reagents

TiAPSO compositions are typically prepared using numerous regents. Typical reagents which may be employed and abbreviations employed in U.S. Ser. No. 600,179 for such reagents are as follows:

(a) Alipro: aluminum isopropoxide;
(b) LUDOX-LS: LUDOX-LS is the tradename of DuPont for an aqueous solution of 30 weight percent $SiO_2$ and 0.1 weight percent $Na_2O$;
(c) $H_3PO_4$: 85 weight percent aqueous phosphoric acid;
(d) Tiipro: titanium isopropoxide;
(e) TEAOH: 40 weight percent aqueous solution of tetraethylammonium hydroxide;
(f) $Pr_2NH$: di-n-propylamine, $(C_3H_7)_2NH$;
(g) $Pr_3NH$: tri-n-propylamine, $(C_3H_7)_3N$;
(h) Quin: Quinuclidine, $(C_7H_{13}N)$;
(i) MQuin: Methyl Quinuclidine hydroxide, $(C_7H_{13}NCH_3OH)$; and
(j) C-hex: cyclohexylamine.

MgAPSO MOLECULAR SIEVES

The MgAPSO molecular sieves of U.S. Ser. No. 600,180, filed April 13, 1984 have three-dimensional microporous framework structures of $MgO_2$, $AlO_2$, $PO_2$ and $SiO_2$ tetrahedral oxide units and have an empirical chemical composition on an anhydrous basis expressed by the formula:

$$mR:(Mg_wAl_xP_ySi_z)O_2$$

wherein "R" represents at least one organic templating agent present in the intracrystalline pore system; "m" represents the molar amount of "R" present per mole of $(Mg_wAl_xP_ySi_z)O_2$ and has a value from zero (0) to about 0.3; and "w", "x", "y" and "z" represent the mole fractions of magnesium, aluminum, phosphorus and silicon, respectively, present as tetrahedral oxides and each preferably has a value of at least 0.01. The mole fractions "w", "x", "y" and "z" are generally defined as being within the limiting compositional values or points as follows:

| Point | Mole Fraction | | |
|---|---|---|---|
| | x | y | (z + w) |
| A | 0.60 | 0.38 | 0.02 |
| B | 0.39 | 0.59 | 0.02 |
| C | 0.01 | 0.60 | 0.39 |
| D | 0.01 | 0.01 | 0.98 |
| E | 0.60 | 0.01 | 0.39 |

In a preferred subclass of the MgAPSO molecular sieves the values "w", "x", "y" and "z" in the above formula are within the limiting compositional values or points as follows:

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

In synthesizing the MgAPSO compositions, it is preferred to employ reaction mixture compositions expressed in terms of the molar ratios as follows:

$$aR:(Mg_wAl_xP_ySi_z)O_2:bH_2O$$

wherein "R" is an organic templating agent; "a" is the amount of organic templating agent "R" and can have a value within the range of from zero (0) to about 6 and is more preferably an effective amount greater than zero to about 6; "b" has a value of from zero (0) to about 500, preferably between about 2 and about 300; and "w", "x", "y" and "z" represent the mole fractions of magnesium, aluminum, phosphorus and silicon, respectively, and each has a value of at least 0.01.

In one embodiment the reaction mixture is selected such that the mole fractions "w", "x", "y" and "z" are generally defined as being within the limiting compositional values or points as follows:

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ *mole.*

Preparative Reagents

MgAPSO compositions are prepared using numerous reagents. Typical reagents which may be employed to prepare MgAPSOs include:

(a) Alipro: aluminum isopropoxide;
(b) CATAPAL: Trademark of Condea for hydrated pseudoboehmite;
(c) LUDOX-LS: Trademark of DuPont for an aqueous solution of 30 weight percent $SiO_2$ and 0.1 weight percent $Na_2O$;
(d) $Mg(Ac)_2$ magnesium acetate tetrahydrate, $Mg(C_2H_3O_2)\cdot 4H_2O$;
(e) $H_3PO_4$: 85 weight percent aqueous phosphoric acid in water;
(f) TBAOH: tetrabutylammonium hydroxide (40 wt. % in water);
(g) $Pr_2NH$: di-n-propylamine;
(h) $Pr_3NH$: tri-n-propylamine;
(i) Quin: Quinuclidine;
(j) MQuin: Methyl Quinuclidine hydroxide, (17.9% in water);
(k) C-hex: cyclohexylamine;
(l) TEAOH: tetraethylammonium hydroxide (40 wt. % in water);
(m) DEEA: Diethylethanolamine;
(n) i-$Pr_2NH$: di-isopropylamine;
(o) TEABr: tetraethylammonium bromide; and
(p) TPAOH: tetrapropylammonium hydroxide (40 wt. % in water).

MnAPSO MOLECULAR SIEVES

The MnAPSO molecular sieves of U.S. Ser. No. 600,175, filed April 13, 1984 (now U.S. Pat. No. 4,686,092 issued August 11, 1987), have a framework structure of $MnO_2^{-2}$, $AlO_2^-$, $PO_2^+$ and $SiO_2$ tetrahedral units having an empirical chemical composition on an anhydrous basis expressed by the formula:

$$mR:(Mn_wAl_xP_ySi_z)O_2$$

wherein "R" represents at least one organic templating agent present in the intracrystalline pore system; "m" represents the molar amount of "R" present per mole of $(Mn_wAl_xP_ySi_z)O_2$ and has a value of zero to about 0.3; and "w", "x", "y" and "z" represent the mole fractions of the elements manganese, aluminum, phosphorus and silicon, respectively, present as tetrahedral oxides. The mole fractions "w", "x", "y" and "z" are generally defined as being within the limiting compositional values or points as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

The values of w, x, y and z may be as follows:

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

In synthesizing the MnAPSO compositions, it is preferred to employ a reaction mixture composition expressed in terms of the molar ratios as follows:

$$aR:(Mn_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and about 300; and "w", "x", "y" and "z" represent the mole fractions of manganese, aluminum, phosphorus and silicon, respectively, and each has a value of at least 0.01.

In one embodiment the reaction mixture is selected such that the mole fractions "w", "x", "y" and "z" are generally defined as being within the limiting compositional values or points as follows:

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ *mole.*

Preparative Reagents

MnAPSO compositions may be prepared by using numerous reagents. Reagents which may be employed to prepare MnAPSOs include:

(a) Alipro: aluminum isopropoxide;
(b) CATAPAL: Trademark of Condea Corporation for hydrated pseudoboehmite;
(c) LUDOX-LS: LUDOX-LS is the tradename of DuPont for an aqueous solution of 30 weight percent $SiO_2$ and 0.1 weight percent $Na_2O$;
(d) $H_3PO_4$: 85 weight percent aqueous phosphoric acid;
(e) MnAc: Manganese acetate, $Mn(C_2H_3O_2)_2.4H_2O$;
(f) TEAOH: 40 weight percent aqueous solution of tetraethylammonium hydroxide;
(g) TBAOH: 40 weight percent aqueous solution of tetrabutylammonium hydroxide;
(h) $Pr_2NH$: di-n-propylamine, $(C_3H_7)_2NH$;
(i) $Pr_3N$: tri-n-propylamine, $(C_3H_7)_3N$;
(j) Quin: Quinuclidine, $(C_7H_{13})N$;
(k) MQuin: Methyl Quinuclidine hydroxide, $(C_7H_{13}NCH_3OH)$;
(l) C-hex: cyclohexylamine;
(m) TMAOH: tetramethylammonium hydroxide;
(n) TPAOH: tetrapropylammonium hydroxide; and
(o) DEEA: 2-diethylaminoethanol.

CoAPSO MOLECULAR SIEVES

The CoAPSO molecular sieves of U.S. Ser. No. 600,174, filed April 13, 1984 have three-dimensional microporous framework structures of $CoO_2^-$, $AlO_2^-$, $PO_2^+$ and $SiO_2$ tetrahedral units and have an empirical chemical composition on an anhydrous basis expressed by the formula:

$$mR:(Co_wAl_xP_ySi_z)O_2$$

wherein "R" represents at least one organic templating agent present in the intracrystalline pore system; "m" represents the molar amount of "R" present per mole of $(Co_wAl_xP_ySi_z)O_2$ and has a value of from zero to about 0.3; and "w", "x", "y" and "z" represent the mole fractions of cobalt, aluminum, phosphorus and silicon, respectively, present as tetrahedral oxides, where the mole fractions "w", "x", "y" and "z" are each at least 0.01 and are generally defined, as being within the limiting compositional values or points as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of the CoAPSO molecular sieves the values of "w", "x", "y", and "z" in the above formula are within the limiting compositional values or points as follows:

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

In synthesizing the CoAPSOs, it is preferred to employ a reaction mixture composition expressed in terms of the molar ratios as follows:

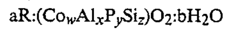

$$aR:(Co_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6; "b" ,has a value of from zero (0) to about 500, preferably between about 2 and 300; and "w", "x", "y" and "z" represent the mole fractions of cobalt, aluminum, phosphorus and silicon, respectively, and each has a value of at least 0.01. In a preferred embodiment the reaction mixture is selected such that the mole fractions "w", "x", "y" and "z" are generally defined as being within the limiting compositional values or points as follows:

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ *mole.*

Preparative Reagents

CoAPSO compositions may be prepared using numerous reagents. Reagents which may be employed to prepared CoAPSOs include:

(a) Alipro: aluminum isopropoxide;
(b) CATAPAL: Trademark of Condea Corporation for pseudoboehmite;
(c) LUDOX-LS: Trademark of DuPont for an aqueous solution of 30 weight percent $SiO_2$ and 0.1 weight percent $Na_2O$;

(d) $Co(Ac)_2$: cobalt acetate, $Co(C_2H_3O_2)_2.4H_2O$;
(e) $CoSO_4$ cobalt sulfate, $(CoSO_4.7H_2O)$;
(f) $H_3PO_4$: 85 weight percent phosphoric acid in water;
(g) TBAOH: tetrabutylammonium hydroxide (25 wt % in methanol);
(h) $Pr_2NH$: di-n-propylamine, $(C_3H_7)_2NH$;
(i) $Pr_3N$: tri-n-propylamine, $(C_3H_7)_3N$;
(j) Quin: Quinuclidine $(C_7H_{13}N)$;
(k) MQuin: Methyl Quinuclidine hydroxide, $(C_7H_{13}NCH_3OH)$;
(l) C-hex: cyclohexylamine;
(m) TEAOH: tetraethylammonium hydroxide (40 wt. % in water);
(n) DEEA: diethanolamine;
(o) TPAOH: tetrapropylammonium hydroxide (40 wt. % in water); and
(p) TMAOH: tetramethylammonium hydroxide (40 wt. % in water).

ZnAPSO MOLECULAR SIEVES

The ZnAPSO molecular sieves of U.S. Ser. No. 600,170, filed April 13, 1984 comprise framework structures of $ZnO_2^{-2}$, $AlO_2^-$, $PO_2^+$ and $SiO_2$ tetrahedral units having an empirical chemical composition on an anhydrous basis expressed by the formula:

$$mR:(Zn_wAl_xP_ySi_z)O_2$$

wherein "R" represents at least one organic templating agent present in the intracrystalline pore system; "m" represents the molar amount of "R" present per mole of $(Zn_wAl_xyPSi_z)O_2$ and has a value of zero to about 0.3; and "w", "x", "y" and "z" represent the mole fractions of zinc, aluminum, phosphorus and silicon, respectively, present as tetrahedral oxides and each has a value of at least 0.01. The mole fractions "w", "x", "y" and "z" are generally defined being within the limiting compositional values or points as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of ZnAPSO molecular sieves the values "w", "x", "y" and "z" in the above formula are within the limiting compositional values or points as follows:

| Point | Mole Fraction | | |
|---|---|---|---|
| | x | y | (z + w) |
| a | 0.55 | 0.43 | 0.02 |
| b | 0.43 | 0.55 | 0.02 |
| c | 0.10 | 0.55 | 0.35 |
| d | 0.55 | 0.10 | 0.35 |

In synthesizing the ZnAPSO compositions, it is preferred to employ a reaction mixture composition expressed in terms of the molar ratios as follows:

$$aR:(Zn_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, more preferably between about 2 and about 300; and "w", "x", "y" and "z" represent the mole fractions of zinc, aluminum, phosphorus and silicon, respectively, and each has a value of at least 0.01. In a preferred embodiment the reaction mixture is selected such that the mole fractions "w", "x", "y" and "z" are generally defined as being within the limiting compositional values or points as follows:

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ *mole.*

Preparative Reagents

ZnAPSO compositions are typically prepared using numerous reagents. Reagents which may be employed to prepare ZnAPSOs include:
(a) Alipro: aluminum isopropoxide;
(b) LUDOX-LS: LUDOX-LS is the trade name of DuPont for a aqueous solution of 30 weight percent $SiO_2$ and 0.1 weight percent $Na_2O$;
(c) CATAPAL: Trademark of Condea Corporation for hydrated pseudoboehmite;
(d) $H_3PO_4$: 85 weight percent aqueous phosphoric acid;
(e) ZnAc: Zinc Acetate, $Zn(C_2H_3O_2)_2.4H_2O$;
(f) TEAOH: 40 weight percent aqueous solution of tetraethylammonium hydroxide;
(g) TBAOH: 40 weight percent aqueous solution of tetrabutylammonium hydroxide;
(h) TMAOH: Tetramethylammonium hydroxide pentahydrate, $(CH_3)_4NOH.5H_2O$;
(i) TPAOH: 40 weight percent aqueous solution of tetrapropylammonium hydroxide, $(C_3H_7)_4NOH$;
(j) $Pr_2NH$: di-n-propylamine, $(C_3H_7)_2NH$;
(k) $Pr_3N$: Tri-n-propylamine, $(C_3H_7)_3N$;
(l) Quin: Quinuclidine, $(C_7H_{13}N)$;
(m) C-hex: cyclohexylamine; and
(n) DEEA: diethylethanolamine, $(C_2H_5)_2NC_2H_5OH$.

FeAPSO MOLECULAR SIEVES

The FeAPSO molecular sieves of U.S. Ser. No. 600,173, filed April 13, 1984 (now U.S. Pat. No. 4,683,217) have three-dimensional microporous crystal framework structures of $FeO_2^{-2}$, (and/or $FeO_2^-$), $AlO_2^-$, $PO_2^+$ and $SiO_2$ tetrahedral oxide units and having a unit empirical formula, on an anhydrous basis, of:

$$mR:(Fe_wAl_xP_ySi_z)O_2$$

wherein "R" represents at least one organic templating agent present in the intracrystalline core system; "m" represents the moles of "R" present per mole of $(Fe_wAl_xP_ySi_z)O_2$ and has a value of from zero (0) to about 0.3; the maximum value of "m" in each case depends upon the molecular dimensions of the templating agent and the available void volume of the pore system of the particular molecular sieve involved; and "w", "x", "y" and "z" represent the mole fractions of iron, aluminum, phosphorus and silicon, respectively, present as tetrahedral oxides, said mole fractions being such that they are within the limiting compositional values or points as follows:

| Point | Mole Fraction x | y | (z + w) |
|---|---|---|---|
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

The values of w, x, y and z may be as follows:

| Point | Mole Fraction x | y | (z + w) |
|---|---|---|---|
| a | 0.55 | 0.43 | 0.02 |
| b | 0.43 | 0.55 | 0.02 |
| c | 0.10 | 0.55 | 0.35 |
| d | 0.55 | 0.10 | 0.35 |

Preparative Reagents

FeAPSO compositions may be prepared using numerous reagents. Reagents which may employed to prepare FeAPSOs include:

(a) Alipro: aluminum isopropoxide, $Al(OCH(CH_3)_2)_3$;
(b) LUDOX-LS: LUDOX-LS is the trademark of Du Pont for an aqueous solution of 30 weight percent $SiO_2$ and 0.1 weight percent $Na_2O$;
(c) CATAPAL: trademark for hydrated aluminum oxide containing about 75 wt. percent $Al_2O_3$ (pseudo-boehmite phase) and about 25 wt. percent water;
(d) $Fe(Ac)_2$: Iron (II) acetate;
(e) $FeSO_4$: Iron (II) sulfate hexahydrate;
(f) $H_3PO_4$: 85 weight percent phosphoric acid in water;
(g) TEAOH: 40 weight percent aqueous solution of tetraethylammonium hydroxide;
(h) TBAOH: 40 weight percent aqueous solution of tetrabutylammonium hydroxide;
(i) $Pr_2NH$: di-n-propylamine ($(C_3H_7)_2NH$);
(j) $Pr_3N$: tri-n-propylamine ($(C_3H_7)_3N$);
(k) Quin: Quinuclidine ($C_7H_{13}N$);
(l) MQuin: Methyl Quinuclidine hydroxide ($C_7H_{13}NCH_3OH$);
(m) TMAOH: tetramethylammonium hydroxide pentahydrate; and
(o) C-hex: cyclohexylamine.

QUINARY MOLECULAR SIEVES

The QuinAPSO quinary molecular sieves of U.S. Ser. Nos. 600,168 and 600,181, both filed April 13, 1984, have three-dimensional microporous framework structures of $MO_2$, $AlO_2$, $PO_2$ and $SiO_2$ tetrahedral units having an empirical chemical composition on an anhydrous basis expressed by the formula:

$$mR:(M_wAl_xP_ySi_z)O_2$$

wherein "R" represents at least one organic templating agent present in the intracrystalline pore system; "m" represents the molar amount of "R" present per mole of $(M_wAl_xP_ySi_z)O_2$ and has a value of from zero (0) to about 0.3; M represents at least two elements selected from the group consisting of arsenic, beryllium, boron, chromium, cobalt, gallium, germanium, iron, lithium, magnesium, manganese, titanium, vanadium and zinc; and "w", "x", "y" and "z" represent the mole fractions of M, aluminum, phosphorus and silicon, respectively, present as tetrahedral oxides. Preferably, M represents the combination of cobalt and manganese. The mole fractions "w", "x", "y", and "z" are generally defined as being within the limiting compositional values or points as follows:

| Point | Mole Fraction x | y | (z + w) |
|---|---|---|---|
| A | 0.60 | 0.37 | 0.03 |
| B | 0.37 | 0.60 | 0.03 |
| C | 0.01 | 0.60 | 0.39 |
| D | 0.01 | 0.01 | 0.98 |
| E | 0.60 | 0.01 | 0.39 |

Preferably the mole fractions w, x, y and z will fall within the limiting compositional values or points as follows:

| Point | Mole Fraction x | y | (z + w) |
|---|---|---|---|
| a | 0.60 | 0.37 | 0.03 |
| b | 0.37 | 0.60 | 0.03 |
| c | 0.01 | 0.60 | 0.39 |
| d | 0.01 | 0.39 | 0.60 |
| e | 0.39 | 0.01 | 0.60 |
| f | 0.60 | 0.01 | 0.39 |

In synthesizing the QuinAPSO compositions, it is preferred to employ a reaction mixture composition expressed in terms of the molar ratios as follows:

$$aR:(M_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and about 300; and "w", "x", "y", and "z" represent the mole fractions of elements M, aluminum, phosphorus and silicon, respectively, and each has a value of at least 0.01.

In one embodiment the reaction mixture is selected such that the mole fractions "w", "x", "y" and "z" are generally defined as being within the limiting compositional values or points as follows:

| Point | Mole Fraction x | y | (z + w) |
|---|---|---|---|
| F | 0.60 | 0.37 | 0.03 |
| G | 0.37 | 0.60 | 0.03 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ *mole. QuinAPSO compositions were prepared using numerous reagents; the appropriate sources of the various*

*elements M are the same as those used in the preparation of the various APO and APSO molecular sieves containing the same elements, as described in detail above and below.*

Reagents which may be employed to prepare QuinAPSOs include:

(a) Alipro: aluminum isopropoxide;
(b) LUDOX-LS: LUDOX-LS is the tradename of DuPont for an aqueous solution of 30 weight percent $SiO_2$ and 0.1 weight percent $Na_2O$;
(c) $H_3PO_4$: 85 weight percent phosphoric acid;
(d) MnAc: Manganese acetate, $Mn(C_2H_3O_2)_2.4H_2O$ (for QuinAPSOs containing manganese);
(e) CoAc: Cobalt Acetate, $Co(C_2H_3O_2)_2.4H_2O$ (for QuinAPSOs containing cobalt);
(f) TEAOH: 40 weight percent aqueous solution of tetraethylammonium hydroxide; and
(g) $Pr_2NH$: di-n-propylamine, $(C_3H_7)_2NH$.

CoMnMgAPSO MOLECULAR SIEVES

The CoMnMgAPSO senary molecular sieves of U.S. Ser. Nos. 600,182, filed April 13, 1984, and 57,648 filed June 9, 1987, have three-dimensional microporous framework structures of $CoO_2^{-2}$, $MnO_2^{-2}$, $MgO_2^{-2}$, $AlO_2$, $PO_2$ and $SiO_2$ tetrahedral oxide units having an empirical chemical composition on an anhydrous basis expressed by the formula:

$mR:(Co_tMn_uMg_vAl_xP_ySi_z)O_2$ wherein "R" represents at least one organic templating agent present in the intracrystalline pore system; "m" represents the molar amount of "R" present per mole of $(Co_tMn_uMg_vAl_xP_ySi_z)O_2$ and has a value of from zero (0) to about 0.3; "t", "u", and "v", "x", "y" and "z" represent the mole fractions of cobalt, manganese, magnesium, aluminum, phosphorus and silicon, respectively, present as tetrahedral oxides and each has a value of at least 0.01. The mole fractions "t", "u", "v", "x", "y" and "z" are generally defined as being within the limiting compositional values or points as follows:

| Point | Mole Fraction x | y | (z + w) |
|---|---|---|---|
| A | 0.60 | 0.36 | 0.04 |
| B | 0.36 | 0.60 | 0.04 |
| C | 0.01 | 0.60 | 0.39 |
| D | 0.01 | 0.01 | 0.98 |
| E | 0.60 | 0.01 | 0.39 |

In a preferred subclass of the CoMnMgAPSO molecular sieves the values of "w", "x", "y" and "z" in the above formula are within the limiting compositional values or points as follows:

| Point | Mole Fraction x | y | (z + w) |
|---|---|---|---|
| a | 0.55 | 0.41 | 0.04 |
| b | 0.41 | 0.55 | 0.04 |
| c | 0.10 | 0.55 | 0.35 |
| d | 0.55 | 0.10 | 0.35 |

In synthesizing the CoMnMgAPSO compositions, it is preferred to employ a reaction mixture composition expressed in terms of the molar ratios as follows:

$aR:(Co_tMn_uMg_vAl_xP_ySi_z)O_2:bH_2O$ wherein "R" is an organic templating agent; "a" is the amount of organic templating agent "R" and has a value of from zero to about 6 and is preferably an effective amount within the range of greater than zero (0) to about 6 and more preferably from greater than zero to about 2; "b" has a value of from zero (0) to about 500, preferably between about 2 and about 300; and "t", "u", "v", "x", "y", and "z" represent the mole fractions of cobalt, manganese, magnesium, aluminum, phosphorus and silicon, respectively, and each has a value of at least 0.01.

In a preferred embodiment the reaction mixture is selected such that the mole fractions "w", "x", "y" and "z", where "w" is the sum of "t"+"u"+"v", are generally defined as being within the limiting compositional values or points as follows:

| Point | Mole Fraction x | y | (z + w) |
|---|---|---|---|
| F | 0.60 | 0.36 | 0.04 |
| G | 0.36 | 0.60 | 0.04 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "t", "u", "v", "x", "y" and "z" such that $(t+u+v+x+y+z)=1.00$ *mole.*

Preparative Reagents

CoMnMgAPSO compositions may be prepared by using numerous reagents. Reagents which may be employed to prepare CoMnAPSOs include:

(a) Alipro: aluminum isopropoxide;
(b) LUDOX-LS: LUDOX-LS is the tradename of Du Pont for an aqueous solution of 30 weight percent $SiO_2$ and 0.1 weight percent $Na_2O$;
(c) $H_3PO_4$: aqueous solution which is 85 weight percent phosphoric acid;
(d) MnAc: Manganese acetate, $Mn(C_2H_3O_2)_2.4H_2O$;
(e) CoAc: Cobalt Acetate, $Co(C_2H_3O_2)_2.4H_2O$;
(f) MgAc: Magnesium Acetate $Mg(C_2H_3O_2).4H_2O$;
(g) TEAOH: 40 weight percent aqueous solution of tetraethylammonium hydroxide; and
(h) $Pr_2NH$: di-n-propylamine, $(C_3H_7)2NH$.

SenAPSO MOLECULAR SIEVES

The SenAPSO molecular sieves of U.S. Ser. No. 600,183, filed Apr. 13, 1984 have three-dimensional microporous framework structures of $MO_2^n$, $AlO_2^-$, $PO_2^+$ and $SiO_2$ tetrahedral oxide units, where "n" is −3, −2, −1, 0 or +1, and have an empirical chemical composition on an anhydrous basis expressed by the formula:

$mR:(M_wAl_xP_ySi_z)O_2$ wherein "R" represents at least one organic templating agent present in the intracrystalline pore system; "m" represents the molar amount of "R" present per mole of $(M_wAl_xP_ySi_z)O_2$, and has a value of from zero to about 0.3; "M" represents three elements selected from the group consisting of arsenic, beryllium, boron, chromium, cobalt, gallium, germanium, iron, lithium, magnesium, manganese, titanium, vanadium and zinc; "n" may have the aforementioned values depending upon the oxidation state of "M"; and "w", "x", "y" and "z" represent the mole fractions of elements "M", aluminum, phosphorus and silicon, respectively, present as tetrahedral oxides The mole fractions "w", "x", "y" and "z" are generally defined as being within the limiting compositional values or points as follows, wherein "w" denotes the combined mole fractions of the three elements "M" such that "w"="$w_1$"+"$w_2$"+"$w_3$" and each element "M" has a mole fraction of at least 0.01:

| Point | Mole Fraction x | y | (z + w) |
|---|---|---|---|
| A | 0.60 | 0.36 | 0.04 |
| B | 0.36 | 0.60 | 0.04 |
| C | 0.01 | 0.60 | 0.39 |
| D | 0.01 | 0.01 | 0.98 |
| E | 0.60 | 0.01 | 0.39 |

In a preferred subclass of the SenAPSO molecular sieves the values of "w", "x", "y" and "z" in the above formula are within the limiting compositional values or points as follows:

| Point | Mole Fraction x | y | (z + w) |
|---|---|---|---|
| a | 0.60 | 0.36 | 0.04 |
| b | 0.36 | 0.60 | 0.04 |
| c | 0.01 | 0.60 | 0.39 |
| d | 0.01 | 0.39 | 0.60 |
| e | 0.39 | 0.01 | 0.60 |
| f | 0.60 | 0.01 | 0.39 |

In synthesizing the SenAPSO compositions, it is preferred to employ a reaction mixture composition expressed in terms of the molar ratios as follows:

$$aR:(M_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6 and more preferably from greater than zero to about 2; "b" has a value of from zero (0) to about 500, preferably between about 2 and about 300; and "w", "x", "y", and "z" represent the mole fractions of elements "M", aluminum, phosphorus and silicon, respectively, and each has a value of at least 0.01, with the proviso that each "M" is present in a mole fraction of at least 0.01.

In a preferred embodiment the reaction mixture is selected such that the mole fractions "w", "x", "y" and "z" are generally defined as being within the limiting compositional values or points as follows:

| Point | Mole Fraction x | y | (z + w) |
|---|---|---|---|
| F | 0.60 | 0.36 | 0.04 |
| G | 0.36 | 0.60 | 0.04 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" *and "z" such that* $(w+x+y+z)=1.00$ *mole. The SenAPSO molecular sieves are prepared using, sources of the elements "M" similar to those described for the other APSO molecular sieves described above and below.*

AsAPSO MOLECULAR SIEVES

The AsAPSO molecular sieves of U.S. Ser. Nos. 599,808, filed Apr. 13, 1984, and 845,484 filed Mar. 31, 1986 have a framework structure of $AsO_2^n$, $Al_2^-$, $PO_2^+$ and $SiO_2$ tetrahedral units having an empirical chemical composition on an anhydrous basis expressed by the formula:

$$mR:(As_wAl_xP_ySi_z)O_2$$

wherein "R" represents at least one organic templating agent present in the intracrystalline pore system; "m" represents the molar amount of "R" present per mole of $(As_wAl_xP_ySi_z)O_2$ and has a value of zero to about 0.3, but is preferably not greater than 0.15; and "w", "x", "y" and "z" represent the mole fractions of the elements arsenic, aluminum, phosphorus and silicon, respectively, present as tetrahedral oxides. The mole fractions "w", "x", "y" and "z" are generally defined as being within the limiting compositional values or points as follows:

| Point | Mole Fraction x | y | (z + w) |
|---|---|---|---|
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of the AsAPSO molecular sieves, the values of w, x, y and z are as follows:

| Point | Mole Fraction x | y | (z + w) |
|---|---|---|---|
| a | 0.60 | 0.38 | 0.02 |
| b | 0.38 | 0.60 | 0.02 |
| c | 0.01 | 0.60 | 0.39 |
| d | 0.01 | 0.39 | 0.60 |
| e | 0.39 | 0.01 | 0.60 |
| f | 0.60 | 0.01 | 0.39 |

In an especially preferred subclass of the AsAPSO molecular sieves, the values of w, x, y and z are as follows:

| Point | Mole Fraction x | y | (z + w) |
|---|---|---|---|
| g | 0.50 | 0.40 | 0.10 |
| h | 0.42 | 0.48 | 0.10 |
| i | 0.38 | 0.48 | 0.14 |
| j | 0.38 | 0.37 | 0.25 |
| k | 0.45 | 0.30 | 0.25 |
| l | 0.50 | 0.30 | 0.20 |

In synthesizing the AsAPSO compositions, it is preferred to employ a reaction mixture composition expressed in terms of the molar ratios as follows:

$$aR:(As_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6, and most preferably not more than about 1.0; "b" has a value of from zero (0) to about 500, preferably between about 2 and about 300, most preferably not greater than about 60; and "w", "x", "y" and "z" represent the mole fractions of arsenic, aluminum, phosphorus and silicon, respectively, and each has a value of at least 0.01.

In one embodiment the reaction mixture is selected such that the mole fractions "w", "x", "y" and "z" are generally defined as being within the limiting compositional values or points as follows:

| Point | Mole Fraction x | y | (z + w) |
|---|---|---|---|
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

Especially preferred reaction mixtures are those containing from about 1 to about 2 total moles of silicon and arsenic, and from about 1 to about 2 moles of aluminum, per mole of phosphorus.

In the foregoing expression of the reaction composition, the reactants are normalized with respect to the total of "w", "x", "y" and "z" such that $(w+x+y+z)=1.00$ *mole.*

Preparative Reagents

AsAPSO compositions may be prepared by using numerous reagents. Reagents which may be employed to prepare AsAPSOs include:

(a) Alipro: aluminum isopropoxide;
(b) CATAPAL: Trademark of Condea Corporation for hydrated pseudoboehmite;
(c) LUDOX-LS: LUDOX-LS is the tradename of DuPont for an aqueous solution of 30 weight percent $SiO_2$ and 0.1 weight percent $Na_2O$;
(d) $H_3PO_4$: 85 weight percent aqueous phosphoric acid;
(e) $As_2O_5$, arsenic(V) oxide;
(f) TEAOH: 40 weight percent aqueous solution of tetraethylammonium hydroxide;
(g) TBAOH: 40 weight percent aqueous solution of tetrabutylammonium hydroxide;
(h) $Pr_2NH$: di-n-propylamine, $(C_3H_7)_2NH$;
(i) $Pr_3N$: tri-n-propylamine, $(C_3H_7)_3N$;
(j) Quin: Quinuclidine, $(C_7H_{13}N)$;
(k) MQuin: Methyl Quinuclidine hydroxide, $(C_7H_{13}NCH_3OH)$;
(l) C-hex: cyclohexylamine;
(m) TMAOH: tetramethylammonium hydroxide;
(n) TPAOH: tetrapropylammonium hydroxide; and
(o) DEEA: 2-diethylaminoethanol;
(p) Tetraalkylorthosilicates, such as tetraethylorthosilicate.

BAPSO MOLECULAR SIEVES

The BAPSO molecular sieves of U.S. Ser. Nos. 600,177, filed Apr. 13, 1984, and 845,255 filed Mar. 28, 1986 have a framework structure of $BO_2^-$, $Al_2^-$, $PO_2^+$ and $SiO_2$ tetrahedral units having an empirical chemical composition on an anhydrous basis expressed by the formula:

$$mR:(B_wAl_xP_ySi_z)O_2$$

wherein "R" represents at least one organic templating agent present in the intracrystalline pore system; "m" represents the molar amount of "R" present per mole of $(B_wAl_xP_ySi_z)O_2$ and has a value of zero to about 0.3, but is preferably not greater than 0.15; and "w", "x", "y" and "z" represent the mole fractions of the elements boron, aluminum, phosphorus and silicon, respectively, present as tetrahedral oxides. The mole fractions "w", "x", "y" and "z" are generally defined as being within the limiting compositional values or points as follows:

| Point | Mole Fraction x | y | (z + w) |
|---|---|---|---|
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of the BAPSO molecular sieves, the values of w, x, y and z are as follows:

| Point | Mole Fraction x | y | (z + w) |
|---|---|---|---|
| a | 0.60 | 0.38 | 0.02 |
| b | 0.38 | 0.60 | 0.02 |
| c | 0.01 | 0.60 | 0.39 |
| d | 0.01 | 0.39 | 0.60 |
| e | 0.39 | 0.01 | 0.60 |
| f | 0.60 | 0.01 | 0.39 |

In an especially preferred subclass of the BAPSO molecular sieves, the values of w, x, y and z are as follows:

| Point | Mole Fraction x | y | (z + w) |
|---|---|---|---|
| g | 0.51 | 0.42 | 0.07 |
| h | 0.45 | 0.48 | 0.07 |
| i | 0.33 | 0.48 | 0.19 |
| j | 0.33 | 0.38 | 0.29 |
| k | 0.36 | 0.35 | 0.29 |
| l | 0.51 | 0.35 | 0.14 |

In synthesizing the BAPSO compositions, it is preferred to employ a reaction mixture composition expressed in terms of the molar ratios as follows:

$$aR:(B_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6, and most preferably not more than about 0.5; "b" has a value of from zero (0) to about 500, preferably between about 2 and about 300, most preferably not greater than about 20; and "w", "x", "y" and "z" represent the mole fractions of boron, aluminum, phosphorus and silicon, respectively, and each has a value of at least 0.01.

In one embodiment the reaction mixture is selected such that the mole fractions "w", "x", "y" and "z" are generally defined as being within the limiting compositional values or points as follows:

| Point | Mole Fraction x | y | (z + w) |
|---|---|---|---|
| F | 0.60 | 0.38 | 0.02 |

-continued

| Point | Mole Fraction x | y | (z + w) |
|---|---|---|---|
| G | 0.38 | 0.60 | 0.02 |
| H | 0.01 | 0.60 | 0.39 |
| I | 0.01 | 0.01 | 0.98 |
| J | 0.60 | 0.01 | 0.39 |

Especially preferred reaction mixtures are those containing from about 1.0 to about 2 total moles of silicon and boron, and from about 0.75 to about 1.25 moles of aluminum, per mole of phosphorus.

In the foregoing expression of the reaction composition, the reactants are normalized with respect to the total of "w", "x", "y" and "z" such that $(w+x+y+z)=1.00$ *mole.*

Preparative Reagents

BAPSO compositions may be prepared by using numerous reagents. Reagents which may be employed to prepare BAPSOs include:

(a) Alipro: aluminum isopropoxide;
(b) CATAPAL: Trademark of Condea Corporation for hydrated pseudoboehmite;
(c) LUDOX-LS: LUDOX-LS is the tradename of DuPont for an aqueous solution of 30 weight percent $SiO_2$ and 0.1 weight percent $Na_2O$;
(d) $H_3PO_4$: 85 weight percent aqueous phosphoric acid;
(e) $H_3BO_3$, boric acid, and trialkyl borates;
(f) TEAOH: 40 weight percent aqueous solution of tetraethylammonium hydroxide;
(g) TBAOH: 40 weight percent aqueous solution of tetrabutylammonium hydroxide;
(h) $Pr_2NH$: di-n-propylamine, $(C_3H_7)_2NH$;
(i) $Pr_3N$: tri-n-propylamine, $(C_3H_7)_3N$;
(j) Quin: Quinuclidine, $(C_7H_{13}N)$;
(k) MQuin: Methyl Quinuclidine hydroxide, $(C_7H_{13}NCH_3OH)$;
(l) C-hex: cyclohexylamine;
(m) TMAOH: tetramethylammonium hydroxide;
(n) TPAOH: tetrapropylammonium hydroxide; and
(o) DEEA: 2-diethylaminoethanol;
(p) Tetraalkylorthosilicates, such as tetraethylorthosilicate.

BeAPSO MOLECULAR SIEVES

The BeAPSO molecular sieves of U.S. Ser. Nos. 600,176, filed Apr. 13, 1984, and 841,752 filed Mar. 20, 1986 have a framework structure of $BeO_2^{-2}$, $AlO_2^-$, $PO_2^+$ and $SiO_2$ tetrahedral units having an empirical chemical composition on an anhydrous basis expressed by the formula:

$$mR:(Be_wAl_xP_ySi_z)O_2$$

wherein "R" represents at least one organic templating agent present in the intracrystalline pore system; "m" represents the molar amount of "R" present per mole of $(Be_wAl_xP_ySi_z)O_2$ and has a value of zero to about 0.3, but is preferably not greater than 0.15; and "w", "x", "y" and "z" represent the mole fractions of the elements beryllium, aluminum, phosphorus and silicon, respectively, present as tetrahedral oxides. The mole fractions "w", "x", "y" and "z" are generally defined as being within the limiting compositional values or points as follows:

| Point | Mole Fraction x | y | (z + w) |
|---|---|---|---|
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of the BeAPSO molecular sieves, the values of w, x, y and z are as follows:

| Point | Mole Fraction x | y | (z + w) |
|---|---|---|---|
| a | 0.60 | 0.38 | 0.02 |
| b | 0.38 | 0.60 | 0.02 |
| c | 0.01 | 0.60 | 0.39 |
| d | 0.01 | 0.39 | 0.60 |
| e | 0.39 | 0.01 | 0.60 |
| f | 0.60 | 0.01 | 0.39 |

In synthesizing the BeAPSO compositions, it is preferred to employ a reaction mixture composition expressed in terms of the molar ratios as follows:

$$aR:(Be_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6, and most preferably not more than about 0.5; "b" has a value of from zero (0) to about 500, preferably between about 2 and about 300, most preferably not greater than about 20; and "w", "x", "y" and "z" represent the mole fractions of beryllium, aluminum, phosphorus and silicon, respectively, and each has a value of at least 0.01.

In one embodiment the reaction mixture is selected such that the mole fractions "w", "x", "y" and "z" are generally defined as being within the limiting compositional values or points as follows:

| Point | Mole Fraction x | y | (z + w) |
|---|---|---|---|
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ *mole.*

Preparative Reagents

BeAPSO compositions may be prepared by using numerous reagents. Reagents which may be employed to prepare BeAPSOs include:

(a) Alipro: aluminum isopropoxide;
(b) CATAPAL: Trademark of Condea Corporation for hydrated pseudoboehmite;
(c) LUDOX-LS: LUDOX-LS is the tradename of DuPont for an aqueous solution of 30 weight percent $SiO_2$ and 0.1 weight percent $Na_2O$;
(d) $H_3PO_4$: 85 weight percent aqueous phosphoric acid;

(e) beryllium sulfate, $BeSO_4$;
(f) TEAOH: 40 weight percent aqueous solution of tetraethylammonium hydroxide;
(g) TBAOH: 40 weight percent aqueous solution of tetrabutylammonium hydroxide;
(h) $Pr_2NH$: di-n-propylamine, $(C_3H_7)_2NH$;
(i) $Pr_3N$: tri-n-propylamine, $(C_3H_7)_3N$;
(j) Quin: Quinuclidine, $(C_7H_{13}N)$;
(k) MQuin: Methyl Quinuclidine hydroxide, $(C_7H_{13}NCH_3OH)$;
(l) C-hex: cyclohexylamine;
(m) TMAOH: tetramethylammonium hydroxide;
(n) TPAOH: tetrapropylammonium hydroxide; and
(o) DEEA: 2-diethylaminoethanol;
(p) Tetraalkylorthosilicates, such as tetraethylorthosilicate.

CAPSO MOLECULAR SIEVES

The CAPSO molecular sieves of U.S. Ser. Nos. 599,830, filed Apr. 13, 1984, and 852,174 filed Apr. 15, 1986 have a framework structure of $CrO_2^n$, $AlO_2^-$, $PO_2^+$ and $SiO_2$ tetrahedral units (where "n" is −1, 0 or +1) having an empirical chemical composition on an anhydrous basis expressed by the formula:

$$mR:(Cr_wAl_xP_ySi_z)O_2$$

wherein "R" represents at least one organic templating agent present in the intracrystalline pore system; "m"represents the molar amount of "R" present per mole of $(Cr_wAl_xP_ysi_z)0_2$ and has a value of zero to about 0.3, but is preferably not greater than 0.15; and "w", "x", "y" and "z" represent the mole fractions of the elements chromium, aluminum, phosphorus and silicon, respectively, present as tetrahedral oxides. The mole fractions "w", "x", "y" and "z" are generally defined as being within the limiting compositional values or points as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of the CAPSO molecular sieves, the values of w, x, y and z are as follows:

| Point | Mole Fraction | | |
|---|---|---|---|
| | x | y | (z + w) |
| a | 0.60 | 0.38 | 0.02 |
| b | 0.38 | 0.60 | 0.02 |
| c | 0.01 | 0.60 | 0.39 |
| d | 0.01 | 0.39 | 0.60 |
| e | 0.39 | 0.01 | 0.60 |
| f | 0.60 | 0.01 | 0.39 |

In an especially preferred subclass of the CAPSO molecular sieves, the values of x and y in the above formula are each within the range of about 0.4 to 0.5 and (z+w) is in the range of about 0.02 to 0.15.

Since the exact nature of the CAPSO molecular sieves is not clearly understood at present, although all are believed to contain $CrO_2$ tetrahedra in the three-dimensional microporous crystal framework structure, it is advantageous to characterize the CAPSO molecular sieves by means of their chemical composition. This is due to the low level of chromium present in certain of the CAPSO molecular sieves prepared to date which makes it difficult to ascertain the exact nature of the interaction between chromium, aluminum, phosphorus and silicon. As a result, although it is believed that $CrO_2$ tetrahedra are substituted isomorphously for $AlO_2$, $PO_2$ or $SiO_2$ tetrahedra, it is appropriate to characterize certain CAPSO compositions by reference to their chemical composition in terms of the mole ratios of oxides.

In synthesizing the CAPSO compositions, it is preferred to employ a reaction mixture composition expressed in terms of the molar ratios as follows:

$$aR:(Cr_wAl_xP_ySi_z)O_2 : bH_2O$$

wherein "R" is an organic templating agent; "a" is the amount of organic templating agent "R" and has a value of from zero to about 6 and is preferably an effective amount within the range of greater than zero (0) to about 6, and most preferably not more than about 0.5; "b" has a value of from zero (0) to about 500, preferably between about 2 and about 300, most preferably not greater than about 20; and "w", "x", "y"and "z" represent the mole fractions of chromium, aluminum, phosphorus and silicon, respectively, and each has a value of at least 0.01.

In one embodiment the reaction mixture is selected such that the mole fractions "w", "x", "y" and "z" are generally defined as being within the limiting compositional values or points as follows:

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

Especially preferred reaction mixtures are those containing from about 0.3 to about 0.5 total moles of silicon and chromium, and from about 0.75 to about 1.25 moles of aluminum, per mole of phosphorus.

In the foregoing expression of the reaction composition, the reactants are normalized with respect to the total of "w", "x", "y" and "z" such that $(w+x+y+z)=1.00$ *mole.*

Preparative Reagents

CAPSO compositions may be prepared by using numerous reagents. Reagents which may be employed to prepare MnAPSOs include:
(a) Alipro: aluminum isopropoxide;
(b) CATAPAL: Trademark of Condea Corporation for hydrated pseudoboehmite;
(c) LUDOX-LS: LUDOX-LS is the tradename of DuPont for an aqueous solution of 30 weight percent $SiO_2$ and 0.1 weight percent Na20;
(d) $H_3PO_4$: 85 weight percent aqueous phosphoric acid;
(e) chromium acetate, and chromium acetate hydroxide;
(f) TEAOH: 40 weight percent aqueous solution of tetraethylammonium hydroxide;
(g) TBAOH: 40 weight percent aqueous solution of tetrabutylammonium hydroxide;
(h) $Pr_2NH$: di-n-propylamine, $(C_3H_7)_2NH$;

(i) $Pr_3N$: tri-n-propylamine, $(C_3H_{73}N$;

(j) Quin: Quinuclidine, $(C_7H_{13}N)$;

(k) MQuin: Methyl Quinuclidine hydroxide, $(C_7H_{13}NCH_3OH)$;

(l) C-hex: cyclohexylamine;

(m) TMAOH: tetramethylammonium hydroxide;

(n) TPAOH: tetrapropylammonium hydroxide; and (o) DEEA: 2-diethylaminoethanol;

Tetraalkylorthosilicates, such as tetraethylorthosilicate.

GaAPSO MOLECULAR SIEVES

The GaAPSO molecular sieves of U.S. Ser. Nos. 599,925, filed Apr. 13, 1984, and 845,985 filed Mar. 31, 1986 have a framework structure of $GaO_2^-$, $AlO_2^-$, $PO_2^+$ and $SiO_2$ tetrahedral units having an empirical chemical composition on an anhydrous basis expressed by the formula:

$$mR:(Ga_wAl_xP_ySi_z)O_2$$

wherein "R" represents at least one organic templating agent present in the intracrystalline pore system; "m"represents the molar amount of "R" present per mole of $(Ga_wAl_xP_ySi_z)O_2$ and has a value of zero to about 0.3, but is preferably not greater than 0.2; and "w", "x", "y" and "z" represent the mole fractions of the elements gallium, aluminum, phosphorus and silicon, respectively, present as tetrahedral oxides. The mole fractions "w", "x", "y" and "z" are generally defined as being within the limiting compositional values or points as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of the GaAPsO molecular sieves, the values of w, x, y and z are as follows:

| Point | Mole Fraction | | |
|---|---|---|---|
| | x | y | (z + w) |
| a | 0.60 | 0.38 | 0.02 |
| b | 0.38 | 0.60 | 0.02 |
| c | 0.01 | 0.60 | 0.39 |
| d | 0.01 | 0.39 | 0.60 |
| e | 0.39 | 0.01 | 0.60 |
| f | 0.60 | 0.01 | 0.39 |

In an especially preferred subclass of the GaAPSO molecular sieves, the values of w, x, y and z are as follows:

| Point | Mole Fraction | | |
|---|---|---|---|
| | x | y | (z + w) |
| g | 0.45 | 0.40 | 0.15 |
| h | 0.33 | 0.52 | 0.15 |
| i | 0.20 | 0.52 | 0.28 |
| j | 0.20 | 0.45 | 0.35 |
| k | 0.36 | 0.29 | 0.35 |
| l | 0.45 | 0.29 | 0.26 |

In synthesizing the GaApSO compositions, it is preferred to employ a reaction mixture composition expressed in terms of the molar ratios as follows:

$$aR:(Ga_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6, and most preferably not more than about 1.0; "b" has a value of from zero (0) to about 500, preferably between about 2 and about 300, most preferably not greater than about 20; and "w", "x", "y"and "z" represent the mole fractions of gallium, aluminum, phosphorus and silicon, respectively, and each has a value of at least 0.01.

In one embodiment the reaction mixture is selected such that the mole fractions "w", "x", "y" and "z" are generally defined as being within the limiting compositional values or points as follows:

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

Especially preferred reaction mixtures are those containing from about 0.5 to about 1.0 total moles of silicon and gallium, and from about 0.75 about 1.25 moles of aluminum, per mole of phosphorus.

In the foregoing expression of the reaction composition, the reactants are normalized with respect to the total of "w", "x", "y" and "z" such that $(w+x+y+z)=1.00$ *mole.*

Preparative Reagents

GaAPSO compositions may be prepared by using numerous reagents. Reagents which may be employed to prepare GaAPSOs include:

(a) Alipro: aluminum isopropoxide;

(b) CATAPAL: Trademark of Condea Corporation for hydrated pseudoboehmite;

(c) IUDOX-LS: LUDOX-LS is the tradename of DuPont for an aqueous solution of 30 weight percent $SiO_2$ and 0.1 weight percent $Na_2O$;

(d) $H_3PO_4$: 85 weight percent aqueous phosphoric acid;

(e) gallium hydroxide, or gallium sulfate;

(f) TEAOH: 40 weight percent aqueous solution of tetraethylammonium hydroxide;

(g) TBAOH: 40 weight percent aqueous solution of tetrabutylammonium hydroxide;

(h) $Pr_2NH$: di-n-propylamine, $(C_3H_7)_2NH$;

(i) $Pr_3N$: tri-n-propylamine, $(C_3H_7)_3N$;

(j) Quin: Quinuclidine, $(C_7H_{13}N)$;

(k) MQuin: Methyl Quinuclidine hydroxide, $(C_7H_{13}NCH_3OH)$;

(l) C-hex: cyclohexylamine;

(m) TMAOH: tetramethylammonium hydroxide;

(n) TPAOH: tetrapropylammonium hydroxide; and (o) DEEA: 2-diethylaminoethanol;

(p) Tetraalkylorthosilicates, such as tetraethylorthosilicate.

GeAPSO MOLECULAR SIEVES

The GeAPSO molecular sieves of U.S. Ser. Nos. 599,971, filed Apr. 13, 1984, and 852,175 filed Apr. 15, 1986 have a framework structure of $GeO_2$, $AlO_2^-$, $PO_2^+$ and $SiO_2$ tetrahedral units having an empirical chemical composition on an anhydrous basis expressed by the formula:

$$mR:(Ge_wAl_xP_ySi_z)O_2$$

wherein "R" represents at least one organic templating agent present in the intracrystalline pore system; "m" represents the molar amount of "R" present per mole of $(Ge_wAl_xP_ySi_z)O_2$ and has a value of zero to about 0.3, but is preferably not greater than 0.15; and "w", "x", "y" and "z" represent the mole fractions of the elements germanium, aluminum, phosphorus and silicon, respectively, present as tetrahedral oxides. The mole fractions "w", "x", "y" and "z' are generally defined as being within the limiting compositional values or points as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of the GeAPSO molecular sieves, the values of w, x, y and z are as follows:

| Point | Mole Fraction | | |
|---|---|---|---|
| | x | y | (z + w) |
| a | 0.60 | 0.38 | 0.02 |
| b | 0.38 | 0.60 | 0.02 |
| c | 0.01 | 0.60 | 0.39 |
| d | 0.01 | 0.39 | 0.60 |
| e | 0.39 | 0.01 | 0.60 |
| f | 0.60 | 0.01 | 0.39 |

In an especially preferred subclass of the GeAPSO molecular sieves, the values of w, x, y and z are as follows:

| Point | Mole Fraction | | |
|---|---|---|---|
| | x | y | (z + w) |
| g | 0.60 | 0.35 | 0.05 |
| h | 0.47 | 0.48 | 0.05 |
| i | 0.40 | 0.48 | 0.12 |
| j | 0.40 | 0.36 | 0.24 |
| k | 0.46 | 0.30 | 0.24 |
| l | 0.60 | 0.30 | 0.10 |

In synthesizing the GeAPSO compositions, it is preferred to employ a reaction mixture composition expressed in terms of the molar ratios as follows:

$$aR:(Ge_wAl_xP_ySi_z)O_2 : bH_2O$$

wherein "R" is an organic templating agent; "a" is the amount of organic templating agent "R" and has a value of from zero to about 6 and is preferably a effective amount within the range of greater than zero (0) to about 6, and most preferably not more than about 0.5; "b" has a value of from zero (0) to about 500, preferably between about 2 and about 300, most preferably not greater than about 20, and desirably not greater than about 10; and "w", "x", "y" and "z"represent the mole fractions of germanium, aluminum, phosphorus and silicon, respectively, and each has a value of at least 0.01.

In one embodiment the reaction mixture is selected such that the mole fractions "w", "x", "y" and "z" are generally defined as being within the limiting compositional values or points as follows:

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

Especially preferred reaction mixtures are those containing from about 0.2 to about 0.3 total moles of silicon and germanium, and from about 0 75 to about 1.25 moles of aluminum, per mole of phosphorus.

In the foregoing expression of the reaction composition, the reactants are normalized with respect to the total of "w", . "x", "y" and "z" such that $(w+x+y+z)=1.00$ *mole.*

Preparative Reagents

GeAPSO compositions may be prepared by using numerous reagents. Reagents which may be employed to prepare GeAPSOs include:

(a) Alipro: aluminum isopropoxide;
(b) CATAPAL: Trademark of Condea Corporation for hydrated pseudoboehmite;
(c) LUDOX-LS: LUDOX-LS is the tradename of DuPont for an aqueous solution of 30 weight percent $SiO_2$ and 0.1 weight percent $Na_2O$ ;
(d) $H_3PO_4$: 85 weight percent aqueous phosphoric acid;
(e) germanium tetrachloride or germanium ethoxide;
(f) TEAOH: 40 weight percent aqueous solution of tetraethylammonium hydroxide;
(g) TBAOH: 40 weight percent aqueous solution of tetrabutylammonium hydroxide;
(h) $Pr_2NH$: di-n-propylamine, $(C_3H_7)_2NH$;
(i) $Pr_3N$: tri-n-propylamine, $(C_3H_7)_3N$;
(j) Quin: Quinuclidine, $(C_7H_{13}N)$;
(k) MQuin: Methyl Quinuclidine hydroxide, $(C_7H_{13}NCH_3OH)$;
(l) C-hex: cyclohexylamine;
(m) TMAOH: tetramethylammonium hydroxide;
(n) TPAOH: tetrapropylammonium hydroxide; and
(o) DEEA: 2-diethylaminoethanol;
(p) Tetraalkylorthosilicates, such as tetraethylorthosilicate;
(q) aluminum chlorhydrol.

Preparative Procedures

In some cases, it may be advantageous, when synthesizing the GeAPSO compositions, to first combine sources of germanium and aluminum, or of germanium, aluminum and silicon, to form a mixed germanium-/aluminum or germanium/aluminum/silicon compound (this compound being typically a mixed oxide) and thereafter to react this mixed body with a source of phosphorus by the process of the present invention to form the final GeAPSO composition. Such mixed oxide bodies may be prepared for example by hydrolyzing aqueous solutions containing germanium tetrachloride and aluminum chlorhydrol, or germanium ethoxide, tetraethylorthosilicate, and aluminum tri-sec-butoxide.

LiAPSO MOLECULAR SIEVES

The LiAPSO molecular sieves of U.S. Ser. Nos. 599,952, filed Apr. 13, 1984, and No. 847,227 filed Apr. 2, 1986 have a framework structure of $LiO_2^{-3}$, $AlO_2^-$, $PO_2^{30}$ and $SiO_2$ tetrahedral units having an empirical chemical composition on an anhydrous basis expressed by the formula:

$$mR:(Li_wAl_xP_ySi_z)O_2$$

wherein "R" represents at least one organic templating agent present in the intracrystalline pore system; "m" represents the molar amount of "R" present per mole of $(Li_wAl_xP_ySi_z)O_2$ and has a value of zero to about 0.3, but is preferably not greater than 0.15; and "w", "x", "y" and "z" represent the mole fractions of the elements lithium, aluminum, phosphorus and silicon, respectively, present as tetrahedral oxides. The mole fractions "w", "x", "y" and "z" are generally defined as being within the limiting compositional values or points as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

In a preferred subclass of the LiAPSO molecular sieves, the values of w, x, y and z are as follows:

| Point | Mole Fraction | | |
|---|---|---|---|
| | x | y | (z + w) |
| a | 0.60 | 0.38 | 0.02 |
| b | 0.38 | 0.60 | 0.02 |
| c | 0.01 | 0.60 | 0.39 |
| d | 0.01 | 0.39 | 0.60 |
| e | 0.39 | 0.01 | 0.60 |
| f | 0.60 | 0.01 | 0.39 |

In an especially preferred subclass of the LiAPSO molecular sieves, the value of w+z is not greater than about 0.20.

Since the exact nature of the LiAPSO molecular sieves is not clearly understood at present, although all are believed to contain $LiO_2$ tetrahedra in the three-dimensional microporous crystal framework structure, it is advantageous to characterize the LiAPSO molecular sieves by means of their chemical composition. This is due to the low level of lithium present in certain of the LiAPO molecular sieves prepared to date which makes it difficult to ascertain the exact nature of the interaction between lithium, aluminum, phosphorus and silicon. As a result, although it is believed that $LiO_2$ tetrahedra are substituted isomorphously for $AlO_2$, $PO_2$ or $SiO_2$ tetrahedra, it is appropriate to characterize certain LiAPSO compositions by reference to their chemical composition in terms of the mole ratios of oxides.

In synthesizing the LiAPSO compositions, it is preferred to employ a reaction mixture composition expressed in terms of the molar ratios as follows:

$$aR:(Li_wAl_xP_ySi_z)O_2:bH_2O$$

wherein "R" is an organic templating agent; "a" is the amount of organic templating agent "R" and has a value of from zero to about 6 and is preferably an effective amount within the range of greater than zero (0) to about 6, and most preferably not more than about 0.5; "b" has a value of from zero (0) to about 500, preferably between about 2 and about 300, most preferably not greater than about 20, and most desirably not greater than about 10; and "w", "x", "y" and "z"represent the mole fractions of lithium, aluminum, phosphorus and silicon, respectively, and each has a value of at least 0.01.

In one embodiment the reaction mixture is selected such that the mole fractions "w", "x", "y" and "z" are generally defined a being within the limiting compositional values or points as follows:

| Point | Mole Fraction | | |
|---|---|---|---|
| | x | y | (z + w) |
| F | 0.60 | 0.38 | 0.02 |
| G | 0.38 | 0.60 | 0.02 |
| H | 0.01 | 0.60 | 0.39 |
| I | 0.01 | 0.01 | 0.98 |
| J | 0.60 | 0.01 | 0.39 |

In the foregoing expression of the reaction composition, the reactants are normalized with respect to the total of "w", "x", "y" and "z" such that $(w+x+y+z)=1.00$ *mole.*

Preparative Reagents

LiAPSO compositions may be prepared by using numerous reagents. Reagents which may be employed to prepare LiAPSOs include:

(a) Alipro: aluminum isopropoxide;
(b) CATAPAL: Trademark of Condea Corporation for hydrated pseudoboehmite;
(c) LUDOX-LS: LUDOX-LS is the tradename of DuPont for an aqueous solution of 30 weight percent $SiO_2$ and 0.1 weight percent $Na_2O$;
(d) $H_3PO_4$: 85 weight percent aqueous phosphoric acid;
(e) lithium orthophosphate;
(f) TEAOH: 40 weight percent aqueous solution of tetraethylammonium hydroxide;
(g) TBAOH: 40 weight percent aqueous solution of tetrabutylammonium hydroxide;
(h) Pr2NH: di-n-propylamine, $(C_3H_7)_2NH$;
(i) Pr3N: tri-n-propylamine, $(C_3H_7)_3N$;
(j) Quin: Quinuclidine, $(C_7H_{13}N)$;
(k) MQuin: Methyl Quinuclidine hydroxide, $(C_7H_{13}NCH_3OH)$;
(l) C-hex: cyclohexylamine;
(m) TMAOH: tetramethylammonium hydroxide;
(n) TPAOH: tetrapropylammonium hydroxide; and
(o) DEEA: 2-diethylaminoethanol;
(p) Tetraalkylorthosilicates, such as tetraethylorthosilicate.

ALUMINOPHOSPHATE MOLECULAR SIEVES

The various classes of aluminophosphate non-zeolitic molecular sieves will now be described.

AlPO4 ALUMINOPHOSPHATE MOLECULAR SIEVES

The $AlPO_4$ aluminophosphate molecular sieves of U.S. Pat. No. 4,310,440 and U.S. Ser. No. 880,559, filed June 30, 1986 are disclosed as microporous crystalline aluminophosphates having an essential crystalline framework structure whose chemical composition, expressed in terms of molar ratios of oxides, is:

$$Al_2O_3:0.8\text{-}1.2\ P_2O_5.$$

The pores of the framework structure are uniform and in each species have nominal diameters of from 3 to 10 Angstroms; the aluminophosphates have an intracrystalline adsorption capacity for water at 4.6 Torr and 24° C. of at least 3.5 weight percent, the adsorption of water being completely reversible while retaining the same essential framework topology in both the hydrated and dehydrated state. By the term "essential framework topology" is meant the spatial arrangement of the primary Al—O and P—O bond linkages. No change in the framework topology indicates that there is no disruption of these primary bond linkages.

In the as-synthesized form, the structure-directing agent is contained within the framework structure of the aluminophosphate in amounts which vary from species to species but usually do not exceed one mole per mole of $Al_2O_3$ thereof. This structure-directing agent is readily removed by water washing or calcination and does not appear to be an essential constituent of the aluminophosphate, as evidenced by essentially complete absence of ion-exchngeability of the as-synthesized compositions and also the complete absence of any internally-contained organic molecules in the as-synthesized form of at least one species of the generic class. Evidence that structure-directing agent is a critical constituent is contained in certain of the Examples of the U.S. Pat. No. 4,310,440, wherein reaction mixtures, otherwise identical to those which yield the $AlPO_4$ products except for the presence of templating agents, yield instead the previously known aluminophosphate phases $AlPO_4$.I.I-1.3$H_2O$, $AlPO_4$-tridymite, $AlPO_4$-quartz and $AlPO_4$-cristobalite.

The $AlPO_4$ aluminophosphates may be prepared by forming a reaction mixture which contains, in terms of molar ratios of oxides:

$$Al_2O_3:0.5\text{-}1.5P_2O_5:7\text{-}100H_2O$$

and contains from about 0.2 to 2.0 moles of templating agent per mole of $Al_2O_3$.

MeAPO MOLECULAR SIEVES

MeAPO molecular sieves are crystalline microporous aluminophosphates in which the substituent metal is one of a mixture of two or more divalent metals of the group magnesium, manganese, zinc and cobalt and are disclosed in U.S. Pat. No. 4,567,029. Members of this novel class of compositions have a three-dimensional microporous crystal framework structure of $MO_2^{-2}$, $AlO^-_2$ and $PO^+_2$ tetrahedral units and have an essential empirical chemical composition, on an anhydrous basis, of:

$$mR:(M_xAl_yP_z)O_2$$

wherein "R" represents at least one organic templating agent present in the intracrystalline pore system; "m" represents the moles of "R" present per mole of $(M_xAl_yP_z)O_2$ and has a value of from zero to 0.3, the maximum value in each case depending upon the molecular dimensions of the templating agent and the available void volume of the pore system of the particular metal aluminophosphate involved; "x", "y", and "z" represent the mole fractions of the metal "M", (i.e., magnesium, manganese, zinc and cobalt), aluminum and phosphorus, respectively, present as tetrahedral oxides, said mole fractions being such that they are representing the following values for "x", "y", and "z":

| Point | Mole Fraction x | y | z |
|---|---|---|---|
| A | 0.01 | 0.60 | 0.39 |
| B | 0.01 | 0.39 | 0.60 |
| C | 0.35 | 0.05 | 0.60 |
| D | 0.35 | 0.60 | 0.05 |

When synthesized the minimum value of "m" in the formula above is 0.02. In a preferred subclass of the metal aluminophosphates of this invention, the values of "x", "y" and "z" in the formula above are representing the following values for "x", "y" and "z":

| Point | Mole Fraction x | y | z |
|---|---|---|---|
| a | 0.01 | 0.52 | 0.47 |
| b | 0.01 | 0.39 | 0.60 |
| c | 0.25 | 0.15 | 0.60 |
| d | 0.25 | 0.40 | 0.35 |

The as-synthesized compositions are capable of withstanding 350° C. calcination in air for extended periods, i.e., at least 2 hours, without becoming amorphous. While it is believed that the M, Al and P framework constituents are present in tetrahedral coordination with oxygen, it is theoretically possible that some minor fraction of these framework constituents are present in coordination with five or six oxygen atoms. It is not, moreover, necessarily the case that all of the M, Al and/or P content of any given synthesized product is a part of the framework in the aforesaid types of coordination with oxygen. Some of each constituent may be merely occluded or in some as yet undetermined form and may or may not be structurally significant.

Since the term "metal aluminophosphate" is somewhat cumbersome, particularly in view of the need for numerous repetitions thereof in describing such compositions, the "short-hand" reference "MeAPO" is employed hereinafter. Also in those cases where the metal "Me" in the composition is magnesium, the acronym MAPO is applied to the composition. Similarly, ZAPO, MnAPO, and CoAPO are applied to the compositions which contain zinc, manganese and cobalt, respectively. To identify the ,various structural species which make up each of the subgeneric classes MAPO, ZAPO, CoAPO and MnAPO, each species is assigned a number and is identified, for example, as ZAPO-5, MAPO-11, CoAPO-11 and so forth.

The term "essential empirical chemical composition" is meant to include the crystal framework and can include any organic templating agent present in the pore system, but does not include alkali metal or other ions which can be present by virtue of being contained in the reaction mixture or as a result of post-synthesis ion-exchange. Such ionic species, when present, function primarily as charge-balancing ions for $AlO_2^-$and/or $MO_2^{-2}$ tetrahedra not associated with $PO_2^+$tetrahedra or an organic ion derived from the organic templating agent.

In synthesizing the MeAPO compositions, it is preferred to employ a reaction mixture composition expressed in terms of molar ratios as follows:

$$aR:(M_xAl_yP_z)O_2:bH_2O$$

wherein "R" is an organic templating agent; "a" has a value great enough to constitute an effective concentration of "R" and is within the range of >0 to 6; "b" has a value of from zero to 500, preferably 2 to 30; "M" represents a metal of the group zinc, magnesium, manganese and cobalt, "x", "y" and "z" represent the mole fractions, respectively, of "M", aluminum and phosphorus in the $(M_xAl_yP_z)0_2$ constituent, and each has a value of at least 0.01, the said points E, F, G, H, I, and J representing the following values for "x", "y" and "z":

| Point | Mole Fraction | | |
|---|---|---|---|
| | x | y | z |
| E | 0.01 | 0.70 | 0.29 |
| F | 0.01 | 0.29 | 0.70 |
| G | 0.29 | 0.01 | 0.70 |
| H | 0.40 | 0.01 | 0.59 |
| I | 0.40 | 0.59 | 0.01 |
| J | 0.29 | 0.70 | 0.01 |

In the foregoing expression of the reaction composition, the reactants are normalized with respect to a total of $(M+Al+P)=(x+y+z)=1.00$ *mole.*

The metals zinc, cobalt, magnesium and manganese can be introduced into the reaction system in any form which permits the formation in situ of reactive divalent ions of the respective metals. Advantageously salts, oxides or hydroxides of the metals are employed such as cobalt chloride hexahydrate, alpha cobaltous iodide, cobaltous sulfate, cobalt acetate, cobaltous bromide, cobaltous chloride, zinc acetate, zinc bromide, zinc formate, zinc iodide, zinc sulfate heptahydrate, magnesium acetate, magnesium bromide, magnesium chloride, magnesium iodide, magnesium nitrate, magnesium sulfate, manganous acetate, manganous bromide, manganous sulfate, and the like.

FAPO MOLECULAR SIEVES

Ferroaluminophosphates are disclosed in U.S. Pat. No. 4,554,143, incorporated herein by reference, and have a three-dimensional microporous crystal framework structure of $AlO_2$, $FeO_2$, and $PO_2$ tetrahedral units and have an essential empirical chemical composition, on an anhydrous basis, of:

$$mR:(Fe_xAl_yP_z)\ )O_2$$

wherein "R" represents at least one organic templating agent present in the intracrystalline pore system; "m" represents the moles of "R" present per mole of $(Fe_xAl_yP_z)O_2$ and has a value of from zero to 0.3, the maximum value in each case depending upon the molecular dimensions of the templating agent and the available void volume of the pore system of the particular ferroaluminophosphate involved; "x", "y", and "z" represent the mole fractions of iron, aluminum and phosphorus, respectively, present as tetrahedral oxides, representing the following values for "x", "y", and "z":

| Point | Mole Fraction | | |
|---|---|---|---|
| | x | y | z |
| A | 0.01 | 0.60 | 0.39 |
| B | 0.01 | 0.39 | 0.60 |
| C | 0.35 | 0.05 | 0.60 |
| D | 0.35 | 0.60 | 0.05 |

When synthesized the minimum value of "m" in the formula above is 0.02. In a preferred subclass of the ferroaluminophosphates the values of "x", "y" and "z" in the formula above are representing the following values for "x", "y" and "z":

| Point | Mole Fraction | | |
|---|---|---|---|
| | x | y | z |
| a | 0.01 | 0.52 | 0.47 |
| b | 0.01 | 0.39 | 0.60 |
| c | 0.25 | 0.15 | 0.60 |
| d | 0.25 | 0.40 | 0.35 |

The iron of the $FeO_2$ structural units can be in either the ferric or ferrous valence state, depending largely upon the source of the iron in the synthesis gel. Thus, an $FeO_2$ tetrahedron in the structure can have a net charge of either −1 or −2. While it is believed that the Fe, Al and P framework constituents are present in tetrahedral coordination with oxygen (and are referred to herein as such), it is theoretically possible that some minor fraction of these framework constituents are present in coordination with five or six oxygen atoms. It is not, moreover, necessarily the case that all of the Fe, Al and/or P content of any given synthesized product is a part of the framework in the aforesaid, types of coordination with oxygen. Some of each constituent may be merely occluded or in some as yet undetermined form, and may or may not be structurally significant.

For convenience in describing the ferroaluminophosphates, the "short-hand" acronym "FAPO"is sometimes employed hereinafter. To identify the various structural species which make up the generic class FAPO, each species is assigned a number and is identified, for example, as FAPO-11, FAPO-31 and so forth.

The term "essential empirical chemical composition" is meant to include the crystal framework and can include any organic templating agent present in the pore system, but does not include alkali metal or other ions which can be present by virtue of being contained in the reaction mixture or as a result of post-synthesis ion-exchange. Such ionic species, when present, function primarily as charge-balancing ions for $FeO_2^-$ and/or $AlO_2^{-2}$ tetrahedra, $FeO_2^{31\ 2}$ tetrahedra associated with $PO_2^+$tetrahedra or not associated with $PO_2^-$tetrahedra or an organic ion derived from the organic templating agent.

In synthesizing the FAPO compositions, it is preferred to employ a reaction mixture composition expressed in terms of molar ratios as follows:

$$aR:(Fe_xAl_yP_z)O_2 : bH_2O$$

wherein "R" is an organic templating agent; "a" has a value great enough to constitute an effective concentration of "R" and is within the range of >0 to 6; "b" has a value of from zero to 500, preferably 2 to 80; "x", "y"

and "z" represent the mole fractions, respectively, of iron, aluminum and phosphorus in the $(Fe_xAl_yP_z)O_2$ constituent, and each has a value of at least 0.01, and representing the following values for "x", "y" and "z":

| Point | Mole Fraction | | |
|---|---|---|---|
| | x | y | z |
| E | 0.01 | 0.70 | 0.29 |
| F | 0.01 | 0.29 | 0.70 |
| G | 0.29 | 0.01 | 0.70 |
| H | 0.40 | 0.01 | 0.59 |
| I | 0.40 | 0.59 | 0.01 |
| J | 0.29 | 0.70 | 0.01 |

In the foregoing expression of the reaction composition, the reactants are normalized with respect to a total of $(Fe+Al+P)=(x+y+z)=1.00$ *mole.*

Iron can be introduced into the reaction system in any form which permits the formation in situ of reactive ferrous or ferric ions. Advantageously iron salts, oxides or hydroxides are employed such as iron sulfate, iron acetate, iron nitrate, or the like. Other sources such as a freshly precipitated iron oxide $\tau$-FeOOH, are also suitable.

TAPO MOLECULAR SIEVES

TAPO molecular sieves are disclosed in U.S. Pat. No. 4,500,561, incorporated herein by reference, and comprise a three-dimensional microporous crystal framework structure of $[TiO_2]$, $[AlO_2]$and $[PO_2]$tetrahedral units which has a unit empirical formula on an anhydrous basis of:

$$mR:(Ti_xAl_yP_z)O_2$$

wherein "R" represents at least one organic templating agent present in the intracrystalline pore system; "m" represents the moles of "R" present per mole of $(Ti_xAl_yP_z)O_2$ and has a value of between zero and about 5.0, the maximum value in each case depending upon the molecular dimensions of the templating agent and the available void volume of pore system of the particular titanium molecular sieve; "x", "y" and "z" represent the mole fractions of titanium, aluminum and phosphorus, respectively, present as tetrahedral oxides, representing the following values for "x", "y" and "z":

| Point | Mole Fraction | | |
|---|---|---|---|
| | x | y | z |
| A | 0.001 | 0.45 | 0.549 |
| B | 0.88 | 0.01 | 0.11 |
| C | 0.98 | 0.01 | 0.01 |
| D | 0.29 | 0.70 | 0.01 |
| E | 0.001 | 0.70 | 0.299 |

The parameters "x", "y" and "z" are preferably within the following values for "x", "y" and "z":

| Point | Mole Fraction | | |
|---|---|---|---|
| | x | y | z |
| a | 0.002 | 0.499 | 0.499 |
| b | 0.20 | 0.40 | 0.40 |
| c | 0.20 | 0.50 | 0.30 |
| d | 0.10 | 0.60 | 0.30 |
| e | 0.002 | 0.60 | 0.398 |

The titanium-containing molecular sieves are referred to hereinafter, solely for point of reference herein as "TAPO" molecular sieves, or as "TAPOs" if the reference is to the class as a whole. This designation is simply made for the sake of convenient reference herein and is not meant to designate a particular structure for any given TAPO molecular sieve. The members of the class of TAPO's employed hereinafter in the examples will be characterized simply by referring to such members as TAPO-5, TAPO-11, etc, i.e., a particular species will be referred to as TAPO-n where "n" is a number specific to a given class member as its preparation is reported herein. This designation is an arbitrary one and is not intended to denote structural relationship to another material(s) which may also be characterized by a numbering system.

The term "unit empirical formula" is used herein according to its common meaning to designate the simplest formula which gives the relative number of moles of titanium, aluminum and phosphorus which form the $[TiO_2]$, $[PO_2]$ and $[AlO_2]$ tetrahedral unit within a titanium-containing molecular sieve and which forms the molecular framework of the TAPO composition(s). The unit empirical formula is given in terms of titanium, aluminum and phosphorus as shown in Formula (1), above, and does not include other compounds, cations or anions which may be present as a result of the preparation or the existence of other impurities or materials in the bulk composition not containing the aforementioned tetrahedral unit. The amount of template R is reported as part of the composition when the as-synthesized unit empirical formula is given, and water may also be reported unless such is defined as the anhydrous form. For convenience, coefficient "m" for template "R" is reported as a value that is normalized by dividing the number of moles of organic templating agent by the total moles of titanium, aluminum and phosphorus.

The unit empirical formula for a TAPO may be given on an "as-synthesized" basis or may be given after an "as-synthesized" TAPO composition has bee subjected to some post treatment process, e.g., calcination. The term "as-synthesized" herein shall be used to refer to the TAPO composition(s) formed as a result of the hydrothermal crystallization but before the TAPO composition has been subjected to post treatment to remove any volatile components present therein. The actual value of "m" for a post-treated TAPO will depend on several factors (including: the particular TAPO, template, severity of the post-treatment in terms of its ability to remove the template from the TAPO, the proposed application of the TAPO composition, and etc.) and the value for "m" can be within the range of values as defined for the as-synthesized TAPO compositions although such is generally less than the as-synthesized TAPO unless such post-treatment process adds template to the TAPO so treated. A TAPO composition which is in the calcined or other post-treatment form generally has an empirical formula represented by Formula (1), except that the value of "m" is generally less than about 0.02. Under sufficiently severe post-treatment conditions, e.g., roasting in air at high temperature for long periods (over 1 hr.), the value of "m" may be zero (0) or, in any event, the template, R, is undetectable by normal analytical procedures.

The TAPOs are preferably formed from a reaction mixture having a mole fraction of alkali metal cation which is sufficiently low that it does not interfere with the formation of the TAP composition. The TAPO compositions are generally formed from a reaction mixture containing reactive sources of $TiO_2$, $Al_2O_3$, and $P_2O_5$ and an organic -templating agent, said reaction mixture comprising a composition expressed in terms of molar oxide ratios of:

$$fR_2O : (Ti_xAl_yP_z)O_2 : gH_2O$$

wherein "R" is an organic templating agent; "f" has a value large enough to constitute an effective amount of "R", said effective amount being that amount which form said TAPO compositions; "g" has a value of from zero to 500; "x", "y" and "z" represent the mole fractions, respectively of titanium, aluminum and phosphorus in the $(Ti_xAl_yP_z)O_2$ constituent, and each has a value of at least 0.001 and being within the following values for "x", "y" and "z":

| Point | Mole Fraction | | |
|---|---|---|---|
| | x | y | z |
| h | 0.001 | 0.989 | 0.01 |
| i | 0.001 | 0.01 | 0.989 |
| j | 0.32 | 0.24 | 0.44 |
| k | 0.98 | 0.01 | 0.01 |

Although the TAPO compositions will form if higher concentrations of alkali metal cation are present, such reaction mixtures are not generally preferred. A reaction mixture, expressed in terms of molar oxide ratios, comprising the following bulk composition is preferred:

$$oR_2O : wM_2O : (Ti_xAl_yP_z)O_2 : nH_2O$$

wherein "R" is an organic template; "o" has a value great enough to constitute an effective concentration of "R" and is preferably within the range of from greater than zero (0) to about 5.0; "M" is an alkali metal cation; "w" has a value of from zero to 2.5; "n" has a value between about zero (0) and about 500; "x", "y" and "z" represent the mole fractions, respectively, of titanium, aluminum and phosphorus in the $(Ti_xAl_yP_z)O_2$ constituent, and each has a value of at least 0.001 and being within the following values for "x", "y" and "z":

| Point | Mole Fraction | | |
|---|---|---|---|
| | x | y | z |
| h | 0.001 | 0.989 | 0.01 |
| i | 0.001 | 0.01 | 0.989 |
| j | 0.32 | 0.24 | 0.44 |
| k | 0.98 | 0.01 | 0.01 |

When the TAPOs are synthesized by this method the value of "m" in Formula (1) is generally above about 0.02.

Though the presence of alkali metal cations is not preferred, when they are present in the reaction mixture it is preferred to first admix at least a portion (e.g., at least about 10 weight percent) of each of the aluminum and phosphorus sources in the substantial absence (e.g., preferably less than about 20 percent of the total weight of the aluminum source and phosphorus source) of the titanium source. This procedure avoids adding the phosphorus source to a basic reaction mixture containing the titanium source and aluminum source, (as was done in most of the published attempts to substitute isomorphously $[PO_2]$ tetrahedra for $[SiO_2]$ tetrahedra in zeolitic structures). Although the reaction mechanism is by no means clear at this time, the function of the template may be to favor the incorporation of $[PO_2]$ and $[AlO_2]$ tetrahedra in the framework structures of the crystalline products with $[TiO_2]$ tetrahedra isomorphously replacing $[PO_2]$ tetrahedra.

Alkali metal cations, if present in the reaction mixture, may facilitate the crystallization of certain TAPO phases, although the exact function of such cations, when present, in crystallization, if any, is not presently known. Alkali cations present in the reaction mixture generally appear in the formed TAPO composition, either as occluded (extraneous) cations and/or as structural cations balancing net negative charges at various sites in the crystal lattice. It should be understood that although the unit formula for the TAPOs does not specifically recite the presence of alkali cations they are not excluded in the same sense that hydrogen cations and/or hydroxyl groups are not specifically provided for in the traditional formulae for zeolitic aluminosilicates.

Almost any reactive titanium source may be employed herein. The preferred reactive titanium sources include titanium alkoxides, water-soluble titanates and titanium chelates.

Since the exact nature of the TAPO molecular sieves are not clearly understood at present, although all are believed to contain $[TiO_2]$ tetrahedra in the three-dimensional microporous crystal framework structure, it is advantageous to characterize the TAPO molecular sieves by means of their chemical composition. This is due to the low level of titanium present in certain of the TAPO molecular sieves prepared to date which makes it difficult to ascertain the exact nature of the interaction between titanium, aluminum and phosphorus. As a result, although it is believed that titanium, $[Tio_2]$, has substituted isomorphously for $[AlO_2]$ or $[PO_2]$ tetrahedra, it is appropriate to characterize certain TAPO compositions by reference to their chemical composition in terms of the mole ratios of oxides in the as-synthesized and anhydrous form as:

$$vR : pTiO_2 : qAl_2O_3 : rP_2O_5$$

wherein "R" represents at least one organic templating agent present in the intracrystalline pore system; "v" represents an effective amount of the organic templating agent to form s id TAPO compositions and preferably has a value between and including zero and about 3.0; "p", "q" and "r" represent moles, respectively, of titanium, alumina and phosphorus pentoxide, based on said moles being such that they are within the following values for "p", "q" and "r":

| Point | Mole Fraction | | |
|---|---|---|---|
| | x | y | z |
| A | 0.004 | 1.0 | 1.22 |
| B | 176 | 1.0 | 11.0 |
| C | 196 | 1.0 | 1.0 |
| D | 0.828 | 1.0 | 0.0143 |
| E | 0.003 | 1.0 | 0.427 |

The parameters "p", "q" and "r" are preferably within the following values for "p", "q" and "r":

| Point | Mole Fraction | | |
|---|---|---|---|
| | x | y | z |
| a | 0.008 | 1.0 | 1.0 |
| b | 1.0 | 1.0 | 1.0 |

-continued

| Point | Mole Fraction | | |
|---|---|---|---|
| | x | y | z |
| c | 0.80 | 1.0 | 0.60 |
| d | 0.333 | 1.0 | 0.50 |
| e | 0.067 | 1.0 | 0.663 |

ELAPO MOLECULAR SIEVES

"ELAPO" molecular sieves are a class of crystalline molecular sieves in which at least one element capable of forming a three-dimensional microporous framework forms crystal framework structures of $AlO_2^-$, $PO_2^+$ and $MO_2^n$ tetrahedral oxide units wherein "$MO_2^n$" represents at least one different element (other than Al or P) present as tetrahedral oxide units "$MO_2^n$" with charge "n" where "n" may be −3, −2, −1, 0 or +1. The members of this novel class of molecular sieve compositions have crystal framework structures of $AlO_2^-$, $PO_2^+$ *and* $MO_2^n$ tetrahedral units and have an empirical chemical composition on an anhydrous basis expressed by the formula:

$$mR:(M_xAl_yP_z)O_2$$

wherein "R" represents at least one organic templating agent present in the intracrystalline pore system; "m" represents the molar amount of "R" present per mole of $(M_xAl_yP_z)O_2$; "M" represents at least one element capable of forming framework tetrahedral oxides; and "x", "y"and "z" represent the mole fractions of "M", aluminum and phosphorus, respectively, present as tetrahedral oxides. "M" is at least one different (i.e., not aluminum, phosphorus or oxygen) element such that the molecular sieves contain at least one framework tetrahedral unit in addition to $AlO_2^-$and $PO_2^+$. "M"at least one element selected from the group consisting of arsenic, beryllium, boron, cobalt, chromium, gallium, germanium, iron, lithium, magnesium, manganese, titanium and zinc, subject to certain restrictions on the combinations of elements as will appear from the discussions of individual groups of ELAPOs below. ELAPOs and their preparation are disclosed in European Patent Application Ser. Nos. 85104386.9, filed Apr. 11, 1985 (EPC Publication No. 0158976, published Oct. 13, 1985, incorporated herein by reference) and 85104388.5 , filed Apr. 11, 1985 (EPC Publication No. 158349, published Oct. 16, 1985, incorporated herein by reference).

The "ELAPO" molecular sieves further include numerous species. disclosed in others of the aforementioned patents, and copending and commonly assigned applications, relating to non-zeolitic molecular sieves.

The ELAPO molecular sieves are generally referred to herein by the acronym "ELAPO" to designate element(s) "M" in a framework of $AlO_2^-$, $PO_2^+$ and $MO_2^n$ *tetrahedral oxide units. Actual class members will be identified by replacing the "EL" of the acronym with the elements present as* $MO_2^n$ tetrahedral units. For example, "MgBeAPO" designates a molecular sieve comprised of $AlO_2^{31}$ , $PO_2^+$,- $MgO_2^{-2}$ and $BeO_2^{-2}$ tetrahedral units. To identify various structural species which make up each of the subgeneric classes, each species is assigned a number and is identified as "ELAPO-i" wherein "i" is an integer. The given species designation is not intended to denote a similarity in structure to any other species denominated by a similar identification system.

The ELAPO molecular sieves comprise at least one additional element capable of forming framework tetrahedral oxide units ($MO_2^n$) to form crystal framework structures with $AlO_2^-$ and $PO_2^+$ tetrahedral oxide units wherein "M" represents at least one element capable of forming tetrahedral units "$MO_2^n$" where "n" is −3, −2, −1, 0 or +1 and is at least one element selected from the group consisting of arsenic, beryllium, boron, cobalt, chromium, gallium, germanium, iron, lithium, magnesium, manganese, titanium and zinc.

The ELAPO molecular sieves have crystalline three-dimensional microporous framework structures of $AlO_2^-$, $PO_2^+$and $MO_2^n$ tetrahedral units and have an A102 , P02 and M02 empirical chemical composition on an anhydrous basis expressed by the formula:

$$mR:(M_xAl_yP_z)O_2;$$

wherein "R" represents at least one organic templating agent present in the intracrystalline pore system; "m" represents the molar amount of "R" present per mole of $(M_xAl_yP_z)O_2$ and has a value of zero to about 0.3; "M" represents at least one element capable of forming framework tetrahedral oxides where "M" is at least one element selected from the group consisting of arsenic, beryllium, boron, cobalt, chromium, gallium, germanium, iron, lithium, magnesium, manganese, titanium and zinc.

The relative amounts of element(s) "M", aluminum and phosphorus are expressed by the empirical chemical formula (anhydrous):

$$mR:(M_xAl_yP_z)O_2$$

where "x", "y" and "z" represent the mole fractions of said "M", aluminum and phosphorus. The individual mole fractions of each "M" (or when M denotes two or more elements, $M_1$, $M_2$, $M_3$, etc.) may be represented by "$x_1$", "$x_2$", "$x_3$", etc. wherein "$x_1$", "$x_2$", and "$x_3$" etc. represent the individual mole fractions of elements $M_1$, $M_2$, $M_3$, and etc. for "M" as above defined. The values of "$x_1$", "$x_2$", "$x_3$", etc. are as defined for "x", hereinafter, where "$x_1$"+"$x_2$"+"$x_3$" . . . ="x" and where $x_1$, $x_2$, $x_3$, etc. are each at least 0.01.

The ELAPO molecular sieves have crystalline three-dimensional microporous framework structures of $MO_2^n$, $AlO_2^-$and $PO_2^{+2}$ tetrahedral units having an empirical chemical composition on an anhydrous basis expressed by the formula:

$$mR:(M_xAl_yP_z)O_2$$

wherein "R" represents at least one organic templating agent present in the intracrystalline pore system; "m"represents a molar amount of "R" present per mole of $(M_xAl_yP_z)O_2$ and has a value of zero to about 0.3; "M" represents at least one different element (other than Al or P) capable of forming framework tetrahedral oxides, as hereinbefore defined, and "x", "y" and "z" represent the mole fractions of "M", aluminum and phosphorus, respectively, present as tetrahedral oxides; in general, said mole fractions "x", "y" and "z" are within the following values for "x", "y" and "z", although as will appear hereinbelow, the limits for "x", "y" and "z" may vary slightly with the nature of the element "M":

| Point | Mole Fraction | | |
|---|---|---|---|
| | x | y | z |
| A | 0.02 | 0.60 | 0.38 |
| B | 0.02 | 0.38 | 0.60 |
| C | 0.39 | 0.01 | 0.60 |
| D | 0.98 | 0.01 | 0.01 |
| E | 0.39 | 0.60 | 0.01 |

Also, in general, in a preferred sub-class of the ELAPos of this invention, the values of "x", "y" and "z" in the formula above are within the following values for "x", "y" and "z", although again the relevant limits may vary somewhat with the nature of the element "M", as set forth hereinbelow:

| Point | Mole Fraction | | |
|---|---|---|---|
| | x | y | z |
| a | 0.02 | 0.60 | 0.38 |
| b | 0.02 | 0.38 | 0.60 |
| c | 0.39 | 0.01 | 0.60 |
| d | 0.60 | 0.01 | 0.39 |
| e | 0.60 | 0.39 | 0.01 |
| f | 0.39 | 0.60 | 0.01 |

In synthesizing the ELAPO compositions of the instant invention, it is in general preferred to employ a reaction mixture composition expressed in terms of the molar ratios as follows:

$aR:M_xAl_yP_z)O_2:bH_2O$ wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and 300; "M" represents at least one element, as above described, capable of forming tetrahedral oxide framework units, $MO_2^n$, with $AlO_2^-$ *and* $PO_2 30$ tetrahedral units; "n" has a value of −3, −2, −1, 0 or +1; and "x", "y" and "z" represent the mole fractions of "M", aluminum and phosphorus, respectively; "y" and "z" each have a value of at least 0.01 and "x"has a value of at least 0.01 with each element "M" having a mole fraction of at least 0.01. In general, the mole fractions "x", "y" and "z" are preferably within the following values for "x", "y" and "z":

| Point | Mole Fraction | | |
|---|---|---|---|
| | x | y | z |
| F | 0.01 | 0.60 | 0.39 |
| G | 0.01 | 0.39 | 0.60 |
| H | 0.39 | 0.01 | 0.60 |
| I | 0.98 | 0.01 | 0.01 |
| J | 0.39 | 0.60 | 0.01 |

Further guidance concerning the preferred reaction mixtures of forming ELAPOs with various elements "M" will be given below.

In the foregoing expression of the reaction composition, the reactants are normalized with respect to a total of $(M+Al+P)=(x+y+z)=1.00$ *mole*, whereas in other cases the reaction mixtures are expressed in terms of molar oxide ratios and may be normalized to 1.00 mole of $P_2O_5$ and/or $Al_2O_3$. This latter form is readily converted to the former form by routine calculations by dividing the total number of moles of "M", aluminum and phosphorus into the moles of each of "M", aluminum and phosphorus. The moles of template and water are similarly normalized by dividing by the total moles of "M", aluminum and phosphorus.

The element(s) "M" can be introduced into the reaction system in any form which permits the formation in situ of reactive form of the element, i.e., reactive to form the framework tetrahedral oxide unit of the element. The organic and inorganic salts, of "M" such as oxides, alkoxides, hydroxides, halides and carboxylates, may be employed including the chlorides, bromides, iodides, nitrates, sulfates, phosphates, acetates, formates, and alkoxides, including ethoxides, propoxides and the like. Specific preferred reagents for introducing various elements "M" are discussed hereinbelow.

AsAPO MOLECULAR SIEVES

The AsAPO molecular sieves of U.S. Ser. Nos. 600,166, filed Apr. 13, 1984, and 830,889 filed Feb. 19, 1986 have a framework structure of $AsO_2^n$, $AlO_2^-$ and $PO_2^+$ tetrahedral units (where "n" is −1 or +1) and have an empirical chemical composition on an anhydrous basis expressed by the formula:

$mR:(As_xAl_yP_z)O_2$ wherein "R" represents at least one organic templating agent present in the intracrystalline pore system; "m" represents the molar amount of "R" present per mole of $(As_xAl_yP_z)O_2$ and has a value of zero to about 0.3, but is preferably not greater than 0.15; and "x", "y" and "z" represent the mole fractions of the elements arsenic, aluminum and phosphorus, respectively, present as tetrahedral oxides. The mole fractions "x", "y" and "z" are generally defined as being within the limiting compositional values or points as follows:

| Point | Mole Fraction | | |
|---|---|---|---|
| | x | y | z |
| A | 0.01 | 0.60 | 0.39 |
| B | 0.01 | 0.39 | 0.60 |
| C | 0.39 | 0.01 | 0.60 |
| D | 0.60 | 0.01 | 0.39 |
| E | 0.60 | 0.39 | 0.01 |
| F | 0.39 | 0.60 | 0.01 |

There are two preferred subclasses of the AsAPO molecular sieves, depending upon whether the value of "n" is −1 or +1 (i.e. whether the arsenic is trivalent or pentavalent), it being understood that mixtures of such are permitted in a given AsAPO. When "n" is −1, the preferred values of x, y and z are within the limiting compositional values or points as follows:

| Point | Mole Fraction | | |
|---|---|---|---|
| | x | y | z |
| a | 0.01 | 0.59 | 0.40 |
| b | 0.01 | 0.39 | 0.60 |
| c | 0.39 | 0.01 | 0.60 |
| d | 0.59 | 0.01 | 0.40 |

When "n" is +1, the preferred values of x, y and z are within the limiting compositional values or points as follows:

| Point | Mole Fraction x | y | z |
|---|---|---|---|
| e | 0.01 | 0.60 | 0.39 |
| f | 0.01 | 0.40 | 0.59 |
| g | 0.59 | 0.40 | 0.01 |
| h | 0.39 | 0.60 | 0.01 |

In an especially preferred subclass of the AsAPO molecular sieves in which "n"=+1, the values of x, y and z are as follows:

| Point | Mole Fraction x | y | z |
|---|---|---|---|
| i | 0.03 | 0.52 | 0.45 |
| j | 0.03 | 0.45 | 0.52 |
| k | 0.08 | 0.40 | 0.52 |
| l | 0.33 | 0.40 | 0.27 |
| m | 0.33 | 0.41 | 0.26 |
| n | 0.22 | 0.52 | 0.26 |

In synthesizing the AsAPO compositions, it is preferred to employ a reaction mixture composition expressed in terms of the molar ratios as follows:

$$aR:(As_xAl_yP_z)O_2:bH_2O$$

wherein "R" is an organic templating agent; "a" is the amount of organic templating agent "R" and has a value of from zero to about 6 and is preferably an effective mount within the range of greater than zero (0) to about 6, and most preferably not more than about 0.5; "b" has a value of from zero (0) to about 500, preferably between about 2 and about 300, most preferably not greater than about 20; and "x", "y" and "z" represent the mole fractions of arsenic, aluminum and phosphorus, respectively, and each has a value of at least 0.01.

In one embodiment the reaction mixture is selected such that the mole fractions "x", "y" and "z" are generally defined as being within the limiting compositional values or points as follows:

| Point | Mole Fraction x | y | z |
|---|---|---|---|
| G | 0.01 | 0.60 | 0.39 |
| H | 0.01 | 0.39 | 0.60 |
| I | 0.39 | 0.01 | 0.60 |
| J | 0.98 | 0.01 | 0.01 |
| K | 0.39 | 0.60 | 0.01 |

Especially preferred reaction mixtures are those wherein the mole fractions "x", "y" and "z" are within the limiting compositional values or points as follows:

| Point | Mole Fraction x | y | z |
|---|---|---|---|
| a | 0.20 | 0.55 | 0.25 |
| b | 0.20 | 0.50 | 0.30 |
| c | 0.30 | 0.40 | 0.30 |
| d | 0.40 | 0.40 | 0.20 |
| e | 0.40 | 0.50 | 0.10 |
| f | 0.35 | 0.55 | 0.10 |

In the foregoing expression of the reaction composition, the reactants are normalized with respect to the total of "x", "y" and "z" such that $(x+y+z)=1.00$ *mole.*

Preparative Reagents

AsAPO compositions may be prepared by using numerous reagents. Reagents which may be employed to prepare AsAPOs include:

(a) aluminum isopropoxide;
(b) pseudoboehmite or other aluminum oxide;
(c) $H_3PO_4$:85 weight percent aqueous phosphoric acid;
(d) $As_2O_5$, arsenic(V) oxide;
(e) TEAOH: 40 weight percent aqueous solution of tetraethylammonium hydroxide;
(f) TBAOH: 40 weight percent aqueous solution of tetrabutylammonium hydroxide;
(g) $Pr_2NH$: di-n-propylamine, $(C_3H_7)_2NH$;
(h) $Pr_3N$: tri-n-propylamine, $(C_3H_7)_3N$;
(i) Quin: Quinuclidine, $(C_7H_{13}N)$;
(j) MQuin: Methyl Quinuclidine hydroxide, $(C_7H_{13}NCH_3OH)$;
(k) C-hex: cyclohexylamine;
(l) TMAOH: tetramethylammonium hydroxide;
(m) TPAOH: tetrapropylammonium hydroxide; and
(n) DEEA: 2-diethylaminoethanol.

BAPO MOLECULAR SIEVES

The BAPO molecular sieves of U.S. Ser. Nos. 599,812, filed Apr. 13, 1984, 804,248, filed Dec. 4, 1985, and 29,540, filed Mar. 24, 1987, have a framework structure of $BO_2^-$, $AlO_2^-$ and $PO_2^+$ tetrahedral units and have an empirical chemical composition on an anhydrous basis expressed by the formula:

$$mR:(B_xAl_yP_z)O_2$$

wherein "R" represents at least one organic templating agent present in the intracrystalline pore system; "m" represents the molar amount of "R" present per mole of $(B_xAl_yP_z)O_2$ and has a value of zero to about 0.3, "x", "y" and "z" represent the mole fractions of the elements boron, aluminum and phosphorus, respectively, present as tetrahedral oxides. The mole fractions "x", "y" and "z" are generally defined as being within the limiting compositional values or points as follows:

| Point | Mole Fraction x | y | z |
|---|---|---|---|
| A | 0.01 | 0.60 | 0.39 |
| B | 0.01 | 0.39 | 0.60 |
| C | 0.39 | 0.01 | 0.60 |
| D | 0.60 | 0.01 | 0.39 |
| E | 0.60 | 0.39 | 0.01 |
| F | 0.39 | 0.60 | 0.01 |

In a preferred subclass of the BAPO molecular sieves the values of x, y and z are within the limiting compositional values or points as follows:

| Point | Mole Fraction x | y | z |
|---|---|---|---|
| a | 0.01 | 0.59 | 0.40 |
| b | 0.01 | 0.39 | 0.60 |
| c | 0.39 | 0.01 | 0.60 |
| d | 0.59 | 0.01 | 0.40 |

An especially preferred subclass of the BAPO molecular sieves are those in which the mole fraction, "x", of boron is not greater than about 0.3.

In synthesizing the BAPO compositions, it is preferred to employ a reaction mixture composition expressed in terms of the molar ratios as follows:

$$aR:(B_xAl_yP_z)O_2:bH_2O$$

wherein "R" is an organic templating agent; "a" is the amount of organic templating agent "R" and is an effective amount preferably within the range of greater than zero (0) to about 6, and most preferably not more than about 1.0; "b" has a value of from zero (0) to about 500, preferably between about 2 and about 300, desirably not greater than about 20, and most desirably not greater than about 10; and "x", "y" and "z" represent the mole fractions of boron, aluminum and phosphorus, respectively, and each has a value of at least 0.01.

In one embodiment the reaction mixture i s selected such that the mole fractions "x", "y" and "z" are generally defined as being within the limiting compositional values or points as follows:

| | Mole Fraction | | |
|---|---|---|---|
| Point | x | y | z |
| G | 0.01 | 0.60 | 0.39 |
| H | 0.01 | 0.39 | 0.60 |
| I | 0.39 | 0.01 | 0.60 |
| J | 0.98 | 0.01 | 0.01 |
| K | 0.39 | 0.60 | 0.01 |

Especially preferred reaction mixtures are 2.0 moles of $B_2O_3$ and from those containing from 0.5 to 2.0 moles of $B_2O_3$ and from 0.75 to 1.25 moles of $Al_2O_3$ for each mole of $P_2O_5$.

In the foregoing expression of the reaction composition, the reactants are normalized with respect to the total of "x", "y" and "z" such that $(x+y+z)=1.00$ *mole.*

The exact nature of the BAPO molecular sieves is not entirely understood at present, although all are believed to contain $BO_2$, $AlO_2$ and $PO_2$ tetrahedra in the three-dimensional microporous framework structure. The low level of boron present in some of the instant molecular sieves makes it difficult to ascertain the exact nature of the interactions among boron, aluminum and phosphorus. As a result, although it is believed that $BO_2$ tetrahedra are present in the three-dimensional microporous framework structure, it is appropriate to characterize certain BAPO compositions in terms of the molar ratios of oxides.

Preparative Reagents

BAPO compositions may be prepared by using numerous reagents. Reagents which may be employed to prepare BAPOs include:

(a) aluminum isopropoxide;
(b) pseudoboehmite or other aluminum oxide;
(c) $H_3PO_4$: 85 weight percent aqueous phosphoric acid;
(d) boric acid or trimethylborate;
(e) TEAOH: 40 weight percent aqueous solution of tetraethylammonium hydroxide;
(f) TBAOH: 40 weight percent aqueous solution of tetrabutylammonium hydroxide;
(g) $Pr_2NH$: di-n-propylamine, $(C_3H_7)_2NH$;
(h) $Pr_3N$: tri-n-propylamine, $(C_3H_7)_3N$;
(i) Quin: Quinuclidine, $(C_7H_{13}N)$;
(j) MQuin: Methyl Quinuclidine hydroxide, $(C_7H_{13}NCH_3OH)$;
(k) C-hex: cyclohexylamine;
(l) TMAOH: tetramethylammonium hydroxide;
(m) TPAOH: tetrapropylammonium hydroxide; and
(n) DEEA: 2-diethylaminoethanol.

BeAPO MOLECULAR SIEVES

The BeAPO molecular sieves of U.S. Ser. Nos. 599,776, filed Apr. 13, 1984, and 835,293 filed Mar. 3, 1986 have a framework structure of $BeO_2^{-2}$, $AlO_2^-$ and $PO_2^+$ tetrahedral units and have an empirical chemical composition on an anhydrous basis expressed by the formula:

$$mR:(Be_xAl_yP_z)O_2$$

wherein "R" represents at least one organic templating agent present in the intracrystalline pore system; "m" represents the molar amount of "R" present per mole of $(Be_xAl_yP_z)O_2$ and has a value of zero to about 0.3, but is preferably not greater than 0.15; and "x", "y" and "z" represent the mole fractions of the elements beryllium, aluminum and phosphorus, respectively, present as tetrahedral oxides. The mole fractions "x", "y" and "z" are generally defined as being within the limiting compositional values or points as follows:

| | Mole Fraction | | |
|---|---|---|---|
| Point | x | y | z |
| A | 0.01 | 0.60 | 0.39 |
| B | 0.01 | 0.39 | 0.60 |
| C | 0.39 | 0.01 | 0.60 |
| D | 0.60 | 0.01 | 0.39 |
| E | 0.60 | 0.39 | 0.01 |
| F | 0.39 | 0.60 | 0.01 |

In a preferred subclass of the BeAPO molecular sieves the values of x, y and z are within the limiting compositional values or points as follows:

| | Mole Fraction | | |
|---|---|---|---|
| Point | x | y | z |
| a | 0.01 | 0.60 | 0.39 |
| b | 0.01 | 0.39 | 0.60 |
| c | 0.35 | 0.05 | 0.60 |
| d | 0.35 | 0.60 | 0.05 |

In a especially preferred subclass of the BeAPO molecular sieves the values of x, y and z are as follows:

| | Mole Fraction | | |
|---|---|---|---|
| Point | x | y | z |
| e | 0.02 | 0.46 | 0.52 |
| f | 0.10 | 0.38 | 0.52 |
| g | 0.10 | 0.46 | 0.44 |

In synthesizing the BeAPO compositions, it is preferred to employ a reaction mixture composition. expressed in terms of the molar ratios as follows:

$$aR:(B_xAl_yP_z)O_2:bH_2O$$

wherein "R" is an organic templating agent; "a" is the amount of organic templating agent "R" and has a value of from zero to about 6 and is preferably an effective amount within the range of greater than zero (0) to about 6, and most preferably not more than about 1.5; "b" has a value of from zero (0) to about 500, preferably between about 2 and about 300, most preferably not greater than about 50; and "x", "y" and "z" represent the mole fractions of beryllium, aluminum and phosphorus, respectively, and each has a value of at least 0.01.

In one embodiment the reaction mixture is selected such that the mole fractions "x", "y" and "z" are generally defined as being within the limiting compositional values or points as follows:

| | Mole Fraction | | |
|---|---|---|---|
| Point | x | y | z |
| G | 0.01 | 0.60 | 0.39 |
| H | 0.01 | 0.39 | 0.60 |
| I | 0.39 | 0.01 | 0.60 |
| J | 0.98 | 0.01 | 0.01 |
| K | 0.39 | 0.60 | 0.01 |

Especially preferred reaction mixtures are those wherein the mole fractions "x", "y" and "z" are within the limiting compositional values or points as follows:

| | Mole Fraction | | |
|---|---|---|---|
| Point | x | y | z |
| g | 0.04 | 0.46 | 0.50 |
| h | 0.16 | 0.34 | 0.50 |
| i | 0.17 | 0.34 | 0.49 |
| j | 0.17 | 0.43 | 0.40 |
| k | 0.14 | 0.46 | 0.40 |

In the foregoing expression of the reaction composition, the reactants are normalized with respect to the total of "x", "y" and "z" such that $(x+y+z)=1.00$ *mole.*

Preparative Reagents

BeAPO compositions may be prepared by using numerous reagents. Reagents which may be employed to prepare BeAPos include:

(a) aluminum isopropoxide;
(b) pseudoboehmite or other aluminum oxide;
(c) $H_3PO_4$: 85 weight percent aqueous phosphoric acid;
(d), beryllium sulfate;
(e) TEAOH: 40 weight percent aqueous solution of tetraethylammonium hydroxide;
(f) TBAOH: 40 weight percent aqueous solution of tetrabutylammonium hydroxide;
(g) $Pr_2NH$: di-n-propylamine, $(C_3H_7)_2NH$;
(h) $Pr_3N$: tri-n-propylamine, $(C_3H_7)_3N$;
(i) Quin: Quinuclidine, $(C_7H_{13}N)$;
(j) MQuin: Methyl Quinuclidine hydroxide, $(C_7H_{13}NCH_3OH)$;
(k) C-hex: cyclohexylamine;
(l) TMAOH: tetramethylammonium hydroxide;
(m) TPAOH: tetrapropylammonium hydroxide; and
(n) DEEA: 2-diethylaminoethanol.

CAPO MOLECULAR SIEVES

The CAPO molecular sieves of U.S. Ser. Nos. 599,813, filed Apr. 13, 1984, and 830,756 filed Feb. 19, 1986 have a framework structure of $CrO_2^n$, $AlO_2^-$ and $PO_2^+$ tetrahedral units (where "n" is −1, 0 or +1) and have an empirical chemical composition on an anhydrous basis expressed by the formula:

$$mR:(Cr_xAl_yP_z)O_2$$

wherein "R" represents at least one organic templating agent present in the intracrystalline pore system; "m" represents the molar amount of "R" present per mole of (Cr and has a value of zero to about 0.3, but is preferably not greater than 0.15; and "x", "y" and "z" represent the mole fractions of the elements chromium, aluminum and phosphorus, respectively, present as tetrahedral oxides. When "n" is −1 or +1, the mole fractions "x", "y" and "z" are generally defined as being within the limiting compositional values or points as follows:

| | Mole Fraction | | |
|---|---|---|---|
| Point | x | y | z |
| A | 0.01 | 0.60 | 0.39 |
| B | 0.01 | 0.39 | 0.60 |
| C | 0.39 | 0.01 | 0.60 |
| D | 0.60 | 0.01 | 0.39 |
| E | 0.60 | 0.39 | 0.01 |
| F | 0.39 | 0.60 | 0.01 |

When "n" is 0, the mole fractions "x", "y" and "z" are generally defined as being within the limiting compositional values or points as follows:

| | Mole Fraction | | |
|---|---|---|---|
| Point | x | y | z |
| G | 0.01 | 0.60 | 0.39 |
| H | 0.01 | 0.47 | 0.52 |
| I | 0.94 | 0.01 | 0.05 |
| J | 0.98 | 0.01 | 0.01 |
| K | 0.39 | 0.60 | 0.01 |

There are three preferred subclasses of the CAPO molecular sieves, depending upon whether the value of "n" is −1, ) or +1 (i.e. whether the chromium has an oxidation number of 3, 4 or 5), it being understood that mixtures of such are permitted in a given CAPO. When "n" is −1, the preferred values of x, y and z are within the limiting compositional values or points as follows:

| | Mole Fraction | | |
|---|---|---|---|
| Point | x | y | z |
| a | 0.01 | 0.59 | 0.40 |
| b | 0.01 | 0.39 | 0.60 |
| c | 0.39 | 0.01 | 0.60 |
| d | 0.59 | 0.01 | 0.40 |

In an especially preferred subclass of these CAPSO molecular sieves in which "n"=−1, the values of x, y and z are as follows:

| | Mole Fraction | | |
|---|---|---|---|
| Point | x | y | z |
| n | 0.01 | 0.52 | 0.47 |
| o | 0.01 | 0.42 | 0.57 |
| p | 0.03 | 0.40 | 0.57 |
| q | 0.07 | 0.40 | 0.53 |
| r | 0.07 | 0.47 | 0.46 |
| s | 0.02 | 0.52 | 0.46 |

When "n" is 0, the preferred values of x, y and z are within the limiting compositional values or points as follows:

| Point | Mole Fraction | | |
|---|---|---|---|
| | x | y | z |
| e | 0.01 | 0.60 | 0.39 |
| f | 0.01 | 0.47 | 0.52 |
| g | 0.50 | 0.225 | 0.275 |
| h | 0.50 | 0.40 | 0.10 |
| i | 0.30 | 0.60 | 0.10 |

When "n" is +1, the preferred values of x, y and z are within the limiting compositional values or points as follows:

| Point | Mole Fraction | | |
|---|---|---|---|
| | x | y | z |
| j | 0.01 | 0.60 | 0.39 |
| k | 0.01 | 0.40 | 0.59 |
| l | 0.59 | 0.40 | 0.01 |
| m | 0.39 | 0.60 | 0.10 |

Since the exact nature of the CAPO molecular sieves is not clearly understood at present, although all are believed to contain $CrO_2$ tetrahedra in the three-dimensional microporous crystal framework structure, it is advantageous to characterize the CAPO molecular sieves by means of their chemical composition. This is due to the low level of chromium present in certain of the CAPO molecular sieves prepared to date which makes it difficult to ascertain the exact nature of the interaction between chromium, aluminum and phosphorus. As a result, although it is believed that CrO tetrahedra are substituted isomorphously for $Al_2O$ or $PO_2$ tetrahedra, it is appropriate to characterize certain CAPO compositions by reference to their chemical composition in terms of the mole ratios of oxides.

In synthesizing the CAPO compositions, it is preferred to employ a reaction mixture composition expressed in terms of the molar ratios as follows:

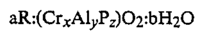

$$aR:(Cr_xAl_yP_z)O_2:bH_2O$$

wherein "R" is an organic templating agent; "a" is the amount of organic templating agent "R" and has a value of from zero to about 6 and is preferably an effective amount within the range of greater than zero (0) to about 6, and most preferably not more than about 0.6; "b" has a value of from zero (0) to about 500, preferably between about 2 and about 300, most preferably not greater than about 20; and "x", "y" and "z" represent the mole fractions of chromium, aluminum and phosphorus, respectively, and each has a value of at least 0.01.

In one embodiment the reaction mixture is selected such that the mole fractions "x", "y" and "z" are generally defined as being within the limiting compositional values or points as follows:

| Point | Mole Fraction | | |
|---|---|---|---|
| | x | y | z |
| L | 0.01 | 0.60 | 0.39 |
| M | 0.01 | 0.39 | 0.60 |
| N | 0.39 | 0.01 | 0.60 |
| O | 0.98 | 0.01 | 0.01 |

-continued

| Point | Mole Fraction | | |
|---|---|---|---|
| | x | y | z |
| P | 0.39 | 0.60 | 0.01 |

Especially preferred reaction mixtures are those containing from about 0.1 to about 0.4 moles of chromium, and from about 0.75 to about 1.25 moles of aluminum, per mole of phosphorus.

In the foregoing expression of the reaction composition, the reactants are normalized with respect to the total of "x", "y" and "z" such that $(x+y+z)=1.00$ *mole.*

Preparative Reagents

CAPO compositions may be prepared by using numerous reagents. Reagents which may be employed to prepare CAPOs include:

(a) aluminum isopropoxide, or aluminum chlorhydrol;
(b) pseudoboehmite or other aluminum oxide;
(c) $H_3PO_4$: 85 weight percent aqueous phosphoric acid;
(d) chromium(III) orthophosphate, chromium(III) acetate and chromium acetate hydroxide, $(Cr_3(OH)_2(CH_3COO)_7)$;
(e) TEAOH: 40 weight percent aqueous solution of tetraethylammonium hydroxide;
(f) TBAOH: 40 weight percent aqueous solution of tetrabutylammonium hydroxide;
(g) $Pr_2NH$: di-n-propylamine, $(C_3H_7)_2NH$;
(h) $Pr_3N$: tri-n-propylamine, $(C_3H_7)_3N$;
(i) Quin: Quinuclidine, $(C_7H_{13}N)$;
(j) MQuin: Methyl Quinuclidine hydroxide, $(C_7H_{13}NCH_3OH)$;
(k) C-hex: cyclohexylamine;
(l) TMAOH: tetramethylammonium hydroxide;
(m) TPAOH: tetrapropylammonium hydroxide; and
(n) DEEA: 2-diethylaminoethanol.

GaAPO MOLECULAR SIEVES

The GaAPO molecular sieves of U.S. Ser. Nos. 599,771, filed Apr. 13, 1984, and 830,890 filed Feb. 19, 1986 have a framework structure of $GaO_2^-$, $AlO_2^-$ and $PO_2^+$ tetrahedral units and have an empirical chemical composition on an anhydrous basis expressed by the formula:

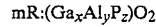

$$mR:(Ga_xAl_yP_z)O_2$$

wherein "R" represents at least one organic templating agent present in the intracrystalline por system; "m" represents the molar amount of "R" present per mole of Al and has a value of zero to about 0.3, but is preferably not greater than 0.15; and "x", "y" and "z" represent the mole fractions of the elements gallium, aluminum and phosphorus, respectively, present as tetrahedral oxides. The mole fractions "x", "y" and "z" are generally defined as being within the limiting compositional values or points as follows:

| Point | Mole Fraction | | |
|---|---|---|---|
| | x | y | z |
| A | 0.01 | 0.60 | 0.39 |
| B | 0.01 | 0.34 | 0.65 |
| C | 0.34 | 0.01 | 0.65 |
| D | 0.60 | 0.01 | 0.39 |
| E | 0.60 | 0.39 | 0.01 |

-continued

| | Mole Fraction | | |
|---|---|---|---|
| Point | x | y | z |
| F | 0.39 | 0.60 | 0.01 |

In general, the value of "z" is the GaAPO molecular sieves is not greater than about 0.60.

In a preferred subclass of the GaAPO molecular sieves the values of x, y and z are within the limiting compositional values or points as follows:

| | Mole Fraction | | |
|---|---|---|---|
| Point | x | y | z |
| a | 0.01 | 0.59 | 0.40 |
| b | 0.01 | 0.34 | 0.65 |
| c | 0.34 | 0.01 | 0.65 |
| d | 0.59 | 0.01 | 0.40 |

In an especially preferred subclass of the GaAPO molecular sieves the values of x, y and z are as follows:

| | Mole Fraction | | |
|---|---|---|---|
| Point | x | y | z |
| e | 0.03 | 0.52 | 0.45 |
| f | 0.03 | 0.33 | 0.64 |
| g | 0.16 | 0.20 | 0.64 |
| h | 0.25 | 0.20 | 0.55 |
| i | 0.25 | 0.33 | 0.42 |
| j | 0.06 | 0.52 | 0.42 |

In synthesizing the GaAPO compositions, it is preferred to employ a reaction mixture composition expressed in terms of the molar ratios as follows:

$$aR:(Ga_xAl_yP_z)O_2:bH_2O$$

wherein "R" is a organic templating agent; "a" is the amount of organic templating agent "R" and has a value of from zero to about 6 and is preferably an effective amount within the range of greater than zero (0) to about 6, and most preferably not more than about 1.0; "b" has a value of from zero (0) to about 500, preferably between about 2 and about 300, most preferably between about 2 and about 20: and "x", "y" and "z" represent the mole fractions of gallium, aluminum and phosphorus, respectively, and each has a value of at least 0.01.

In one embodiment the reaction mixture is selected such that the mole fractions "x", "y" and "z" are generally defined as being within the limiting compositional values or points as follows:

| | Mole Fraction | | |
|---|---|---|---|
| Point | x | y | z |
| G | 0.01 | 0.60 | 0.39 |
| H | 0.01 | 0.39 | 0.60 |
| I | 0.39 | 0.01 | 0.60 |
| J | 0.98 | 0.01 | 0.01 |
| K | 0.39 | 0.60 | 0.01 |

Especially preferred reaction mixtures are those containing from 0.2 to 0.5 mole of $Ga_2O_3$ and from 0.3 to 1 mole of $Al_2O_3$ for each mole of $P_2O_5$.

In the foregoing expression of the reaction composition, the reactants are normalized with respect to the total of "x", "y" and "z" such that $(x+y+z)=1.00$ *mole.*

Preparative Reagents

GaAPO compositions may be prepared by using numerous reagents. Reagents which may be employed to prepare GaAPOs include:

(a) aluminum isopropoxide;
(b) pseudoboehmite or other aluminum oxide;
(c) $H_3PO_4$: 85 weight percent aqueous phosphoric acid;
(d) gallium sulfate or gallium(III) hydroxide;
(e) TEAOH: 40 weight percent aqueous solution of tetraethylammonium hydroxide;
(f) TBAOH: 40 weight percent aqueous solution of tetrabutylammonium hydroxide;
(g) $Pr_2NH$: di-n-propylamine, $(C_3H_7)_2NH$;
(h) $Pr_3N$: tri-n-propylamine, $(C_3H_7)_3$ N;
(i) Quin: Quinuclidine, $(C_7H_{13}N)$;
(j) MQuin: Methyl Quinuclidine hydroxide, $(C_7H_{13}NCH_3OH)$;
(k) C-hex: cyclohexylamine;
(l) TMAOH: tetramethylammonium hydroxide;
(m) TPAOH: tetrapropylammonium hydroxide; and
(n) DEEA: 2-diethylaminoethanol.

GeAPO MOLECULAR SIEVES

The GeAPO molecular sieves of U.S. Ser. Nos. 599,807, filed Apr. 13, 1984, and 841,753 filed Mar. 20, 1986 have a framework structure of $GeO_2$, $AlO_2^-$ and $PO_2^+$ tetrahedral units and have an empirical chemical composition on an anhydrous basis expressed by the formula:

$$mR:(Ge_xAl_yP_z)O_2$$

wherein "R" represents at least one organic templating agent present in the intracrystalline pore system; "m" represents the molar amount of "R" present per mole of $(Ge_xAl_yP_z)O_2$ and has a value of zero to about 0.3, but is preferably not greater than 0.2; and "x", "y" and "z" represent the mole fractions of the elements germanium, aluminum and phosphorus, respectively, present as tetrahedral oxides. The mole fractions "x", "y" and "z" are generally defined as being within the limiting compositional values or points as follows:

| | Mole Fraction | | |
|---|---|---|---|
| Point | x | y | z |
| A | 0.01 | 0.60 | 0.39 |
| B | 0.01 | 0.47 | 0.52 |
| C | 0.94 | 0.01 | 0.05 |
| D | 0.98 | 0.01 | 0.01 |
| E | 0.39 | 0.60 | 0.01 |

In a preferred subclass of the GeAPO molecular sieves the values of x, y and z are within the limiting compositional values or points as follows:

| | Mole Fraction | | |
|---|---|---|---|
| Point | x | y | z |
| a | 0.01 | 0.60 | 0.39 |
| b | 0.01 | 0.47 | 0.52 |
| c | 0.50 | 0.225 | 0.275 |
| d | 0.50 | 0.40 | 0.10 |
| e | 0.30 | 0.60 | 0.10 |

An especially preferred subclass of the GeAPO molecular sieves are those in which the value of "x" is not greater than about 0.13.

In synthesizing the GeAPO compositions, it is preferred to employ a reaction mixture composition expressed in terms of the molar ratios as follows:

$$aR:(Ge_xAl_yP_z)O_2\ bH_2O$$

wherein "R" is an organic templating agent; "a" is the amount of organic templating agent "R" and has a value of from zero to about 6 and is preferably an effective amount within the range of greater than zero (0) to about 6, and most preferably not more than about 0.6; "b" has a value of from zero (0) to about 500, preferably between about 2 and about 300, most preferably between about 10 and about 60; and "x", "y" and "z" represent the mole fractions of germanium, aluminum and phosphorus, respectively, and each has a value of at least 0.01.

In one embodiment the reaction mixture is selected such that the mole fractions "x", "y" and "z" are generally defined as being within the limiting compositional values or points as follows:

| | Mole Fraction | | |
|---|---|---|---|
| Point | x | y | z |
| F | 0.01 | 0.60 | 0.39 |
| G | 0.01 | 0.39 | 0.60 |
| H | 0.39 | 0.01 | 0.60 |
| I | 0.98 | 0.01 | 0.01 |
| J | 0.39 | 0.60 | 0.01 |

Especially preferred reaction mixtures are those containing from 0.2 to 0.4 mole of $GeO_2$ and from 0.75 to 1.25 mole of $Al_2O_3$ for each mole of $P_2O_5$.

In the foregoing expression of the reaction composition, the reactants are normalized with respect to the total of "x", "y" and "z" such that $(x+y+z)=1.00$ *mole.*

Preparative Reagents

GeAPO compositions may be prepared by using numerous reagents. Reagents which may be employed to prepare GeAPOs include:

(a) aluminum isopropoxide;
(b) pseudoboehmite or other aluminum oxide;
(c) $H_3PO_4$: 85 weight percent aqueous phosphoric acid;
(d) germanium tetrachloride, germanium ethoxide and germanium dioxide;
(e) TEAOH: 40 weight percent aqueous solution of tetraethylammonium hydroxide;
(f) TBAOH: 40 weight percent aqueous solution of tetrabutylammonium hydroxide;
(g) $Pr_2NH$: di-n-propylamine, $(C_3H_7)_2NH$;
(h) $Pr_3N$: tri-n-propylamine, $(C_3H_7)_3N$;
(i) Quin: Quinuclidine, $(C_7H_{13}N)$;
(j) MQuin: Methyl Quinuclidine hydroxide, $(C_7H_{13}NCH_3OH)$;
(k) C-hex: cyclohexylamine;
(l) TMAOH: tetramethylammonium hydroxide;
(m) TPAOH: tetrapropylammonium hydroxide; and
(n) DEEA: 2-diethylaminoethanol.

Preparative Procedures

In some cases, it may be advantageous, when synthesizing the GeAPO compositions, to first combine sources of germanium and aluminum, to form a mixed germanium/aluminum compound (this compound being typically a mixed oxide) and thereafter to combine this mixed compound with a source of phosphorus to form the final GeAPO composition. Such mixed oxides may be prepared for example by hydrolyzing aqueous solutions containing germanium tetrachloride and aluminum chlorhydrol, or aluminum tri-sec-butoxide.

LiAPO MOLECULAR SIEVES

The LiAPO molecular sieves of U.S. Ser. Nos. 599,811, filed Apr. 13, 1984, and 834,921 filed Feb. 28, 1986 have a framework structure of $LiO_2^{-3}$, $AlO_2^-$ and $PO_2^+$ tetrahedral units and have an empirical chemical composition on an anhydrous basis expressed by the formula:

$$mR:(L_xAl_yP_z)O_2$$

wherein "R" represents at least one organic templating agent present in the intracrystalline pore system; "m" represents the molar amount of "R" present per mole of $(Li_xAl_yP_z)O_2$ and has a value of zero to about 0.3, but is preferably not greater than 0.15; and "x", "y" and "z" represent the mole fractions of the elements lithium, aluminum and phosphorus, respectively, present as tetrahedral oxides. The mole fractions "x", "y" and "z" are generally defined as being within the limiting compositional values or points as follows:

| | Mole Fraction | | |
|---|---|---|---|
| Point | x | y | z |
| A | 0.01 | 0.60 | 0.39 |
| B | 0.01 | 0.39 | 0.60 |
| C | 0.39 | 0.01 | 0.60 |
| D | 0.60 | 0.01 | 0.39 |
| E | 0.60 | 0.39 | 0.01 |
| F | 0.39 | 0.60 | 0.01 |

In a preferred subclass of the LiAPO molecular sieves the values of x, y and z are within the limiting compositional values or points as follows:

| | Mole Fraction | | |
|---|---|---|---|
| Point | x | y | z |
| a | 0.01 | 0.60 | 0.39 |
| b | 0.01 | 0.39 | 0.60 |
| c | 0.35 | 0.05 | 0.60 |
| d | 0.35 | 0.60 | 0.05 |

In an especially preferred subclass of the LiAPO molecular sieves the values of x, y and z are within the following limits:

| | Mole Fraction | | |
|---|---|---|---|
| Point | x | y | z |
| e | 0.01 | 0.52 | 0.47 |
| f | 0.01 | 0.47 | 0.52 |
| g | 0.03 | 0.45 | 0.52 |
| h | 0.10 | 0.45 | 0.45 |
| i | 0.10 | 0.49 | 0.41 |
| j | 0.07 | 0.52 | 0.41 |

In synthesizing the LiAPO compositions, it is preferred to employ a reaction mixture composition expressed in terms of the molar ratios as follows:

$aR:(L_xAl_yP_z)O_2:bH_2O$ wherein "R" is an organic templating agent; "a" is the amount of organic templating agent "R" and has a value of from zero to about 6 and is preferably an effective amount within the range of greater than zero (0) to about 6, and most preferably not more than about 2; "b" has a value of from zero (0) to about 500, preferably between about 2 and about 300, most preferably not greater than about 40; and "x", "y" and "z" represent the mole fractions of lithium, aluminum and phosphorus, respectively, and each has a value of at least 0.01.

In one embodiment the reaction mixture is selected such that the mole fractions "x", "y" and "z" are generally defined as being within the limiting compositional values or points as follows:

| Point | Mole Fraction | | |
|---|---|---|---|
| | x | y | z |
| G | 0.01 | 0.60 | 0.39 |
| H | 0.01 | 0.39 | 0.60 |
| I | 0.39 | 0.01 | 0.60 |
| J | 0.98 | 0.01 | 0.01 |
| K | 0.39 | 0.60 | 0.01 |

In an especially preferred subclass of the reaction mixtures, the values of "x", "y" and "z" are within the limiting compositional values or points as follows:

| Point | Mole Fraction | | |
|---|---|---|---|
| | x | y | z |
| l | 0.03 | 0.50 | 0.47 |
| m | 0.03 | 0.45 | 0.52 |
| n | 0.08 | 0.40 | 0.52 |
| o | 0.10 | 0.40 | 0.50 |
| q | 0.04 | 0.50 | 0.46 |

In the foregoing expression of the reaction composition, the reactants are normalized with respect to the total of "x", "y" and "z" such that $(x+y+z)=1.00$ mole Since the exact nature of the LiAPO molecular sieves is not clearly understood at present, although all are believed to contain $LiO_2$ tetrahedra in the three-dimensional microporous crystal framework structure, it is advantageous to characterize the LiAPO molecular sieves by means of their chemical composition. This is due to the low level of lithium present in certain of the LiAPO molecular sieves prepared to date which makes it difficult to ascertain the exact nature of the interation between lithium, aluminum and phosphorus. As a result, although it is believed that $LiO_2$ tetrahedra are substituted isomorphously for $AlO_2$ or $PO_2$ tetrahedra, it is appropriate to characterize certain LiAPO compositions by reference to their chemical composition in terms of the mole ratios of oxides.

Preparative Reagents

LiAPO compositions may be prepared by using numerous reagents. Reagents which may be employed to prepare LiAPOs include:

(a) aluminum isopropoxide;
(b) pseudoboehmite or other aluminum oxide;
(c) $H_3PO_4$: 85 weight percent aqueous phosphoric acid;
(d) lithium sulfate or lithium orthophosphate;
(e) TEAOH: 40 weight percent aqueous solution of tetraethylammonium hydroxide;
(f) TBAOH: 40 weight percent aqueous solution of tetrabutylammonium hydroxide;
(g) $Pr_2NH$: di-n-propylamine, $(C_3H_7)_2NH$;
(h) $Pr_3N$: tri-n-propylamine, $(C_3H_7)_3N$;
(i) Quin: Quinuclidine, $(C_7H_{13}N)$;
(j) MQuin: Methyl Quinuclidine hydroxide, $(C_7H_{13}NCH_3OH)$;
(k) C-hex: cyclohexylamine;
(l) TMAOH: tetramethylammonium hydroxide;
(m) TPAOH: tetrapropylammonium hydroxide; and
(n) DEEA: 2-diethylaminoethanol.

FeTiAPO MOLECULAR SIEVES

The FeTiAPO molecular sieves of U.S. Ser. Nos. 599,824, filed Apr. 13, 1984, and 902,129 filed Sept. 2, 1986 have three-dimensional microporous framework structures of $FeO_2$, $TiO_2$, $AlO_2$ and $PO_2$ tetrahedral oxide units having an empirical chemical composition on an anhydrous basis expressed by the formula:

$mR:(M_xAl_yP_z)O_2$ wherein "R" represents at least one organic templating agent present in the intracrystalline pore system; "M" represents iron and titanium; "m" represents the molar amount of "R" present per mole of $(M_xAl_yP_z)O_2$ and has a value of zero (0) to about 0.3; and "x", "y" and "z" represent the mole fractions of "M", aluminum and phosphorus, respectively, present as tetrahedral oxides. The mole fractions "x", "y" and "z" are generally defined as being within the limiting compositional values or points as follows:

| Point | Mole Fraction | | |
|---|---|---|---|
| | x | y | z |
| A | 0.02 | 0.60 | 0.38 |
| B | 0.02 | 0.38 | 0.60 |
| C | 0.39 | 0.01 | 0.60 |
| D | 0.98 | 0.01 | 0.01 |
| E | 0.39 | 0.60 | 0.01 |

In a preferred subclass of the FeTiAPO molecular sieves the values of x, y and z are within the limiting compositional values or points as follows:

| Point | Mole Fraction | | |
|---|---|---|---|
| | x | y | z |
| a | 0.02 | 0.60 | 0.38 |
| b | 0.02 | 0.38 | 0.60 |
| c | 0.39 | 0.01 | 0.60 |
| d | 0.60 | 0.01 | 0.39 |
| e | 0.60 | 0.39 | 0.01 |
| f | 0.39 | 0.60 | 0.01 |

In synthesizing the FeTiAPO compositions, it is preferred to employ a reaction mixture composition expressed in terms of the molar ratios as follows:

$aR:(M_xAl_yP_z)O_2:bH_2O$ wherein "R" is an organic templating agent; "a" is the amount of organic templating agent "R" and has a value of from zero to about 6 and is preferably an effective amount within the range of greater than zero (0) to about 6; "b" has a value of from zero (0) to about 500, preferably between about 2 and about 300; and "x", "y" and "z" represent the mole fractions of "M" (iron and titanium, aluminum and phosphorus, respectively), and each has a value of at least 0 01.

In one embodiment the reaction mixture is selected such that the mole fractions "x", "y" and "z" are generally defined as being within the limiting compositional values or points as follows:

| Point | Mole Fraction | | |
|---|---|---|---|
| | x | y | z |
| F | 0.02 | 0.60 | 0.38 |
| G | 0.02 | 0.38 | 0.60 |
| H | 0.39 | 0.01 | 0.60 |
| I | 0.98 | 0.01 | 0.01 |
| J | 0.39 | 0.60 | 0.01 |

In the foregoing expression of the reaction composition, the reactants are normalized with respect to the total of "x", "y" and "z" such that $(x+y+z)=1.00$ *mole.*

Preparative Reagents

FeTiAPO compositions may be prepared by using numerous reagents. The preferred sources of iron and titanium for preparing FeTiAPOs are the same as those for preparing the FeAPOs and TiAPOs already described above. Other reagents which may be employed to prepare FeTiAPOs include:

(a) aluminum isopropoxide;
(b) pseudoboehmite or other aluminum oxide;
(c) $H_3PO_4$: 85 weight percent aqueous phosphoric acid;
(d) TEAOH: 40 weight percent aqueous solution of tetraethylammonium hydroxide;
(e) TBAOH: 40 weight percent aqueous solution of tetrabutylammonium hydroxide;
(f) $Pr_2NH$: di-n-propylamine, $(C_3H_7)_2NH$;
(g) $Pr_3N$: tri-n-propylamine, $(C_3H_7)_3N$;
(h) Quin: Quinuclidine, $(C_7H_{13}N)$;
(i) MQuin: Methyl Quinuclidine hydroxide, $(C_7H_{13}NCH_3OH)$;
(j) C-hex: cyclohexylamine;
(k) TMAOH: tetramethylammonium hydroxide;
(l) TPAOH: tetrapropylammonium hydroxide; and
(m) DEEA: 2-diethylaminoethanol.

XAPO MOLECULAR SIEVES

The XAPO molecular sieves of U.S. Ser. Nos. 599,810, filed Apr. 13, 1984, and 902,020 filed Sept. 2, 1986 have a three-dimensional microporous framework structures of $MO_2^n$, $AlO_2$ and $PO_2$ tetrahedral oxide units having an empirical chemical composition on an anhydrous basis expressed by the formula:

$$mR:(M_xAl_yP_z)O_2$$

wherein "R" represents at least one organic templating agent present in the intracrystalline pore system; "M" represents at least one element from each of the classes of: (1) iron and titanium; and (2) cobalt, magnesium, manganese and zinc; "n" is 0, −1 or −2; "m" represents a molar amount of "R" present per mole of $(M_xAl_yP_z)O_2$ and has a value of zero (0) to about 0.3; and "x", "y" and "z" represent the mole fractions of "M", aluminum and phosphorus, respectively, present as tetrahedral oxides. The mole fractions "x", "y" and "z" are generally defined as being within the limiting compositional values or points as follows:

| Point | Mole Fraction | | |
|---|---|---|---|
| | x | y | z |
| A | 0.02 | 0.60 | 0.38 |
| B | 0.02 | 0.38 | 0.60 |
| C | 0.39 | 0.01 | 0.60 |
| D | 0.98 | 0.01 | 0.01 |
| E | 0.39 | 0.60 | 0.01 |

In a preferred subclass of the XAPO molecular sieves the values of x, y and z are within the limiting compositional values or points as follows:

| Point | Mole Fraction | | |
|---|---|---|---|
| | x | y | z |
| a | 0.02 | 0.60 | 0.38 |
| b | 0.02 | 0.38 | 0.60 |
| c | 0.39 | 0.01 | 0.60 |
| d | 0.60 | 0.01 | 0.39 |
| e | 0.60 | 0.39 | 0.01 |
| f | 0.39 | 0.60 | 0.01 |

In synthesizing the XAPO compositions, it is preferred to employ a reaction mixture composition expressed in terms of the molar ratios as follows:

$$aR:(M_xAl_yP_z)O_2:bH_2O$$

wherein "R" is an organic templating agent; "a" is the amount of organic templating agent "R" and has a value of from zero to about 6 and is preferably an effective amount within the range of greater than zero (0) to about 6; "M" represents at least one element from each of the classes of: (1) iron and titanium; and (2) cobalt, magnesium, manganese and zinc; "b" has a value of from zero (0) to about 500, preferably between about 2 and about 300; and "x", "y" and "z" represent the mole fractions of "M" (iron and/or titanium, and at least one of cobalt, magnesium, manganese and zinc), aluminum and phosphorus, respectively, and each has a value of at least 0.01, with the proviso that "x" has a value of at least 0.02.

In one embodiment the reaction mixture is selected such that the mole fractions "x", "y" and "z" are generally defined as being within the limiting compositional values cr points as follows:

| Point | Mole Fraction | | |
|---|---|---|---|
| | x | y | z |
| F | 0.02 | 0.60 | 0.38 |
| G | 0.02 | 0.38 | 0.60 |
| H | 0.39 | 0.01 | 0.60 |
| I | 0.98 | 0.01 | 0.01 |
| J | 0.39 | 0.60 | 0.01 |

In the foregoing expression of the reaction composition, the reactants are normalized with respect to the total of "x", "y" and "z" such that $(x+y+z)=1.00$ *mole.*

Preparative Reagents

XAPO compositions may be prepared b using numerous reagents. The preferred sources of elements "M" for preparing XAPOs are the same as those for preparing other APOs containing the same elements, as described above and below. Other reagents which may be employed to prepare XAPOs include:

(a) aluminum isopropoxide;
(b) pseudoboehmite or other aluminum oxide;
(c) $H_3PO_4$: 85 weight percent aqueous phosphoric acid;
(d) TEAOH: 40 weight percent aqueous solution of tetraethylammonium hydroxide;
(e) TBAOH: 40 weight percent aqueous solution of tetrabutylammonium hydroxide;
(f) $Pr_2NH$: di-n-propylamine, $(C_3H_7)_2NH$;
(g) $Pr_3N$: tri-n-propylamine, $(C_3H_7)_3N$;
(h) Quin: Quinuclidine, $(C_7H_{13}N)$;
(i) MQuin: Methyl Quinuclidine hydroxide, $(C_7H_{13}NCH_3OH)$;
(j) C-hex: cyclohexylamine;
(k) TMAOH: tetramethylammonium hydroxide:
(l) TPAOH: tetrapropylammonium hydroxide: and
(m) DEEA: 2-diethylaminoethanol.

MIXED-ELEMENT APO MOLECULAR SIEVES

The mixed element APO molecular sieves of U.S. Ser. Nos. 599,978, filed Apr. 13, 1984, and 846,088 filed Mar. 31, 1986 have a framework structure of $MO_2^{na}$, $AlO_2^-$ and $PO_2^-$ tetrahedral units, wherein $MO_2^n$ represents at least two different elements present as tetrahedral units "$MO_2^n$" with charge "n", where "n" may be −3, −2, −1, 0 or +1. One of the elements "M" is selected from the group consisting of arsenic, beryllium, boron, chromium, gallium, germanium, lithium and vanadium, while a second one of the elements "M" is selected from the group consisting of cobalt, iron, magnesium, manganese, titanium and zinc. Preferably, "M" is a mixture of lithium and magnesium. The mixed-element molecular sieves have an empirical chemical composition on an anhydrous basis expressed by the formula:

$$mR:(M_xAl_yP_z)O_2$$

wherein "R" represents at least one organic templating agent present in the intracrystalline pore system; "m" represents the molar amount of "R" present per mole of $(Li_xAl_yP_z)O_2$ and has a value of zero to about 0.3, but is preferably not greater than 0.15; and "x", "y" and "z" represent the mole fractions of the elements "M" (i.e. "x" is the total of the mole fractions of the two or more elements "M"), aluminum and phosphorus, respectively, present as tetrahedral oxides The mole fractions "x", "y" and "z" are generally defined as being within the limiting compositional values or points as follows:

| Point | Mole Fraction | | |
|---|---|---|---|
| | x | y | z |
| A | 0.02 | 0.60 | 0.38 |
| B | 0.02 | 0.38 | 0.60 |
| C | 0.39 | 0.01 | 0.60 |
| D | 0.98 | 0.01 | 0.01 |
| E | 0.39 | 0.60 | 0.01 |

In a preferred subclass of the mixed-element APO molecular sieves the values of x, y and z are within the limiting compositional values or points as follows:

| Point | Mole Fraction | | |
|---|---|---|---|
| | x | y | z |
| a | 0.02 | 0.60 | 0.38 |
| b | 0.02 | 0.38 | 0.60 |
| c | 0.39 | 0.01 | 0.60 |
| d | 0.60 | 0.01 | 0.39 |

-continued

| Point | Mole Fraction | | |
|---|---|---|---|
| | x | y | z |
| e | 0.60 | 0.39 | 0.01 |
| f | 0.39 | 0.60 | 0.01 |

An especially preferred subclass of the mixed-element APO molecular sieves are those in which the value of x is not greater than about 0.10.

A second group (FCAPO's) of mixed element APO molecular sieves described in U.S. Ser. No. 600,171, filed Apr. 13, 1984 (now U.S. Pat. No. 4,686,093 issued Aug. 11, 1987), have a framework structure of $MO_2^n$, $AlO_2^-$ and $PO_2^+$ tetrahedral units, wherein $MO_2$ represents at least two different elements which are present as tetrahedral units "$MO_2^n$" *with charge "n", where "n" may be* −3, −2, −1, 0 or +1 and which are selected from the group consisting of arsenic, beryllium, boron, chromium, gallium, germanium, lithium and vanadium. These mixed-element molecular sieves have an empirical chemical composition on an anhydrous basis expressed by the formula:

$$mR:(M_xAl_yP_z)O_2$$

wherein "R" represents at least one organic templating agent present in the intracrystalline pore system; "m" represents the molar amount of "R" present per mole of $(M_xAl_yP_z)O_2$ and has a value of zero to about 0.3; and "x", "y" and "z" represent the mole fractions of the elements "M" (i.e. "x" is the total of the mole fractions of the two or more elements "M"), aluminum and phosphorus, respectively, present as tetrahedral oxides. The mole fractions "x", "y" and "z" are generally defined as being within the limiting compositional values or points as follows:

| Point | Mole Fraction | | |
|---|---|---|---|
| | x | y | z |
| A | 0.02 | 0.60 | 0.38 |
| B | 0.02 | 0.38 | 0.60 |
| C | 0.39 | 0.01 | 0.60 |
| D | 0.98 | 0.01 | 0.01 |
| E | 0.39 | 0.60 | 0.01 |

In a preferred subclass of these mixed-element APO molecular sieves the values of x, y and z are within the limiting compositional values or points as follows:

| Point | Mole Fraction | | |
|---|---|---|---|
| | x | y | z |
| a | 0.02 | 0.60 | 0.38 |
| b | 0.02 | 0.38 | 0.60 |
| c | 0.39 | 0.01 | 0.60 |
| d | 0.60 | 0.01 | 0.39 |
| e | 0.60 | 0.39 | 0.01 |
| f | 0.39 | 0.60 | 0.01 |

In synthesizing the mixed-element APO compositions, it is preferred to employ a reaction mixture composition expressed in terms of the molar ratios as follows:

$$aR:(M_xAl_yP_z)O_2:bH_2O$$

wherein "R" is an organic templating agent; "a" is the amount of organic templating agent "R" and has a value of from zero to about 6 and is preferably an effective amount within the range of greater than zero (0) to about 6, and most preferably not more than about 0.5; "b" has a value of from zero (0) to about 500, preferably between about 2 and about 300, most preferably not greater than about 20, and most desirably not more than about 10; and "x" "y" and "z" represent the mole fractions of "M", aluminum and phosphorus, respectively, "y" and "z" each having a value of at least 0.01 and "x" having a value of at least 0.02, with each element "M" having a mole fraction of at least In one embodiment the reaction mixture is selected such that the mole fractions "x", "y" and "z" are generally defined as being within the limiting compositional values or points as follows:

| | Mole Fraction | | |
|---|---|---|---|
| Point | x | y | z |
| F | 0.02 | 0.60 | 0.38 |
| G | 0.02 | 0.38 | 0.60 |
| H | 0.39 | 0.01 | 0.60 |
| I | 0.98 | 0.01 | 0.01 |
| J | 0.39 | 0.60 | 0.01 |

Preferred reaction mixtures are those containing not more than about 0.2 moles of the metals "M" per mole of phosphorus.

In the foregoing expression of the reaction composition, the reactants are normalized with respect to the total of "x", "y" and "z" such that $(x+y+z)=1.00$ *mole.*

Since the exact nature of the mixed-element APO molecular sieves is not clearly understood at present, although all are believed to contain $MO_2$ tetrahedra in the three-dimensional microporous crystal framework structure, it is advantageous to characterize the mixed-element APO molecular sieves by means of their chemical composition. This is due to the low level of the elements "M" present in certain of the mixed-element APO molecular sieves prepared to date which makes it difficult to ascertain the exact nature of the interaction between the metals "M", aluminum and phosphorus. As a result, although it is believed that $MO_2$ tetrahedra are substituted isomorphously for $AlO_2$ or $PO_2$ tetrahedra, it is appropriate to characterize certain mixed-element APO compositions by reference to their chemical composition in terms of the mole ratios of oxides.

Preparative Reagents

Mixed-element APO compositions may be prepared by using numerous reagents. Reagents which may be employed to prepare mixed-element APOs include:

(a) aluminum isopropoxide;
(b) pseudoboehmite or other aluminum oxide;
(c) $H_3PO_4$: 85 weight percent aqueous phosphoric acid;
(d) lithium phosphate or magnesium hydroxide or appropriate salts of the other elements "M", as described above;
(e) TEAOH: 40 weight percent aqueous solution of tetraethylammonium hydroxide;
(f) TBAOH: 40 weight percent aqueous solution of tetrabutylammonium hydroxide;
(g) $Pr_2NH$: di-n-propylamine, $(C_3H_7)_2NH$;
(h) $Pr_3N$: tri-n-propylamine, $(C_3H_7)_3N$;
(i) Quin: Quinuclidine, $(C_7H_{13}N)$;
(j) MQuin: Methyl Quinuclidine hydroxide, $(C_7H_{13}NCH_3OH)$;
(k) C-hex: cyclohexylamine;
(l) TMAOH: tetramethylammonium hydroxide;
(m) TPAOH: tetrapropylammonium hydroxide; and
(n) DEEA: 2-diethylaminoethanol.

We claim:

1. A process for the production of a crystalline non-zeolitic molecular sieve in a preformed body of alumina or silica-alumina, which process comprises contacting this body with a liquid reaction mixture containing a reactive source of phosphorus. pentoxide, and an organic templating agent, the contacting being effected at a time and temperature so as to cause the body to react with the liquid reaction mixture and to form crystals of the non-zeolitic molecular sieve within the body.

2. A process according to claim 1 wherein the non-zeolitic molecular sieve comprises at least one element in addition to aluminum, phosphorus and oxygen, and the body of alumina or silica-alumina comprises a reactive source of the at least one element.

3. A process according to claim 1 wherein the non-zeolitic molecular sieve comprises at least one element in addition to aluminum, phosphorus and oxygen, and the liquid reaction mixture comprises a reactive source of the at least one element.

4. A process according to claim 1 wherein the non-zeolitic molecular sieve contains silicon and the preformed body comprises silica-alumina.

5. A process according to claim 1 wherein the non-zeolitic molecular sieve contains silicon and the liquid reaction mixture comprises a reactive source of silica.

6. A process according to claim 1 wherein the liquid reaction mixture comprises an aqueous solution of at least one phosphate.

7. A process according to claim 1 wherein the body of alumina or silica-alumina is calcined prior to being contacted with the liquid reaction mixture.

8. A process according to claim 1 wherein the body of alumina or silica-alumina is calcined at a temperature of from about 250° to about 750° C. prior to being contacted with the liquid reaction mixture.

9. A process according to claim 1 wherein the body of alumina or silica-alumina comprises an alumina-silica gel.

10. A process according to claim 1 wherein the body of alumina or silica-alumina is formed by hydrolyzing an aluminum alkoxide.

11. A process according to claim 1 wherein the body of alumina or silica-alumina is formed by peptizing alumina in acid, followed by substantial neutralization of the remaining acid.

12. A process according to claim 1 wherein the body of alumina or silica-alumina is formed by preparing a paste containing alumina, or alumina and silica, and a liquid dispersion medium, extruding the paste, and heating the extrudate to remove at least part of the liquid dispersion medium.

13. A process according to claim 1 wherein the body of alumina or silica-alumina is in the form of spray-dried particles of alumina or silica-alumina.

14. A process according to claim 13 wherein the spray-dried particles of alumina or silica-alumina have an average particle size in the range of about 50 to about 90 microns.

15. A process according to claim 1 wherein the source of alumina in the body of alumina or silica-alumina is boehmite, pseudoboehmite, gibbsite or bayerite.

16. A process according to claim 4 wherein the source of silica in the body of silica-alumina is any one or more of a silica sol, a particulate silica, a fumed silica, a reactive solid precipitated silica, silica gel, a silicon alkoxide, a tetraalkylorthosilicate, silicic acid, an alkali metal silicate, and colloidal silica.

17. A process according to claim 4 wherein the source of silica in the body of silica-alumina is colloidal silica or a silica sol.

18. A process according to claim 4 wherein the source of alumina and silica in the body of silica-alumina comprises an aluminosilicate clay.

19. A process according to claim 18 wherein the clay is a kaolin.

20. A process according to claim 1 wherein the minimum dimension of the body of alumina or silica-alumina is not less than about 0.5 mm.

21. A process according to claim 1 wherein the reactive source of phosphorus pentoxide in the liquid reaction mixture comprises orthophosphoric acid, or a salt thereof.

22. A process according to claim 1 wherein the organic templating agent is a quaternary ammonium or quaternary phosphonium compound having the formula:

$$R_4X^+$$

wherein X is nitrogen or phosphorus and each R is an alkyl or aryl group containing from 1 to 8 carbon atoms.

23. A process according to claim 1 wherein the organic templating agent is an amine.

24. A process according to claim 1 wherein the templating agent is selected from the group consisting of tetrapropylammonium ion; tetraethylammonium ion; tripropylamine; triethylamine; triethanolamine; piperidine; cyclohexylamine; 2-methyl pyridine; N,N-dimethylbenzylamine; N,N-dimethylethanolamine; choline; N,N-dimethylpiperazine; 1,4-diaziabicyclo-(2,2,2) octane; N-methyldiethanolamine; N-methylethanolamine; N-methylpiperidine; 3-methylpiperidine; N-methylcyclohexylamine; 3-methylpyridine; 4-methylpyridine; quinuclidine; N,N'-dimethyl-1,4-diazabicyclo (2,2,2) octane ion; tetramethylammonium ion; tetrabutylammonium ion; tetrapentylammonium ion; di-n-butylamine; neopentylamine; di-n-pentylamine; isopropylamine; t-butylamine; ethylenediamine; pyrrolidine; 2-imidazolidone; di-n-propylamine; and a polymeric quaternary ammonium salt $[(C_{14}H_{32}N_2)(OH)_2]_x$ wherein x has a value of at least 2.

25. A process according to claim 1 wherein the liquid reaction mixture comprises not more than about 6 moles of the organic templating agent per mole of phosphorus.

26. A process according to claim 25 wherein the liquid reaction mixture comprises not more than about 2 moles of the organic templating agent per mole of phosphorus.

27. A process according to claim 1 wherein the liquid reaction mixture comprises not more than about 500 moles of water per mole of phosphorus.

28. A process according to claim 27 wherein the liquid reaction mixture comprises not more than about 100 moles of water per mole of phosphorus.

29. A process according to claim 28 wherein the liquid reaction mixture comprises not more than about 50 moles of water per mole of phosphorus.

30. A process according to claim 1 wherein the liquid reaction mixture comprises from about 0.75 to 1.25 moles of aluminum per mole of phosphorus.

31. A process according to claim 2 wherein the reactive source of the at least one element in the body is selected from the group consisting of oxides, hydroxides, alkoxides, chlorides, bromides, iodides, sulfates, nitrates and carboxylates of the at least one element, and mixtures of these compounds.

32. A process according to claim 3 wherein the reactive source of the at least one element in the liquid reaction mixture is selected from the group consisting of oxides, hydroxides, alkoxides, chlorides, bromides, iodides, sulfates, nitrates and carboxylates of the at least one element, and mixtures of these compounds.

33. A process according to claim 5 wherein the reactive source of silica in the liquid reaction mixture comprises at least one of a colloidal silica, a silica sol, an alkali metal silicate and a tetraalkylorthosilicate.

34. A process according to claim 33 wherein the reactive source of silica comprises colloidal silica or a silica sol.

35. A process according to claim 5 wherein the liquid reaction mixture contains from about 0.1 to about 0.5 moles of silicon per mole of phosphorus.

36. A process according to claim 1 wherein the body of alumina or silica-alumina is contacted with the liquid reaction mixture at a temperature in the range of from about 100° to about 300° C.

37. A process according to claim 36 wherein the body of alumina or silica-alumina is contacted with the liquid reaction mixture at a temperature in the range of from about 150° to about 250° C.

38. A process according to claim 1 wherein the body of alumina or silica-alumina is contacted with the liquid reaction mixture for a period in the range of from about 24 to about 240 hours.

39. A process according to claim 38 wherein the body of alumina or silica-alumina is contacted with the liquid reaction mixture for a period in the range of from about 48 to about 144 hours.

40. A process according to claim 1 wherein the non-zeolitic molecular sieve is produced in the form of particles having an average size of at least about 10 microns.

41. A process according to claim 40 wherein the non-zeolitic molecular sieve is produced in the form of particles having an average size of from about 50 to about 90 microns.

42. A process according to claim 1 wherein the formed non-zeolitic molecular sieve is separated from the liquid reaction mixture and is thereafter calcined at a temperature sufficiently high to remove at least some of any organic templating agent present in the intracrystalline pore system of the non-zeolitic molecular sieve.

43. A process according to claim 1 wherein the non-zeolitic molecular sieve produced has, after calcination, an adsorption of isobutane of at least about 2 percent by weight of the non-zeolitic molecular sieve at a partial pressure of 500 torr and a temperature of 20° C.

44. A process according to claim 1 wherein the non-zeolitic molecular sieve produced is an aluminophosphate as claimed in U.S. Pat. No. 4,310,440.

45. A process according to claim 44 wherein the non-zeolitic molecular sieve produced is $AlPO_4$-5.

46. A process according to claim 44 wherein the organic templating agent comprises at least one of tetraethylammonium hydroxide, tetrapropylammonium hydroxide, diethylethanolamine and tripropylamine.

47. A process according to claim 46 wherein the organic templating agent comprises a mixture of tetraethylammonium hydroxide and tripropylamine, the liquid reaction mixture containing from about 0.1 to about 0.4 moles of tetraethylammonium hydroxide and from about 0.5 to about 2 moles of tripropylamine per mole of phosphorus.

48. A process according to claim 44 wherein the body of alumina is contacted with the liquid reaction mixture at a temperature in the range of from about 100° to about 200° C.

49. A process according to claim 44 wherein the body of alumina is contacted with the liquid reaction mixture for a period of from about 12 to about 72 hours.

50. A process according to claim 1 wherein the non-zeolitic molecular sieve produced is a silicoaluminophosphate as claimed in U.S. Pat. No. 4,440,871.

51. A process according to claim 50 wherein the non-zeolitic molecular sieve produced is any one or more of SAPO-5, SAPO-11, SAPO-34 and SAPO-41.

52. A process according to claim 51 wherein the non-zeolitic molecular sieve produced is SAPO-34.

53. A process according to claim 50 wherein the organic templating agent comprises at least one of tetraethylammonium hydroxide, diethanolamine and di-n-propylamine.

54. A process according to claim 53 wherein the organic templating agent comprises a mixture of diethanolamine and di-n-propylamine, the liquid reaction mixture containing from about 0.5 to about 2 moles of diethanolamine and from about 0.1 to about 0.5 moles of di-n-propylamine per mole of phosphorus.

55. A process according to claim 50 wherein the body of alumina or silica-alumina is calcined at a temperature of from about 250° to about 450° C. prior to being contacted with the liquid reaction mixture.

56. A process according to claim 55 wherein the body of alumina or silica-alumina is contacted with the liquid reaction mixture at a temperature in the range of from about 150° to about 250° C.

57. A process according to claim 50 wherein the body of alumina or silica-alumina is contacted with the liquid reaction mixture for a period of from about 48 to about 144 hours.

58. A process for the production of an aluminophosphate as claimed in U.S. Pat..No. 4,310,440, which process comprises contacting at an effective temperature and for an effective time, a body of alumina with a liquid reaction mixture containing a reactive source of phosphorus pentoxide, and an organic templating agent, thereby causing the body to react with the liquid reaction mixture and to form a body of the aluminophosphate.

59. A process for the production of a crystalline silicoaluminophosphate as claimed in U.S. Pat. No. 4,440,871 in a preformed body of alumina or silica-alumina, which process comprises contacting this body with a liquid reaction mixture containing a reactive source of phosphorus pentoxide, and an organic templating agent, at least one of the body and the liquid reaction mixture containing a reactive source of silicon, the contacting being effected at a time and temperature so as to cause the body to react with the liquid reaction mixture and to form crystals of the silicoaluminophosphate within the body.

60. A process according to claim 59 wherein the non-zeolitic molecular sieve produced is any one or more of SAPO-5, SAPO-11, SAPO-34 and SAPO-41.

61. A process according to claim 60 wherein the non-zeolitic molecular sieve produced is SAPO-34.

* * * * *